US012408680B2

(12) United States Patent
Ryan et al.

(10) Patent No.: US 12,408,680 B2
(45) Date of Patent: Sep. 9, 2025

(54) COMPOUNDS AND FORMULATIONS FOR PROTECTIVE COATINGS

(71) Applicant: Apeel Technology, Inc., Goleta, CA (US)

(72) Inventors: Justin Ryan, Goleta, CA (US); Stanley Zhang, Goleta, CA (US); Charles Patrick Frazier, Goleta, CA (US)

(73) Assignee: Apeel Technology, Inc., Goleta, CA (US)

( * ) Notice: Subject to any disclaimer, the term of this patent is extended or adjusted under 35 U.S.C. 154(b) by 0 days.

(21) Appl. No.: 17/940,811

(22) Filed: Sep. 8, 2022

(65) Prior Publication Data

US 2023/0095677 A1    Mar. 30, 2023

Related U.S. Application Data

(60) Provisional application No. 63/241,991, filed on Sep. 8, 2021.

(51) Int. Cl.
| A23B 7/154 | (2006.01) |
| A23B 2/775 | (2025.01) |
| A23B 7/16 | (2006.01) |
| C07F 9/09 | (2006.01) |

(52) U.S. Cl.
CPC ............. *A23B 7/154* (2013.01); *A23B 2/775* (2025.01); *A23B 7/16* (2013.01); *C07F 9/091* (2013.01); *A23V 2002/00* (2013.01)

(58) Field of Classification Search
CPC ......... A23B 7/154; A23B 7/16; A23L 3/3553; A23L 3/3526; C07F 9/091; A23V 2002/00
USPC .......................................................... 426/89
See application file for complete search history.

(56) References Cited

U.S. PATENT DOCUMENTS

| 1,016,761 | A | | 2/1912 | Moore |
| 1,943,468 | A | | 1/1934 | Bridgeman |
| 2,213,557 | A | | 9/1940 | Tisdale et al. |
| 2,222,000 | A | | 11/1940 | Schmidt |
| 2,223,168 | A | | 11/1940 | Dombrow et al. |
| 2,275,659 | A | | 3/1942 | Steinle et al. |
| 2,324,448 | A | | 7/1943 | Gottlieb |
| 2,333,887 | A | | 11/1943 | Redlinger |
| 2,342,063 | A | | 2/1944 | Sells |
| 2,363,232 | A | | 11/1944 | De Witt |
| 2,424,952 | A | | 7/1947 | Handy |
| 2,470,281 | A | * | 5/1949 | Allingham ............... A23B 4/10 426/310 |
| 2,472,794 | A | | 6/1949 | Cothran |
| 2,657,282 | A | | 10/1953 | Winkel |
| 2,697,793 | A | | 12/1954 | Trump et al. |
| 2,744,019 | A | * | 5/1956 | Snyder .................. B65B 25/041 426/302 |
| 2,857,282 | A | | 10/1958 | Jansen |
| 2,866,709 | A | | 12/1958 | Gerwe et al. |
| 3,189,467 | A | | 6/1965 | Kalmar |
| 3,208,951 | A | | 9/1965 | Berger et al. |
| 3,232,765 | A | | 2/1966 | Rosenthal et al. |
| 3,420,790 | A | | 1/1969 | Gassner et al. |
| 3,437,621 | A | | 4/1969 | Aron et al. |
| 3,445,275 | A | | 5/1969 | Bogart et al. |
| 3,449,108 | A | | 6/1969 | McConnell et al. |
| 3,471,303 | A | | 10/1969 | Hamdy et al. |
| 3,715,024 | A | | 2/1973 | Mumma |
| 3,997,674 | A | | 12/1976 | Ukai et al. |
| 4,002,775 | A | | 1/1977 | Kabara |
| 4,002,777 | A | | 1/1977 | Juvinall et al. |
| 4,025,540 | A | | 5/1977 | Kleemann et al. |
| 4,115,313 | A | | 9/1978 | Lyon et al. |
| 4,421,775 | A | | 12/1983 | Chan, Jr. |
| 4,423,071 | A | | 12/1983 | Chignac et al. |
| 4,505,935 | A | | 3/1985 | Larsson |
| 4,649,057 | A | | 3/1987 | Thomson |
| 4,654,370 | A | | 3/1987 | Marriot et al. |
| 4,661,359 | A | | 4/1987 | Seaborne et al. |
| 4,710,228 | A | | 12/1987 | Seaborne et al. |
| 4,726,898 | A | | 2/1988 | Mills et al. |
| 4,732,708 | A | | 3/1988 | Ekman et al. |
| 4,820,533 | A | | 4/1989 | Seaborne |
| 4,857,345 | A | | 8/1989 | Sardo |
| 4,874,618 | A | | 10/1989 | Seabor |
| 4,960,600 | A | | 10/1990 | Kester et al. |
| 4,962,885 | A | | 10/1990 | Coffee |
| 5,019,403 | A | | 5/1991 | Krochta |
| 5,051,448 | A | | 9/1991 | Shashoua |
| 5,110,509 | A | | 5/1992 | Peter et al. |
| 5,126,153 | A | | 6/1992 | Beck |
| 5,209,410 | A | | 5/1993 | Wichmann et al. |

(Continued)

FOREIGN PATENT DOCUMENTS

| CN | 86104531 | 2/1988 |
| CN | 1103548 | 6/1995 |

(Continued)

OTHER PUBLICATIONS

Scholfield et al. (In Journal of the American Oil Chemists Society vol. 58, No. 10, 889-892, 1981). (Year: 1981).*
Lecithin [Retrieved on Jul. 30, 2023]. (Year: 2023).*
Structure of phospholipids [Retrieved on Jul. 30, 2023]. (Year: 2023).*
Phosphatidylcholine (Retrieved on 2023). (Year: 2023).*
Wong et al. (See p. 3 of Science Direct : in Soybeans 2008). (Year: 2008).*
Google search result (Retrieved on 2023). (Year: 2023).*
Google search result for soy lecithin and phytosterol (Retrieved on Jul. 31, 2023). (Year: 2023).*

(Continued)

*Primary Examiner* — Erik Kashnikow
*Assistant Examiner* — Bhaskar Mukhopadhyay
(74) *Attorney, Agent, or Firm* — Fish & Richardson P.C.

(57) ABSTRACT

The present disclosure relates to protective coatings e.g., on agricultural products, that can include a glycerophospholipid bilayer structure formed on the surface of the agricultural product.

19 Claims, 13 Drawing Sheets

(56) References Cited

U.S. PATENT DOCUMENTS

| | | |
|---|---|---|
| 5,354,573 A | 10/1994 | Gross et al. |
| 5,366,995 A | 11/1994 | Savage |
| 5,376,391 A | 12/1994 | Nisperos-Carriedo et al. |
| 5,389,389 A | 2/1995 | Beck |
| 5,451,266 A | 9/1995 | Kirk et al. |
| 5,498,295 A | 3/1996 | Murch et al. |
| 5,543,164 A | 8/1996 | Krochta et al. |
| 5,607,970 A | 3/1997 | Ishihara |
| 5,658,768 A | 8/1997 | Quinlan |
| 5,741,505 A | 4/1998 | Beyer et al. |
| 5,827,553 A | 10/1998 | Dimitroglou |
| 5,832,527 A | 11/1998 | Kawaguchi |
| 5,906,831 A | 5/1999 | Larsson et al. |
| 5,925,395 A | 7/1999 | Chen |
| 5,939,117 A | 8/1999 | Chen et al. |
| 6,010,726 A | 1/2000 | Evans et al. |
| 6,033,705 A | 3/2000 | Isaacs |
| 6,068,867 A * | 5/2000 | Nussinovitch ......... A23C 19/16 426/654 |
| 6,136,856 A | 10/2000 | Savage et al. |
| 6,162,475 A | 12/2000 | Hagenmaier et al. |
| 6,165,529 A | 12/2000 | Yang et al. |
| 6,241,971 B1 | 6/2001 | Fox et al. |
| 6,254,645 B1 | 7/2001 | Kellis et al. |
| 6,255,451 B1 | 7/2001 | Koch et al. |
| 6,294,186 B1 | 9/2001 | Beerse et al. |
| 6,348,217 B1 | 2/2002 | Santos et al. |
| 6,503,492 B2 | 1/2003 | McGlone et al. |
| 6,723,364 B1 | 4/2004 | Bompeix et al. |
| 6,729,552 B1 | 5/2004 | McEwen et al. |
| 6,783,768 B1 | 8/2004 | Brown et al. |
| 6,822,105 B1 | 11/2004 | Luxem |
| 7,247,272 B1 | 7/2007 | Moerman et al. |
| 7,373,135 B2 | 5/2008 | Najib-Fruchart et al. |
| 7,375,135 B2 | 5/2008 | Naiib-Fruchart et al. |
| 7,550,617 B2 | 6/2009 | Imig et al. |
| 7,588,641 B2 | 9/2009 | Yogi et al. |
| 7,708,822 B2 | 5/2010 | Lahav et al. |
| 7,732,470 B2 | 6/2010 | Imig et al. |
| 7,754,766 B2 | 7/2010 | Awad |
| 7,785,897 B2 | 8/2010 | Agnes et al. |
| 7,851,002 B2 | 12/2010 | Hekal et al. |
| 7,931,926 B2 | 4/2011 | Lidster et al. |
| 7,943,336 B2 | 5/2011 | Viksoe-Nielsen et al. |
| 8,101,221 B2 | 1/2012 | Chen et al. |
| 8,119,178 B2 | 2/2012 | Lidster et al. |
| 8,197,870 B2 | 6/2012 | Krasutsky et al. |
| 8,247,609 B2 | 8/2012 | Roques et al. |
| 8,263,751 B2 | 9/2012 | Peterson |
| 8,424,243 B1 | 4/2013 | Narciso et al. |
| 8,501,445 B2 | 8/2013 | Yoshikawa et al. |
| 8,546,115 B2 | 10/2013 | Buchert et al. |
| 8,586,807 B2 | 11/2013 | Hatcher |
| 8,609,169 B2 | 12/2013 | Chen et al. |
| 8,752,328 B2 | 6/2014 | Kaiser et al. |
| 8,846,355 B2 | 9/2014 | Yoshikawa et al. |
| 8,921,351 B2 | 12/2014 | Perlman |
| 9,095,152 B2 | 8/2015 | Munger |
| 9,102,125 B2 | 8/2015 | Battersby et al. |
| 9,283,173 B2 | 3/2016 | Lederman |
| 9,284,432 B2 | 3/2016 | Yoshikawa et al. |
| 9,475,643 B1 | 10/2016 | Odman et al. |
| 9,714,399 B2 | 7/2017 | Verkuiil |
| 9,743,670 B2 | 8/2017 | Grund |
| 9,743,679 B2 | 8/2017 | Perez et al. |
| 9,744,542 B2 | 8/2017 | Rogers |
| 9,770,041 B2 | 9/2017 | Dong et al. |
| 9,957,215 B2 | 5/2018 | Perez |
| 10,092,014 B2 | 10/2018 | Holland et al. |
| 10,150,132 B2 | 12/2018 | Hamamoto et al. |
| 10,239,069 B2 | 3/2019 | Rogers |
| 10,266,708 B2 | 4/2019 | Perez |
| 10,407,377 B2 | 9/2019 | Balms |
| 10,517,310 B2 | 12/2019 | Perez |
| 10,537,115 B2 | 1/2020 | Holland et al. |
| 10,537,130 B2 | 1/2020 | Rogers |
| 10,561,155 B2 | 2/2020 | Bakus |
| 11,447,646 B2 | 9/2022 | Perez et al. |
| 11,472,970 B2 | 10/2022 | Perez et al. |
| 11,723,377 B2 | 8/2023 | Holland et al. |
| 2001/0026927 A1 | 10/2001 | Yokohama et al. |
| 2001/0042341 A1 | 11/2001 | Hamersky et al. |
| 2002/0043577 A1 | 4/2002 | Krasutsky et al. |
| 2002/0123546 A1 | 9/2002 | Bigg et al. |
| 2003/0044488 A1 | 3/2003 | Roskam |
| 2003/0109727 A1 | 6/2003 | Krasutsky et al. |
| 2003/0124228 A1 | 7/2003 | Goto |
| 2003/0194445 A1 | 10/2003 | Kuhner et al. |
| 2004/0022906 A1 | 2/2004 | Petacvich |
| 2004/0071845 A1 | 4/2004 | Hekal |
| 2004/0120919 A1 | 6/2004 | Nguyen et al. |
| 2004/0220283 A1 | 11/2004 | Zhang et al. |
| 2004/0241288 A1 | 12/2004 | Ahav et al. |
| 2005/0053593 A1 | 3/2005 | Wang et al. |
| 2005/0233039 A1 | 10/2005 | Wolfe et al. |
| 2005/0249856 A1 | 11/2005 | Marangoni |
| 2006/0037892 A1 | 2/2006 | Blanc |
| 2006/0057187 A1 | 3/2006 | Eskuchen et al. |
| 2006/0057259 A1 | 3/2006 | Ripoll et al. |
| 2006/0153912 A1 | 7/2006 | Habich et al. |
| 2006/0198924 A1 | 9/2006 | Song et al. |
| 2006/0292281 A1 | 12/2006 | Kragh et al. |
| 2007/0082094 A1 | 4/2007 | McClements et al. |
| 2007/0278103 A1 | 12/2007 | Hoerr et al. |
| 2008/0026120 A1 | 1/2008 | Petcavich |
| 2008/0038471 A1 | 2/2008 | Boger et al. |
| 2008/0119772 A1 | 5/2008 | Coffee |
| 2008/0254987 A1 | 10/2008 | Liu et al. |
| 2008/0262190 A1 | 10/2008 | Koskimies et al. |
| 2008/0310991 A1 | 12/2008 | Webster et al. |
| 2009/0035414 A1 | 2/2009 | Cheng et al. |
| 2009/0042985 A1 | 2/2009 | Bhaggan et al. |
| 2009/0104446 A1 | 4/2009 | Guillet et al. |
| 2009/0123632 A1 | 5/2009 | Klemann et al. |
| 2009/0142453 A1 | 6/2009 | Lobisser et al. |
| 2009/0152371 A1 | 6/2009 | Stark et al. |
| 2009/0163729 A1 | 6/2009 | Li et al. |
| 2009/0224437 A1 | 9/2009 | Fukuoka et al. |
| 2009/0325240 A1 | 12/2009 | Daniell |
| 2010/0029778 A1 | 2/2010 | Bailey et al. |
| 2010/0092631 A1 | 4/2010 | Sardo |
| 2010/0104710 A2 | 4/2010 | Petcavich |
| 2010/0186674 A1 | 7/2010 | Cahill, Jr. et al. |
| 2010/0210745 A1 | 8/2010 | McDaniel |
| 2010/0278784 A1 | 11/2010 | Pojasek et al. |
| 2010/0292426 A1 | 11/2010 | Hossainv |
| 2010/0297273 A1 | 11/2010 | Lederman |
| 2011/0000975 A1 | 1/2011 | Gartstein et al. |
| 2011/0003014 A1 | 1/2011 | Kulikowski |
| 2011/0240064 A1 | 10/2011 | Wales |
| 2011/0244095 A1 | 10/2011 | Sardo |
| 2011/0280942 A1 | 11/2011 | Schad et al. |
| 2012/0003356 A1 | 1/2012 | Ekanayake et al. |
| 2012/0103790 A1 | 5/2012 | Krull et al. |
| 2012/0251675 A1 | 10/2012 | Sowa et al. |
| 2013/0045246 A1 | 2/2013 | Edwards et al. |
| 2013/0095141 A1 | 4/2013 | Schad et al. |
| 2013/0121648 A1 | 5/2013 | Hung et al. |
| 2013/0156970 A1 | 6/2013 | Crawford |
| 2013/0209617 A1 | 8/2013 | Lobisser et al. |
| 2013/0216488 A1 | 8/2013 | Hernandez-Brenes et al. |
| 2013/0280819 A1 | 10/2013 | Cooks et al. |
| 2013/0323378 A1 | 12/2013 | Stark et al. |
| 2014/0033926 A1 | 2/2014 | Passel et al. |
| 2014/0199449 A1 | 7/2014 | Hernandez et al. |
| 2014/0205722 A1 | 7/2014 | Quintanar Guerrero et al. |
| 2014/0221308 A1 | 8/2014 | Baker et al. |
| 2014/0234921 A1 | 8/2014 | Nyyssola et al. |
| 2014/0348945 A1 | 11/2014 | Dong et al. |
| 2014/0367478 A1 | 12/2014 | Roos et al. |
| 2014/0377434 A1 | 12/2014 | Oguro et al. |
| 2015/0021802 A1 | 1/2015 | Wakita |
| 2015/0030780 A1 | 1/2015 | Rogers |
| 2015/0079248 A1 | 3/2015 | Nussinovitch et al. |

(56) References Cited

U.S. PATENT DOCUMENTS

| | | |
|---|---|---|
| 2015/0210855 A1 | 7/2015 | Firth |
| 2015/0359217 A1 | 12/2015 | Narita et al. |
| 2015/0366230 A1 | 12/2015 | Malefyt et al. |
| 2016/0002483 A1 | 1/2016 | Zhao et al. |
| 2016/0100597 A1 | 4/2016 | Immaraju et al. |
| 2016/0213030 A1 | 7/2016 | Schad |
| 2016/0256429 A1 | 9/2016 | Spanova et al. |
| 2016/0304410 A1 | 10/2016 | Schultz et al. |
| 2016/0324172 A1 | 11/2016 | Williams et al. |
| 2017/0049119 A1 | 2/2017 | Perez et al. |
| 2017/0073532 A1 | 3/2017 | Perez et al. |
| 2017/0251673 A1 | 9/2017 | Cifuentes et al. |
| 2017/0318827 A1 | 11/2017 | Perez et al. |
| 2017/0320077 A1 | 11/2017 | Rogers |
| 2017/0332650 A1 | 11/2017 | Holland |
| 2018/0044276 A1 | 2/2018 | Perez et al. |
| 2018/0092811 A1 | 4/2018 | Klee |
| 2018/0179401 A1 | 6/2018 | Perez et al. |
| 2018/0222835 A1 | 8/2018 | Bakus et al. |
| 2018/0258296 A1 | 9/2018 | Perez et al. |
| 2018/0303732 A1 | 10/2018 | Wehner et al. |
| 2018/0317509 A1 | 11/2018 | Van Velzen et al. |
| 2018/0368426 A1 | 12/2018 | Holland et al. |
| 2018/0368427 A1 | 12/2018 | Rogers et al. |
| 2019/0031590 A1 | 1/2019 | Bakus |
| 2019/0104748 A1 | 4/2019 | Kaun et al. |
| 2019/0166901 A1 | 6/2019 | Rogers |
| 2019/0269144 A1 | 9/2019 | Kaun et al. |
| 2019/0269145 A1 | 9/2019 | Bakus, II et al. |
| 2019/0364916 A1 | 12/2019 | Jung et al. |
| 2020/0068912 A1 | 3/2020 | Hernandez |
| 2020/0085072 A1 | 3/2020 | Holland et al. |
| 2020/0085092 A1 | 3/2020 | Rogers |
| 2020/0093147 A1 | 3/2020 | Perez |
| 2020/0100514 A1 | 4/2020 | Bakus |
| 2020/0229455 A1 | 7/2020 | Perez |
| 2020/0352184 A1 | 11/2020 | Frazier et al. |
| 2020/0383343 A1 | 12/2020 | Rodriguez et al. |
| 2021/0282432 A1 | 9/2021 | Hernandez et al. |
| 2021/0337817 A1 | 11/2021 | Lee et al. |
| 2021/0340354 A1 | 11/2021 | Wang et al. |
| 2022/0039416 A1 | 2/2022 | Kaun et al. |
| 2022/0064859 A1 | 3/2022 | Hernandez et al. |
| 2022/0135510 A1 | 5/2022 | Bakus, II et al. |
| 2022/0312784 A1 | 10/2022 | Chari et al. |
| 2023/0072790 A1 | 3/2023 | Faust et al. |
| 2023/0098477 A1 | 3/2023 | Perez et al. |
| 2023/0232872 A1 | 7/2023 | Hernandez et al. |
| 2023/0380435 A1 | 11/2023 | Holland et al. |
| 2024/0008501 A1 | 1/2024 | Fisher et al. |
| 2024/0090389 A1 | 3/2024 | Fisher et al. |
| 2024/0130383 A1 | 4/2024 | Lin et al. |
| 2024/0156117 A1 | 5/2024 | Crisci et al. |
| 2024/0180180 A1 | 6/2024 | Essert et al. |
| 2024/0180181 A1 | 6/2024 | Essert |
| 2025/0024847 A1 | 1/2025 | Essert et al. |

FOREIGN PATENT DOCUMENTS

| | | | |
|---|---|---|---|
| CN | 1215420 | 4/1999 | |
| CN | 1355806 | 6/2002 | |
| CN | 1616561 | 5/2005 | |
| CN | 1817147 | 8/2006 | |
| CN | 1856261 | 11/2006 | |
| CN | 1870912 | 11/2006 | |
| CN | 101035926 | 9/2007 | |
| CN | 101356012 | 1/2009 | |
| CN | 101454406 | 6/2009 | |
| CN | 101708013 | 5/2010 | |
| CN | 101755899 | 6/2010 | |
| CN | 102119719 | 7/2011 | |
| CN | 102291986 | 12/2011 | |
| CN | 102335142 | 2/2012 | |
| CN | 102349555 | 2/2012 | |
| CN | 103283830 | 9/2013 | |
| CN | 103478233 | 1/2014 | |
| CN | 103609670 | 3/2014 | |
| CN | 103719261 | 4/2014 | |
| CN | 103734280 | 4/2014 | |
| CN | 104606076 | 5/2015 | |
| CN | 104642528 | 5/2015 | |
| CN | 105341619 | 2/2016 | |
| CN | 105494615 | 4/2016 | |
| CN | 106280909 | 1/2017 | |
| CN | 107828560 | 3/2018 | |
| CN | 107996698 | 5/2018 | |
| CN | 110255947 | 9/2019 | |
| CN | 112898630 | 6/2021 | |
| CN | 113038824 | 6/2021 | |
| DE | 2505428 | 8/1976 | |
| DE | 3017221 | 11/1980 | |
| DE | 3622191 | 1/1988 | |
| DE | 102005043459 | 3/2007 | |
| EP | 0104043 | 3/1984 | |
| EP | 0253539 | 1/1988 | |
| EP | 0655201 | 5/1995 | |
| EP | 1020124 | 7/2000 | |
| EP | 1681281 | 7/2006 | |
| EP | 1721524 A1 | 11/2006 | |
| EP | 1854360 | 11/2007 | |
| EP | 2389814 | 11/2011 | |
| EP | 2644185 | 10/2013 | |
| EP | 2684879 | 1/2014 | |
| EP | 2889345 | 7/2015 | |
| EP | 3354264 | 8/2018 | |
| EP | 3673738 A1 | 7/2020 | |
| ES | 1041955 | 8/1999 | |
| GB | 421649 | 12/1934 | |
| IN | 192832 | 5/2004 | |
| JP | S54-139645 | 10/1979 | |
| JP | S58-034034 | 2/1983 | |
| JP | S58-89140 | 5/1983 | |
| JP | S62-126931 | 6/1987 | |
| JP | S63-062574 | 3/1988 | |
| JP | H04-016173 | 1/1992 | |
| JP | H04-507192 | 12/1992 | |
| JP | H06-506166 | 7/1994 | |
| JP | H07-075519 | 3/1995 | |
| JP | H08-056564 | 3/1996 | |
| JP | 2519455 | 7/1996 | |
| JP | H10-298003 | 11/1998 | |
| JP | 2002-531075 | 9/2002 | |
| JP | 2003-522130 | 7/2003 | |
| JP | 2004-526830 | 9/2004 | |
| JP | 3835956 | 10/2006 | |
| JP | 2007-502271 | 2/2007 | |
| JP | 2007-510014 | 4/2007 | |
| JP | 2008-504442 | 2/2008 | |
| JP | 2009-527357 | 7/2009 | |
| JP | 2010-530795 | 9/2010 | |
| JP | 2012-087072 | 5/2012 | |
| JP | 2012-515561 | 7/2012 | |
| JP | 2013-139433 | 7/2013 | |
| JP | 2014-231481 | 12/2014 | |
| JP | 2018-529627 | 10/2018 | |
| JP | 2018-534912 | 11/2018 | |
| KR | 10-1419385 | 7/2014 | |
| SU | 514588 | 5/1976 | |
| WO | 1982/003173 | 9/1982 | |
| WO | 93/06735 | 4/1993 | |
| WO | WO-0009138 A1 * | 2/2000 | ................ A23J 7/00 |
| WO | 2001/001980 | 1/2001 | |
| WO | 2004/030455 | 4/2004 | |
| WO | 2007/100654 | 9/2007 | |
| WO | 2008/142393 | 11/2008 | |
| WO | 2009/119730 | 10/2009 | |
| WO | 2010/031929 | 3/2010 | |
| WO | 2011/014831 | 2/2011 | |
| WO | 2012/042404 | 4/2012 | |
| WO | 2012/164561 | 12/2012 | |
| WO | 2012/173262 | 12/2012 | |
| WO | 2014/162238 | 10/2014 | |
| WO | 2014/206911 | 12/2014 | |
| WO | 2015/017450 | 2/2015 | |

(56) References Cited

FOREIGN PATENT DOCUMENTS

| WO | 2015/028299 | 3/2015 |
|---|---|---|
| WO | 2015/052433 | 4/2015 |
| WO | 2015/074144 | 5/2015 |
| WO | 2015/176020 | 11/2015 |
| WO | 2016/168319 | 10/2016 |
| WO | 2016/187581 | 11/2016 |
| WO | 2017/043972 | 3/2017 |
| WO | 2017/048951 | 3/2017 |
| WO | 2017/100636 | 6/2017 |
| WO | 2017/132281 | 8/2017 |
| WO | 2017/172951 | 10/2017 |
| WO | 2018/009846 | 1/2018 |
| WO | 2018/042435 | 3/2018 |
| WO | 2018/094269 | 5/2018 |
| WO | WO 2018/144482 | 8/2018 |
| WO | 2019/058211 | 3/2019 |
| WO | 2019/096844 | 5/2019 |
| WO | WO 2020/051238 | 3/2020 |
| WO | WO 2020/247667 | 12/2020 |
| WO | WO 2021/178553 | 9/2021 |

OTHER PUBLICATIONS

Soy lecithin phytosterol ( EFSA Journal / vol. 5, Issue 6 / 486: First published: Jun. 6, 2007 https://doi.org/10.2903/j.efsa.2007.486 ) (Year: 2007).*
PCT International Search Report and Written Opinion in International Appln. No. PCT/US2021/044535, mailed Nov. 17, 2021, 16 pages.
PCT International Search Report and Written Opinion in International Appln. No. PCT/US2021/048301, mailed Dec. 7, 2021, 12 pages.
PCT International Search Report and Written Opinion in PCT/US18/46998, Dec. 27, 2018, 31 pages.
PCT International Search Report and Written Opinion in PCT/US2014/048707, Nov. 13, 2014, 14 pages.
PCT International Search Report and Written Opinion in PCT/US2017/024799, Jun. 8, 2017, 13 pages.
PCT International Search Report and Written Opinion in PCT/US2017/041167, Oct. 9, 2017, 16 pages.
PCT International Search Report and Written Opinion, PCT Application No. PCT/US16/33617, Aug. 26, 2016, 20 Pages.
PCT International Search Report and Written Opinion, PCT Application No. PCT/US17/62399, Feb. 16, 2018, 16 Pages.
PCT International Search Report and Written Opinion, PCT Application No. PCT/US2018/46994, Dec. 20, 2018, 28 pages.
PCT Invitation to Pay additional Fees and, Where Applicable, Protest Fee in International Appln. No. PCT/US2018/046994, mailed Oct. 23, 2018, 2 pages.
Perkins et al., "Ultrasonic fog application of organic acids delays postharvest decay in red bayberry," Postharvest Biology and Technology, Nov. 2017, 13:41-47.
Postharvest.ucdavis.edu [online], "Fact Sheets," available on or before Aug. 9, 2016, via Internet Archive: Wayback Machine URL <https://web.archive.org/web/20160809075048/http://postharvest.ucdavis.edu/Commodity_Resources/Fact_Sheets/>, retrieved on Aug. 16, 2021, URL <http://postharvest.ucdavis.edu/Commodity_Resources/Fact_Sheets/>, 3 pages.
Quiros-Sauceda et al., "Edible coatings as encapsulating matrices for bioactive compounds: a review," Journal of Food Science and Technology, Jan. 2014, 51(9), pp. 1674-1685, 12 pages.
Rahman et al., "The Effect of a New Coating on the Drying Performance of Fruit and Vegetables Products: Experimental Investigation and Artificial Neural Network Modeling," Foods, Mar. 2020, 9(3), 308, 1-13.
Ramsay, "The Evaporation of Water from the Cockroach," Journal of Experimental Biology, Oct. 1935, 12 (4):373-383.
Roy, S. et al., "Modified atmosphere and modified humidity packaging of fresh mushrooms," J Food Sci., 1996, vol. 61, p. 391-397.

Rujun et al., "Surface Modification and Physical properties of Inorganic Nanomaterials," University of Technology Press, 1st Edition, Oct. 2009, 43-45, 11 pages (with English translation).
Rutala, W. et al., "Guideline for Disinfection and Sterilization in Healthcare Facilities, 2008," CDC, 2008, 158 Pages.
Sasaki, M. et al., "Cellulose hydrolysis in subcritical and supercritical water," Journal of Supercritical Fluids, 1998, vol. 13, pp. 261-268.
Sasaki, M. et al., "Dissolution and Hydrolysis of Cellulose in Subcritical and Supercritical Water," Ind. Eng. Chem. Res., 2000, vol. 39, pp. 2883-2890.
Savage, P., "Organic Chemical Reactions in Supercritical Water," Chem. Rev., 1999, vol. 99, pp. 603-621.
Schreiber et al., "Transport barriers made of cutin, suberin and associated waxes," Trends in Plant Science, 2010, vol. 15, No. 10, p. 546-553.
Schweizer, P. et al., "Perception of free cutin monomers by plant cells," The Plant Journal, vol. 10, No. 2, 1996, p. 331-341.
Schweizer, P. et al., "Plant Protection by Free Cutin Monomers in Two Cereal Pathosystems," Advances in Molecular Genetics of Plant-Microbe Interactions, 1994, p. 371-374.
Shirazi A, et al., "Controlling relative humidity in modified atmosphere packages of tomato fruit," HortScience, 1992, vol. 27, p. 336-339.
Siekmann et al., "Preparation and structural investigations of colloidal dispersions prepared from cubic monoglyceride-water phases," Int. J. Pharm., Sep. 2002, 244(1-2):33-43.
Spicer et al., "Novel Process for Producing Cubic Liquid Crystalline Nanoparticles (Cubosomes)," Langmuir, Aug. 2001, 17(19):5748-5756.
Steuter et al., "Water Potential of Aqueous Polyethylene Glycol," Plant Physiol., 1981, vol. 67, p. 64-67.
Storage and Preservation Techniques for Fruits and Vegetables, 1st ed., Scientific Research Achievements Management Office of the State Science and Technology Commission, Oct. 31, 1985, 40, 3 pages (with English translation).
Takats, Z., et al., "Special Feature: Perspective—Ambient Mass Spectrometry Using Desorption Electrospray Ionization (DESI): Instrumentation, Mechanisms and Applications in Forensics, Chemistry, and Biology," J. Mass Spectrom, 2005, vol. 40, pp. 1261-1275.
Tanaka, M., et al., "Quantitative determination of isomeric glycerides, free fatty acids and triglycerides by thin layer chromatography-flame ionization detector system." Lipids, 1980, vol. 15, No. 10, pp. 872-875.
Technical Evaluation Report, "Glycerides (mono and di) Handling/Processing," Compiled by OMRI for the USDA National Organic Program, Jan. 27, 2015, 1-14.
Tegelaar, E.W. et al., "Some mechanisms of flash pyrolysis of naturally occurring higher plant polyesters," Journal of Analytical and Applied Pyrosis, 1989, vol. 15, 2 pages (abstract only).
The Fountainhead Group, Inc., "Burgess Electric Professional Fogger," Manual No. 161128, Revision D, Feb. 25, 2015, retrieved on Jan. 12, 2021, retrieved from URL <https://www.jondon.com/media/pdf/manuals/FG-EGF-EA_manual.pdf>, 8 pages.
Toro-Vazquez et al., "Physical properties of organogels and water in oil emulsions structured by mixtures of candelilla wax and monoglycerides," Food Research International, Oct. 2013, 54(2):1360-1368.
TW Search Report in Taiwan Appln. No. 105130215, dated Aug. 6, 2020, 12 pages (with English translation).
United States Environmental Protection Agency, "Containers and Packaging: Product-Specific Data," Nov. 6, 2019, last updated Jan. 28, 2021, retrieved on Oct. 6, 2021, retrieved from URL <https://www.epa.gov/facts-and-figures-about-materials-waste-and-recycling/containers-and-packaging-product-specific-data>, 12 pages.
US Statutory Invention Registration No. H1591, Preparation of Flavor-Enhanced Reduced Calorie Fried Foods, Sep. 3, 1996, 5 pages.
Van Doorn et al., "Alkylethoxylate surfactants for rehydration of roses and Bouvardia flowers," Postharvest Biology and Technology, 2002, vol. 24, p. 327-333.

(56) References Cited

OTHER PUBLICATIONS

Van Doorn et al., "Effects of surfactants on the longevity of dry-stored cut flowering stems of rose, Bouvardia, and Astilbe," Postharvest Biology and Technology, 1993, vol. 3, pp. 69-76.
Van Meeteren, "Water Relations and Keeping-Quality of Cut Gerbera Flowers. I. The Cause of Stem Break," Scientia Horticulturae, 1978, vol. 8, p. 65-74.
Vardar et al., "The application of various disinfectants by fogging for decreasing postharvest diseases of strawberry," Postharvest Biology and Technology, Apr. 2012, 66:30-34.
Vargas et al., "Development of Edible Coatings for Fresh Fruits and Vegetables: Possibilities and Limitations," Fresh Produce, Jan. 2008, 2(2):32-40.
Wang, R. et al., "Evolution of the Solvent Polarity in an Electrospray Plume," J. Am Soc Mass Spectrom, 2010, vol. 21, pp. 378-385.
Watkins, "The Use of 1-Methylcyclopropene (1-MCP) on Fruits and Vegetables," Biotech. Adv., Jul.-Aug. 2006, 24(4):389-409.
Weingartner, H. et al., "Supercritical water as a solvent," Angewandte Chemie, 2005, vol. 44, Issue 18, pp. 2672-2692.
Wikipedia, Anonymous, "Paint-Wikipedia," retrieved from URL <https://en.wikipedia.org/w/index.php?title=Paint&oldid=563291624>, retrieved Jul. 2013, 7 Pages.
Xizhong et al., "Spray drying," the 2nd edition, Chemical Industry Press, Feb. 28, 2003, 147-151, 9 pages.
Yang et al., "Progress on Graft Polymerization of Cellulose," Journal of Cellulose Science and Technology, Sep. 2009, 17(3), 6 pages (with English abstract).
Yeats, T. et al., "The identification of cutin synthase: formation of the plant polyester cutin," Nat Chem Biol., Jul. 2012, vol. 8, No. 7, pp. 609-611, 10 pages.
Adkins et al., "Manipulating Avocado Fruit Ripening with 1-Methylcyclopropene," Postharvest Biol. Technol., Jan. 2005, 35(1):33-42.
Alvaro, J. et al., "Effects of peracetic acid disinfectant on the postharvest of some fresh vegetables," Journal of Food Engineering, 2009, vol. 95, pp. 11-15.
Alvira et al., "Pretreatment Technologies for an Efficient Bioethanol Production Process Based on Enzymatic Hydrolysis: A Review," Bio resource Technology, 2010, 101(13):4851-4861.
Andrade, Ricardo D. et al., "Atomizing spray systems for application of edible coatings," Comprehensive Reviews in Food Science and Food Safety, vol. 11, No. 3, 2012, p. 323-337.
Angelico et al., "Phase Diagram and Phase Properties of the System Lecithin-Water-Cyclohexane," Langmuir, 2000, 16(5):2124-2132.
Ayala-Zavala, J.F. et al., "High Relative Humidity In-Package of Fresh-Cut Fruits and Vegetables: Advantage or Disadvantage Considering Microbiological Problems and Antimicrobial Delivering Systems?," J Food Science, 2008, vol. 73, p. R41-R47.
Baker et al., "Cutin Degradation by Plant Pathogenic Fungi," The American Phytopathological Society, May 15, 1978, 68:1577-1584.
Baldwin et al., "Edible Coatings for Lightly Processed Fruits and Vegetables," HortScience, Feb. 1995, 30(1):35-38.
Banerjee, S. et al., "Review Article: Electrospray Ionization Mass Spectrometry: A Technique to Access the Information Beyond the Molecular Weight of the Analyte," International Journal of Analytical Chemistry, Nov. 2011, vol. 2012, Article ID 282574, 40 pages.
Bateman, A. et al., "The Effect of Solvent on the Analysis of Secondary Organic Aerosol Using Electrospray Ionization Mass Spectrometry," Environ. Sci. Technol., 2008, vol. 42, No. 19, pp. 7341-7346.
Bateman, A., et al., "Supporting Information for Manuscript es-2008-01226w—The Effect of Solvent on the Analysis of Secondary Organic Aerosol Using Electrospray Ionization Mass Spectrometry," [online] 2008; available from the Internet URL: http://aerosol.chem.uci.edu/publications/Irvine/2008.sub.-Bateman.sub.-EST.sub.--SOA.sub.-solvent.sub.-effects.sub.--supporting.sub.-info.pdf, 6 pages.
Bell et al., "The activity of (S)-hydroprene space spray against three stored products pests in a simulated food production environment," Journal of Stored Products Research, Apr. 1999,35(2):117-126.
Ben-Yehoshua, S. et al., "Modified-atmosphere packaging of fruits and vegetables: reducing condensation of water in bell peppers and mangoes," Acta Hort (ISHS), 1998, vol. 464, 387-392.
Berge et al., "Pharmaceutical Salts," J. Pharm. Sci., Jan. 1977, 66(1):1-19.
Bewick, T. et al., "Evaluation of Epicuticular Wax Removal from Whole Leaves with Chloroform," Weed Technology, Jul. 1993, vol. 7, No. 3, pp. 706-716.
Bourtoom, T., "Edible films and coatings: characteristics and properties," International Food Research Journal, 2008, vol. 15, No. 3, pp. 237-248, 13 pages.
Brunk et al., "HyphaTracker: An ImageJ toolbox for time-resolved analysis of spore germination in filamentous fungi," Scientific Reports, Jan. 2018, 8(605):1-13.
Cantwell, M., "Properties and recommended conditions for long-term storage of fresh fruits and vegetables," Nov. 2001, 8 Pages.
Cech, N., et al., "Practical Implications of Some Recent Studies in Electrospray Ionization Fundamentals," Mass Spectrometry Reviews, 2001, vol. 20, pp. 362-387.
Chen, D-R., et al., "Electrospraying of Conducting Liquids for Monodisperse Aerosol Generation in the 4 nm to 1.8. mu.m Diameter Range," J. Aerosol Sci., 1995, vol. 26, No. 6, pp. 963-977.
Cochran, H.D., "Solvation in supercritical water," Fluid Phase Equilibria, 1992, vol. 71, pp. 1-16.
Cook et al., "The use of trifluoroacetic anhydride in the synthesis of glycerides," Journal of Chemical Society, 1965, 4594-4596.
Dao et al., "Control of Food Spoilage Fungi by Ethanol," Food Control, Mar. 2011, 22(3-4):360-368.
D'Aquino et al., "Postharvest Lecithin Application Improves Storability of 'Primosole' Pomegrantes," Acta Horticulturae, Jun. 2012, 934:733-739.
Deell JR et al., "Addition of sorbitol with KMnO4 improves broccoli quality retention in modified atmosphere packages," J Food Oual, 2006, vol. 29, p. 65-75.
Dhall, "Advances in edible coatings for fresh fruits and vegetables: a review," Crit. Rev. Food Sci. Nutr., 2013, 53(5), pp. 435-450.
Dinani et al., "Optimization of Carboxymethyl Cellulose and Calcium Chloride Dip-Coating on Mushroom Slices Prior to Hot Air Drying Using Response Surface Methodology," Journal of Food Processing and Prevention, Jun. 2014, 38(3):1269-1278.
Duoren et al., "Green Plasticizers," Scientific and Technological Literature Publishing House, the 1st Edition, Oct. 2011, 339-340, 7 pages (with English translation).
Elgimabi and Ahmed, "Effects of Bactericides and Sucrose-Pulsing on Vase Life of Rose Cut Flowers (*Rosa hybirida*)," Botany Research International, 2009, 2(3) p. 164-168.
Enke, C., "A Predictive Model for Matrix and Analyte Effects in Electrospray Ionization of Singly-charged Ionic Analytes," Analytical Chemistry, 1997, vol. 69, No. 23, pp. 4885-4893.
Extended European Search Report for European Patent Application No. EP 14831592.2, Mar. 2, 2017, 9 Pages.
Extended European Search Report in European Patent Appln. No. EP 19857630.8, dated May 20, 2022, 9 pages.
Gabler, M., et al., "Impact of Postharvest Hot Water or Ethanol Treatment of Table Grapes on Gray Mold Incidence, Quality, and Ethanol Content," Plant Disease, Mar. 2005, vol. 89, No. 3, pp. 309-316.
Gaskell, S., "Special Feature: Tutorial—Electrospray: Principles and Practice," J. Mass Spectrom, 1997, vol. 32, pp. 677-688.
Gibbs, "Water-Proofing Properties of Cuticular Lipids," American Zoologist, Jun. 1998, 38(3):471-482.
Gil, M. et al., "Fresh-cut product sanitation and wash water disinfection: Problems and solutions," International Journal of Food Microbiology, 2009, vol. 134, pp. 37-45.
Graca, "Suberin: the biopolyester at the frontier of plants," Frontiers in Chemistry, Oct. 2015, 3(62):1-11.
Graca, J. et al., "Glycerol and glyceryl esters of o-hydroxyacids in cutins," Phytochemistry, 2002, vol. 61, pp. 205-215.
Graca, J. et al., "Linear and branched poly (omega-hydroxyacid) esters in plant cutins," J. Agric. Food Chem., 2010, vol. 58, No. 17, pp. 9666-9674.

(56) References Cited

OTHER PUBLICATIONS

Hardenburg, R., et al., "The Commercial Storage of Fruits, Vegetables, and Florist and Nursery Stocks," United States Department of Agriculture, Agriculture Handbook No. 66, Sep. 1986, pp. 6-7, 30, 50-51.

Hauff, S. et al., "Determination of hydroxylated fatty acids from the biopolymer of tomato cutin and their fate during incubation in soil," Phytochemical Analysis, Aug. 26, 2010, vol. 21, No. 6, pp. 582-589.

He et al., "Stem end blockage in cut Grevillea 'Crimson Yul-lo' inflorescences," Postharvest Biology and Technology, 2006, vol. 41, p. 78-84.

Herrero et al., "Compressed fluids for the extraction of bioactive compounds," TrAC Trends in Analytical Chemistry, 2013, 43(1):67-83.

Hoa et al., "Effects of different coatings on biochemical changes of 'cat Hoa loc' mangoes in storage," Postharvest Biology and Technology, Nov. 2007, 48(1):150-152.

Hofmann et al., "The behavior and solubility of monoglycerides in dilute, micellar bile-salt solution," BBA—Specialised Section on Lipids and Related Subjects, Jan. 1963, 70:306-316.

Hojjati et al., "Chemical Treatments of Eustoma Cut Flower Cultivars for Enhanced Vase Life," Journal of Agriculture and Social Sciences, 2007, vol. 3, No. 3, p. 75-78.

Holcroft, D., "Water Relations in Harvested Fresh Produce," PEF White Paper No. 15-01, The Postharvest Education Foundation (PEF), May 2015, 16 Pages.

Hongyou, "Homemade Fruit and Vegetable Coating Preservative," Vegetables, Nov. 30, 2005, p. 39, 2 pages (with English translation).

Hoover et al., "The Effect of Monoglycerides on Amylose Complexing During a Potato Granule Process," Starch-Sta RKE, Oct. 1981, 33(10):346-355.

Huang et al., "Automation of a Fourier transform ion cyclotron resonance mass spectrometer for acquisition, analysis, and e-mailing of high-resolution exact-mass electrospray ionization mass spectral data," Journal of the American Society for Mass Spectrometry, Nov. 1, 1999, 10(11):1166-1173.

Huang, T-Y., et al., "Electron Transfer Reagent Anion Formation via Electrospray Ionization and Collision-induced Dissociation," Anal Chem., 2006, vol. 78, No. 21, pp. 7387-7391, 9 pages.

Hudson, B., "Fatty Acids," Encyclopedia of Food Sciences and Nutrition (Second Edition), 2003, pp. 2297-2300.

International Search Report and Written Opinion in International Appln. No. PCT/US2021/057448, mailed Feb. 18, 2022, 17 pages.

International Search Report and Written Opinion in International Appln. No. PCT/US2022/042924, mailed Dec. 9, 2022, 18 pages.

International Search Report and Written Opinion in International Appln. No. PCT/US2022/043079, mailed Dec. 6, 2022, 15 pages.

Javad et al., "Effect of Cultivar on Water Relations and Postharvest Quality of Gerbera (*Gerbera jamesonii* Bolus ex. Hook f.) Cut Flower," World Applied Sciences Journal, 2012, vol. 18, No. 5, p. 698-703.

Javad et al., "Postharvest evaluation of vase life, stem bending and screening of cultivars of cut gerbera (*Gerberajamesonii* Bolux ex. Hook f.) flowers," African Journal of Biotechnology 2011, 10(4), p. 560-566.

Jaworek, A., "Electrospray Droplet Sources for Thin Film Deposition," J. Mater Sci, 2007, vol. 42, pp. 266-297.

Jenkins, S. et al., "Isolation and Compositional Analysis of Plant Cuticle Lipid Polyester Monomers," Journal of Visualized Experiments, 105 e53386, 10 pages, URL: https://www.jove.com/video/53386.

Jensen et al., "Estimation of the Monoglyceride Content of Milk," Journal of Dairy Science, 1959, 42(2):232-239.

Jerome, F., et al., ""One pot" and selective synthesis of monoglycerides over homogeneous and heterogeneous guanidine catalysts," Green Chem., 2004, vol. 6, pp. 72-74.

Jiabin, "Rubberized fabrics and products thereof," World Rubber Industry, Dec. 2000, 6:27-32, 24 pages (with English translation).

Jingmei et al., "Preparation of modified starch/polylactic acid bleeds," New Chemical Materials, Jun. 2011, 39(6):125-126 and 129 (with English abstract).

Jones et al., "Pulsing with Triton X-100 Improves Hydration and Vase Life of Cut Sunflowers (*Helianthus annuus* L.)," HortScience, 1993, vol. 28, No. 12, p. 1178-1179.

Karabulut, O. et al., "Postharvest ethanol and hot water treatments of table grapes to control gray mold," Postharvest Biology and Technology, 2004, vol. 34, pp. 169-177.

Kebarle, P., "Special Feature: Commentary—A Brief Overview of the Present Status of the Mechanisms Involved in Electrospray Mass Spectrometry," J. Mass Spectrom, 2000, vol. 35, pp. 804-817.

Keller, B., et al., "Review Article: Interferences and Contaminants Encountered in Modern Mass Spectrometry," Analytica Chimica Acta, 2008, vol. 627, pp. 71-81.

Khan et al., "Application of Edible Coating for Improving Meat Quality: A Review," Pakistan Journal of Food Sciences, 2013, 23(2):71-79.

Kolattukudy, P.E., "BiopolyesterMembranes of Plants: Cutin and Suberin," Science, 1980, vol. 208, No. 4447, pp. 990-1000.

Kolattukudy, P.E., "Cutin from plants," Biopolymers Online, 3a, 2005, 40 pages.

Krammer, P., et al., "Hydrolysis of esters in subcritical and supercritical water," Journal of Supercritical Fluids, 2000, vol. 16, pp. 189-206.

Krog et al., "Phase behaviour and rheological properties of aqueous systems of industrial distilled monoglycerides," Chemistry and Physics of Lipids, Feb. 1968, 2(1):129-143.

Kroll, B., et al., "Review: Chemistry of Secondary Organic Aerosol: Formation and Evolution of Low-volatility Organics in the Atmosphere," Atmospheric Environment, 2008, vol. 42, pp. 3593-3624.

Kubo et al., "Modes of antifungal action of alkanols against *Saccharomyces cerevisiae*," Bioorganic & Medicinal Chemistry, Mar. 2003, 11(6):1117-1122.

Kubo et al., "Structural functions of antimicrobial long-chain alcohols and phenols," Bioorganic & Medicinal Chemistry, Jul. 1995, 3(7):873-880.

Kulkarni et al., "Natural Polymers—A comprehensive review," International Journal of Research in Pharmaceutical and Biomedical Sciences, Dec. 2012, 3(4):1597-1613.

kumitasu.com [online], "About fruit wax and chenpi," Jul. 26, 2015, retrieved on Aug. 16, 2021, retrieved from URL <https://web.archive.org/web/20160409110129/https://www.kumitasu.com/contents/hyoji/806>, 5 pages (with machine translation).

Li, M., et al., "Direct Quantification of Organic Acids in Aerosols by Desorption Electrospray Ionization Mass Spectrometry," Atmospheric Environment, 2009, vol. 43, pp. 2717-2720.

Lin et al., "Innovations in the Development and Application of Edible Coatings for Fresh and Minimally Processed Fruits and Vegetables," Compr. Rev. Food Sci. Food Saf., Jun. 2007, 6(3):60-75.

Loppinet-Serani, A et al., "Supercritical water for environmental technologies," J Chem Technol Biotechnol, Jan. 12, 2010, vol. 85, pp. 583-589.

Martin, "Preparation of Saturated and Unsaturated Symmetrical Monoglycerides," Journal of American Chemical Society, Jun. 1953, 75(20):5482-5483.

Matic, M., "The chemistry of Plant Cuticles: a study of cutin form *Agave americana* L.," Biochemical Journal, 1956, vol. 63, No. 1, pp. 168-176.

Mattson, F.H., et al., "Synthesis and properties of glycerides," J Lipid Research, Jul. 1962, vol. 3, No. 3, pp. 281-296.

Meihu et al., "Research on Coating of Preserved Egg for Quality-keeping and Fresh-keeping," Wan Fang, Aug. 2007, 17 pages (with English translation).

Morton, H., "The Relationship of Concentration and Germicidal Efficiency of Ethyl Alcohol," Annals New York Academy of Sciences, 53(1), 1950, pp. 191-196.

Mukherjee et al., "Antibacterial activity of long-chain fatty alcohols against mycobacteria," FEMS Microbiol. Lett., Jan. 2013, 338(2):177-183.

(56) References Cited

OTHER PUBLICATIONS

Nemoto et al., "Polyols of a cascade type as a water-solubilizing element of carborane derivatives for boron neutron capture therapy," The Journal of Organic Chemistry, Jan. 1992, 57(2):435.
Nizkorodov, S. et al., "Molecular Chemistry of Organic Aerosols through the Application of High Resolution Mass Spectrometry," Phys. Chem. Chem. Phys, 2011, vol. 13, pp. 3612-3629.
Oh, D. et al., "Antimicrobial activity of ethanol, glycerol monolaurate or lactic acid against Listeria monocytogenes," International Journal of Food Microbiology, 1993, vol. 20, pp. 239-246.
Olmez, H. et al., "Potential alternative disinfection methods for organic fresh-cut industry for minimizing water consumption and environmental impact," LWT—Food Science and Technology, 2009, vol. 42, pp. 686-693.
Orts et al., "Edible Films and Coatings: Why, What, and How?," Edible Films and Coatings for Food Applications, 2009, Chapter 1:1-23.
Osman, S. F. et al., "Preparation, Isolation, and Characterization of Cutin Monomers and oligomers from Tomato Peels," J. Agric, Food Chem, 1999, vol. 47, No. 2, pp. 799-802.
PCT International Search Report and Written Opinion for PCT/US2016/051936, Jan. 31, 2017, 18 Pages.
PCT International Search Report and Written Opinion for PCT/US2016/065917, Mar. 9, 2017, 10 Pages.
PCT International Search Report and Written Opinion for PCT/US2017/014978, Apr. 10, 2017, 13 Pages.
PCT International Search Report and Written Opinion in International Appln. No. PCT/US2019/042693, dated Oct. 2, 2019, 8 pages.
PCT International Search Report and Written Opinion in International Appln. No. PCT/US2019/045784, mailed Oct. 22, 2019, 14 pages.
PCT International Search Report and Written Opinion in International Appln. No. PCT/US2019/049585, mailed Jan. 13, 2020, 14 pages.
PCT International Search Report and Written Opinion in International Appln. No. PCT/US2020/036174, dated Sep. 7, 2020, 32 pages.
PCT International Search Report and Written Opinion in International Appln. No. PCT/US2021/020692, mailed Jun. 1, 2021, 13 pages.
Zhu, J. et al., "Focus: Electrospray—Formation and Decompositions of Chloride Adduct Ions, [M + Cl], in Negative Ion Electrospray Ionization Mass Spectrometry," J. Am Soc Mass Spectrom, 2000, vol. 11, pp. 932-941.
Zhu, J. et al., "Ranking of a Gas-phase Acidities and Chloride Affinities of Monosaccharides and Linkage Specificity in Collision-induced Decompositions of Negative Ion Electrospray-generated Chloride Adducts of Oligosaccharides," J. Am Soc Mass Spectrom, 2001, vol. 12, pp. 1193-1204.
Baldwin et al., "Use of Lipids in Coatings for Food Products," Food Technology, Jun. 1997, 51(6): 56-61, 8 pages.
Czajka et al., "Surfactants at the Design Limit," Langmuir, Mar. 2015, 31(30):8205-8217.
Mulqueen et al., "Prediction of Equilibrium Surface Tension and Surface Adsorption of Aqueous Surfactant Mixtures Containing Zwitterionic Surfactants," Langmuir, Sep. 2000, 16(20):7640-7654.
wikipedia.org [online], "Coffee ring effect," retrieved from URL <https://en.wikipedia.org/wiki/Coffee_ring_effect>, retrieved Dec. 29, 2023, 6 pages.
CAS No. 1286686-34-7, "Sunflower Wax," Koster Keunen, retrieved on Feb. 5, 2024, retrieved from URL <https://www.kosterkeunen.com/waxes/sunflower-wax/>, 3 pages.
CAS No. 8006-40-4, "BEESWAX," Chemical Book, retrieved on Feb. 5, 2024, retrieved from URL <https://www.chemicalbook.com/CASEN_8006-40-4.htm>, 3 pages.
CAS No. 8006-44-8, "Candelilla wax," Sigma-Aldrich, retrieved on Feb. 5, 2024, retrieved from URL <https://www.sigmaaldrich.com/US/en/product/aldrich/432288>, 4 pages.
CAS No. 8012-89-3, "Bee's Wax," Chemical Book, retrieved on Feb. 5, 2024, retrieved from URL <https://www.chemicalbook.com/ProductChemicalPropertiesCB9684201_EN.htm>, 3 pages.
CAS No. 8015-86-9, "Carnauba Wax," Sigma-Aldrich, retrieved on Feb. 5, 2024, retrieved from URL <https://www.sigmaaldrich.com/US/en/product/usp/1096860>, 4 pages.
community.jmp.com [online], "Designing Mixture Experiments—Part 1," Sep. 19, 2022, retrieved on Feb. 5, 2024, retrieved from URL <https://community.jmp.com/t5/Mastering-JMP/Designing-Mixture-Experiments-Part-1/ta-p/546086/redirect_from_archived_page/true>, 7 pages.
Desai et al., "Melt granulation: An alternative to traditional granulation techniques," Indian Drugs, Mar. 2013, 50(3):5-13, 10 pages.
International Search Report and Written Opinion in International Appln. No. PCT/US2023/033480, mailed Feb. 1, 2024, 18 pages.
Shanmugam, "Granulation techniques and technologies: recent progresses," BioImpacts, Feb. 2015, 5(1):55-63.
Bourlieu-Lacanal et al., "Edible Moisture Barriers: Materials, Shaping Techniques and Promises in Food Product Stabilization," Food Materials Science: Principles and Practice, Jan. 2007, retrieved from URL <https://hal.archives-ouvertes.fr/hal-01454497/document>, 38 pages.
Kester et al., "Edible Films and Coatings: A Review Further Research is Needed for Edible Films and Coatings to Help Sustain Product Freshness and Microbial Stability," Food Technology, Dec. 1986, 40(12):47-59.

\* cited by examiner

COMPOUNDS AND FORMULATIONS FOR PROTECTIVE COATINGS

CROSS REFERENCE TO RELATED APPLICATION

This application claims priority to U.S. Provisional Application Ser. No. 63/241,991, filed on Sep. 8, 2021, the disclosure of which is incorporated by reference in its entirety.

TECHNICAL FIELD

This invention relates to protective coatings for agricultural products and methods of application and use thereof.

BACKGROUND

Common agricultural products are susceptible to degradation and decomposition (e.g., spoilage) when exposed to the environment. Such agricultural products can include, for example, eggs, fruits, vegetables, produce, seeds, nuts, flowers, and/or whole plants (including their processed and semi-processed forms). Edible non-agricultural products (e.g., vitamins, candy, etc.) can also be vulnerable to degradation when exposed to the ambient environment. The degradation of agricultural and other edible products can occur via abiotic means as a result of evaporative moisture loss from an external surface of the products to the atmosphere, oxidation by oxygen that diffuses into the products from the environment, mechanical damage to the surface, and/or light-induced degradation (e.g., photodegradation). Biotic stressors such as bacteria, fungi, viruses, and/or pests can also infest and decompose the products.

The cells that form the aerial surface of most plants (such as higher plants) include an outer envelope or cuticle, which provides varying degrees of protection against water loss, oxidation, mechanical damage, photodegradation, and/or biotic stressors, depending upon the plant species and the plant organ (e.g., fruit, seeds, bark, flowers, leaves, stems, etc.). Cutin, which is a biopolyester derived from cellular lipids, forms the major structural component of the cuticle and serves to provide protection to the plant against environmental stressors (both abiotic and biotic). The thickness, density, as well as the composition of the cutin (i.e., the different types of monomers that form the cutin and their relative proportions) can vary by plant species, by plant organ within the same or different plant species, and by stage of plant maturity. The cutin-containing portion of the plant can also contain additional compounds (e.g., epicuticular waxes, phenolics, antioxidants, colored compounds, proteins, polysaccharides, etc.). This variation in the cutin composition as well as the thickness and density of the cutin layer between plant species, plant organs and/or a given plant at different stages of maturation can lead to varying degrees of resistance between plant species or plant organs to attack by environmental stressors (i.e., water loss, oxidation, mechanical injury, and light) and/or biotic stressors (e.g., fungi, bacteria, viruses, insects, etc.).

Conventional approaches to preventing degradation, maintaining quality, and increasing the life of agricultural products include special packaging and/or refrigeration. Refrigeration requires capital-intensive equipment, demands constant energy expenditure, can cause damage or quality loss to the product if not carefully controlled, must be actively managed, and its benefits are lost upon interruption of a temperature-controlled supply chain. Produce mass loss (e.g., water loss) during storage increases humidity, which necessitates careful maintenance of relative humidity levels (e.g., using condensers) to avoid negative impacts (e.g., condensation, microbial proliferation, etc.) during storage. Moreover, respiration of agricultural products is an exothermic process which releases heat into the surrounding atmosphere. During transit and storage in shipping containers, heat generated by the respiration of the agricultural product, as well as external environmental conditions and heat generated from mechanical processes (e.g., motors) necessitates active cooling of the storage container in order to maintain the appropriate temperature for storage, which is a major cost driver for shipping companies. By reducing the rate of degradation, reducing the heat generation in storage and transit, and increasing the shelf life of agricultural products, there is a direct value to the key stakeholders throughout the supply chain.

There exists a need for new, more cost-effective approaches to prevent degradation, reduce the generation of heat and humidity, maintain quality, and increase the life of agricultural products. Such approaches may require less or no refrigeration, special packaging, etc.

SUMMARY

Compositions and formulations for forming protective coatings and methods of making and using the coatings thereof are described herein. The components of the coatings form glycerophospholipid bilayer structures on the surface of the substrate (e.g., agricultural product) the coatings are disposed on, thus forming a protective barrier. In some embodiments, the protective barrier exhibits a low water and gas permeability. For example, the lattice formation that the molecules of the lamella adopt and the intermolecular forces between the lamellae can reduce loss of water or gas from the substrate. In some embodiments, the water and gas permeability of the coatings described herein can be modified by, e.g., (1) changing the components or amounts of the components in the composition (e.g., coating agent) applied to the substrate, as well as (2) modifying the method used to form the coating (e.g., the temperature or speed at which the mixture comprising the coating agent on the substrate is dried and/or the concentration of the coating agent in the mixture applied to the substrate). In some embodiments, the coating agents and/or coatings formed comprise a glycerophospholipid. In some embodiments, the coatings described herein are a more effective barrier to water and gas than, e.g., conventional wax coatings. In some such embodiments, the thickness of the coating is less than the thickness of conventional wax coatings.

A method of reducing the ripening rate of an agricultural product is also described herein. The method comprises applying a solution comprising a glycerophospholipid to a surface of the agricultural product and drying the solution on the surface of the agricultural product under a forced flow of air to promote self-assembly of a multiplicity of glycerophospholipid bilayers on the surface of the agricultural product, thereby forming a glycerophospholipid layer on the agricultural product.

Although the disclosed inventive concepts include those defined in the attached claims, it should be understood that the inventive concepts can also be defined in accordance with the following embodiments.

In addition to the embodiments of the attached claims and the embodiments described above, the following numbered embodiments are also innovative.

Embodiment 1 is a method of reducing the ripening rate of an agricultural product, the method comprising:
applying a solution comprising one or more glycerophospholipids to a surface of the agricultural product, wherein a temperature of the solution is between about 10° C. and about 80° C.; and
drying the solution on the surface of the agricultural product under a flow of air having a temperature between about 20° C. and about 100° C. to promote self-assembly of a multiplicity of glycerophospholipid bilayers on the surface of the agricultural product, thereby forming a glycerophospholipid layer on the agricultural product.

Embodiment 2 is the method of embodiment 1, wherein the one or more glycerophospholipids comprise one or more of phosphatidylcholine, phosphatidylethanolamine, phosphatidylinositol, phosphatidylserine, and phosphatidic acid.

Embodiment 3 is the method of embodiment 1 or embodiment 2, wherein the one or more glycerophospholipids comprise one or more compounds of Formula I:

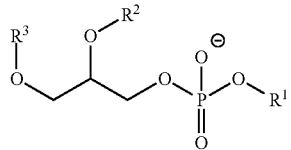

(Formula I)

wherein:
$R^1$ is —H or one of the following fragments:

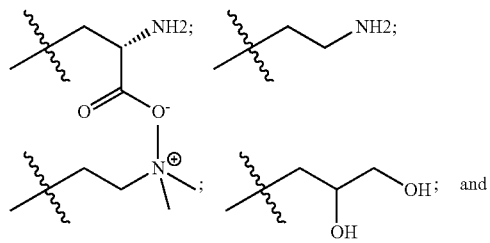

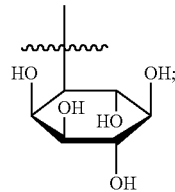

and
$R^2$ and $R^3$ are each independently, at each occurrence, —H or a fragment represented by Formula II:

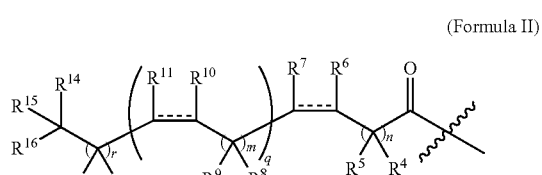

(Formula II)

wherein:
$R^4$, $R^5$, $R^8$, $R^9$, $R^{12}$, $R^{13}$, $R^{14}$, $R^{15}$ and $R^{16}$ are each independently, at each occurrence, —H, —OH, —OR$^{17}$ or $C_1$-$C_6$ alkyl;
$R^6$, $R^7$, $R^{10}$, and $R^{11}$ are each independently, at each occurrence, —H, —OR$^{17}$, or $C_1$-$C_6$ alkyl; and/or
$R^4$ and $R^5$ can combine with the carbon atoms to which they are attached to form C═O; and/or
$R^8$ and $R^9$ can combine with the carbon atoms to which they are attached to form C═O; and/or
$R^{12}$ and $R^{13}$ can combine with the carbon atoms to which they are attached to form C═O; and
$R^{17}$ is at each occurrence $C_1$-$C_6$ alkyl,
the symbol ----- represents a single bond or a cis or trans double bond;
n is 0, 1, 2, 3, 4, 5, 6, 7 or 8;
m is 0, 1, 2 or 3;
q is 0, 1, 2, 3, 4 or 5; and
r is 0, 1, 2, 3, 4, 5, 6, 7 or 8.

Embodiment 4 is the method of embodiment 3, wherein the fragment represented by Formula II is one of:

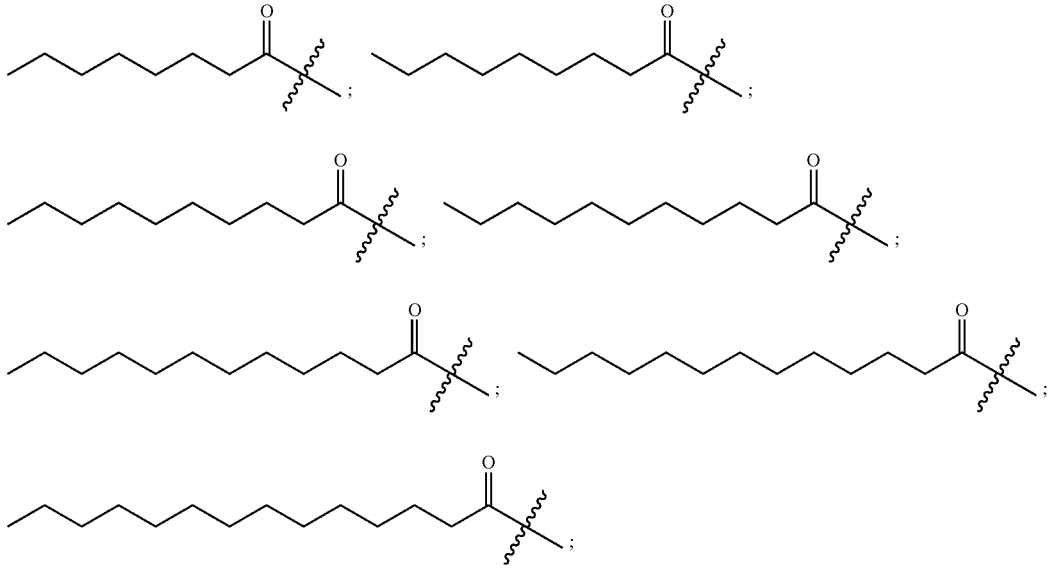

-continued
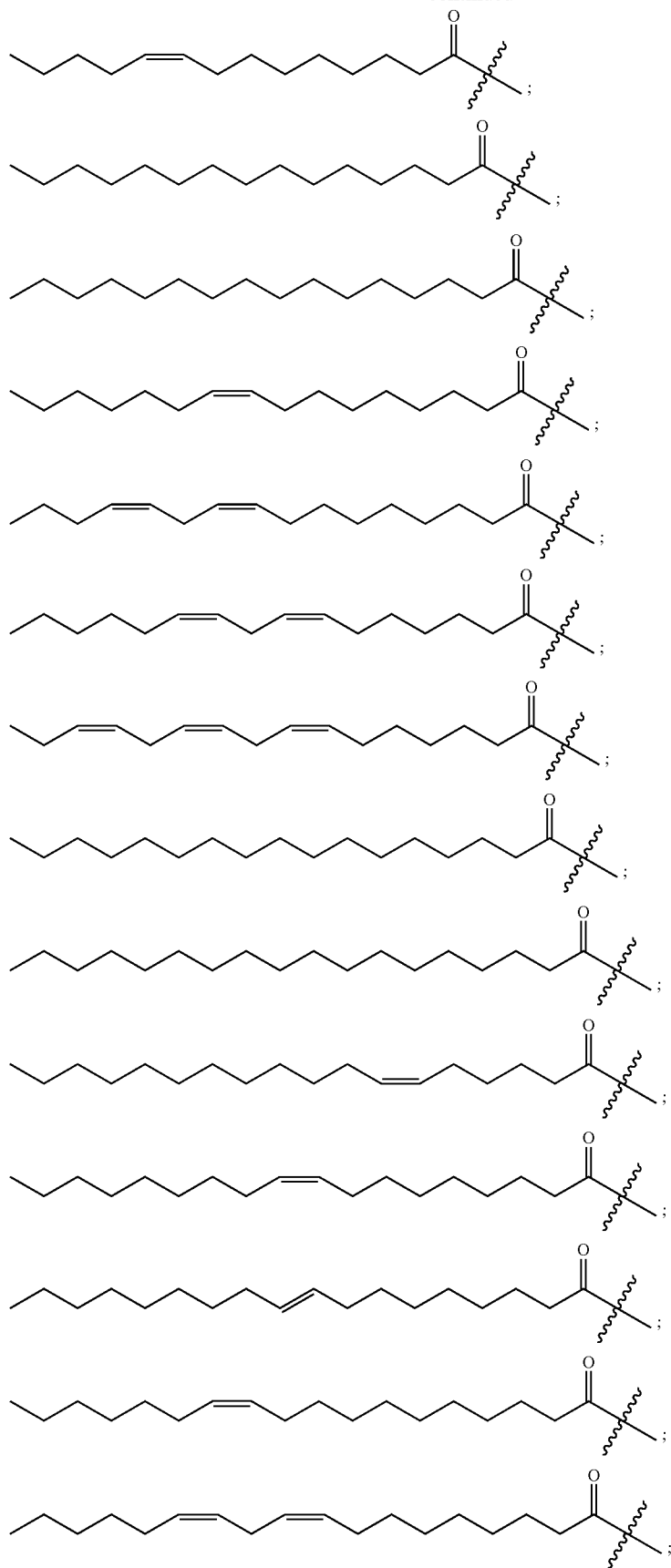

-continued
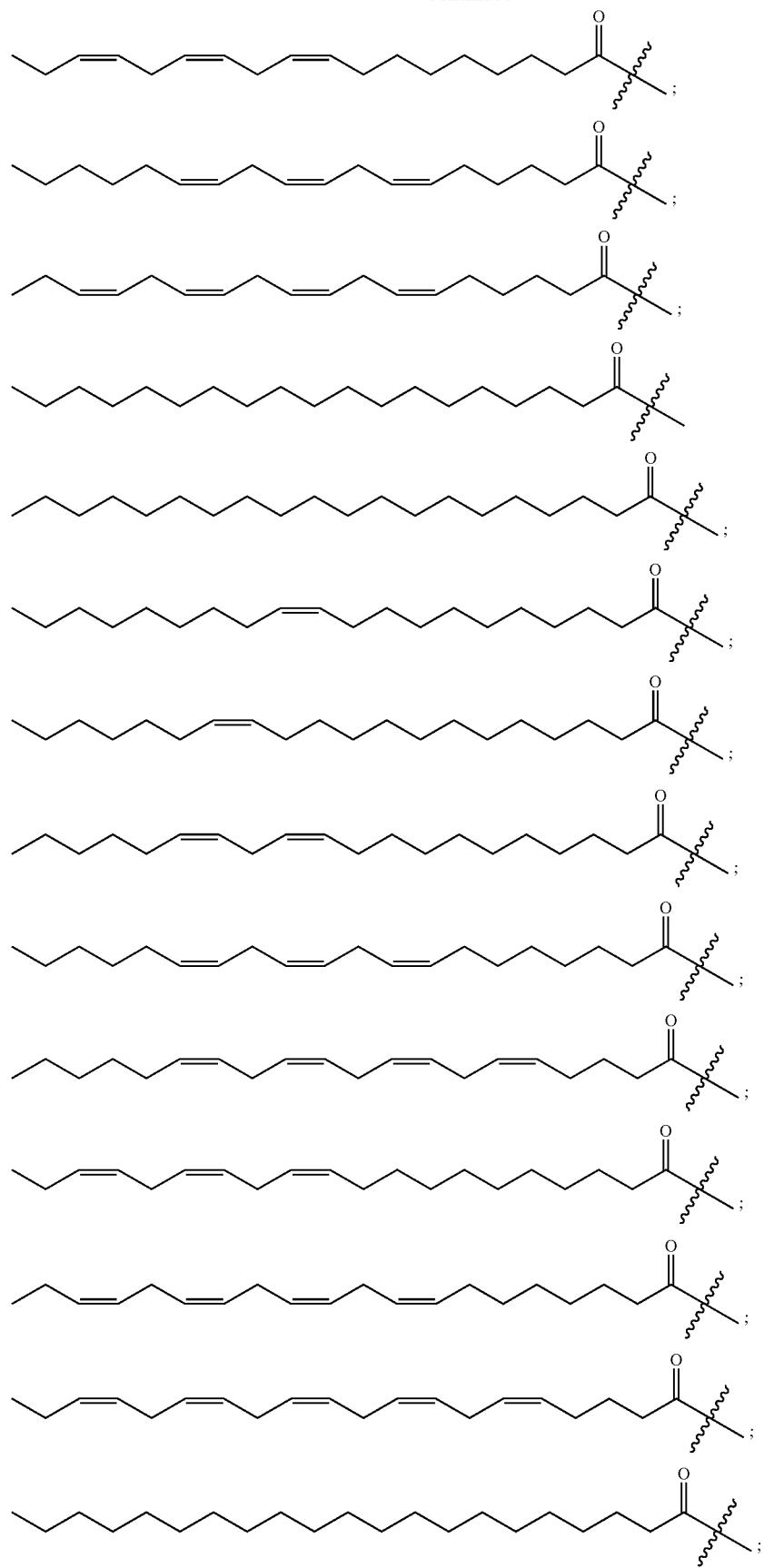

-continued

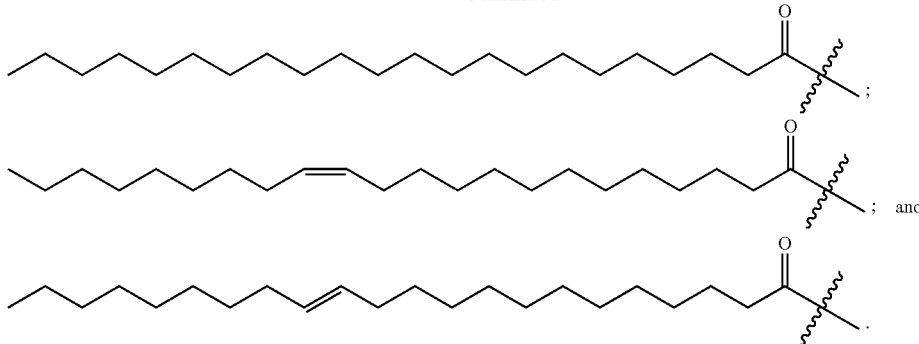

Embodiment 5 is the method of any one of embodiments 1-4, wherein the one or more glycerophospholipids comprise phosphatidylcholine, phosphatidylethanolamine, and phosphatidylinositol.

Embodiment 6 is the method of embodiment 5, wherein the one or more glycerophospholipids comprise about 20 wt % to about 40 wt % phosphatidylcholine, about 20 wt % to about 40 wt % phosphatidylethanolamine, and about 20 wt % to about 40 wt % phosphatidylinositol.

Embodiment 7 is the method of embodiment 5 or embodiment 6, wherein the one or more glycerophospholipids further comprise phosphatidylserine.

Embodiment 8 is the method of embodiment 7, wherein the one or more glycerophospholipids comprise less than about 5 wt % phosphatidylserine.

Embodiment 9 is the method of any one of embodiments 1-8, wherein the solution further comprises a phytosterol.

Embodiment 10 is the method of embodiment 9, wherein a weight ratio of the phytosterol to a total amount of the glycerophospholipids is less than about 0.05.

Embodiment 11 is the method of any one of embodiments 1-10, wherein a total concentration of the one or more glycerophospholipids in the solution is between about 10 g/L and about 200 g/L.

Embodiment 12 is the method of any one of embodiments 1-11, wherein a total concentration of the one or more glycerophospholipids in the solution is between about 50 g/L and about 150 g/L.

Embodiment 13 is the method of any one of embodiments 1-10, wherein a total concentration of the one or more glycerophospholipids in the solution is between about 80 g/L and about 120 g/L.

Embodiment 14 is the method of any one of embodiments 1-10, wherein a total concentration of the one or more glycerophospholipids in the solution is between about 90 g/L and about 110 g/L.

Embodiment 15 is the method of any one of embodiments 1-14, wherein the solution is an aqueous solution.

Embodiment 16 is the method of any one of embodiments 1-15, wherein the solution is free of added surfactant.

Embodiment 17 is the method of any one of embodiments 1-16, wherein a temperature of the air is between about 50° C. and about 100° C.

Embodiment 18 is the method of any one of embodiments 1-17, wherein the gylcerophospholipid layer comprises one or more open bilayers.

Embodiment 19 is the method of embodiment 18, wherein one or more of the open bilayers are lamellar.

Embodiment 20 is the method of any one of embodiments 1-17, wherein the glycerophospholipid layer comprises one or more closed bilayers.

Embodiment 21 is the method of embodiment 20, wherein one or more of the closed bilayers are cylindrical.

Embodiment 22 is the method of embodiment 20, wherein one or more of the closed bilayers are spherical.

Embodiment 23 is the method of any one of embodiments 1-22, wherein a thickness of the layer is less than about 2 microns.

Embodiment 24 is the method of any one of embodiments 1-22, wherein a thickness of the layer is less than about 1 micron.

Embodiment 25 is a method of reducing the respiration rate of an agricultural product, the method comprising:
applying a solution comprising one or more glycerophospholipids to a surface of the agricultural product, wherein a temperature of the solution is between about 10° C. and about 80° C.; and
drying the solution on the surface of the agricultural product under a flow of air having a temperature between about 20° C. and about 100° C. to promote self-assembly of a multiplicity of glycerophospholipid bilayers on the surface of the agricultural product, thereby forming a glycerophospholipid layer on the agricultural product.

Embodiment 26 is a method of reducing the mass loss rate of an agricultural product, the method comprising:
applying a solution comprising one or more glycerophospholipids to a surface of the agricultural product, wherein a temperature of the solution is between about 10° C. and about 80° C.; and
drying the solution on the surface of the agricultural product under a flow of air having a temperature between about 20° C. and about 100° C. to promote self-assembly of a multiplicity of glycerophospholipid bilayers on the surface of the agricultural product, thereby forming a glycerophospholipid layer on the agricultural product.

Embodiment 27 is a method of preparing an agricultural product having a coating disposed thereon, the method comprising:
applying a solution comprising one or more glycerophospholipids to a surface of the agricultural product, wherein a temperature of the solution is between about 10° C. and about 80° C.; and
drying the solution on the surface of the agricultural product under a flow of air having a temperature between about 20° C. and about 100° C. to promote self-assembly of a multiplicity of glycerophospholipid bilayers on the surface of the agricultural product, thereby forming a glycerophospholipid layer on the agricultural product.

Embodiment 28 is a coated agricultural product comprising:

an agricultural product; and a coating on the surface of the agricultural product, wherein the coating comprises:

one or more glycerophospholipids, and a multiplicity of glycerophospholipid bilayers on the surface of the agricultural product.

Embodiment 29 is the coated agricultural product of embodiment 28, wherein the one or more glycerophospholipids comprise one or more of phosphatidylcholine, phosphatidylethanolamine, phosphatidylinositol, phosphatidylserine, and phosphatidic acid.

Embodiment 30 is the coated agricultural product of embodiment 28 or embodiment 29, wherein the one or more glycerophospholipids comprise one or more compounds of Formula I:

(Formula I)

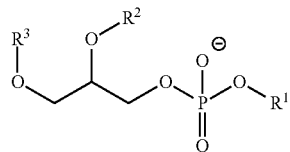

wherein:

$R^1$ is —H or one of the following fragments:

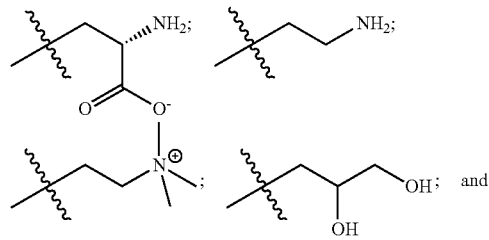

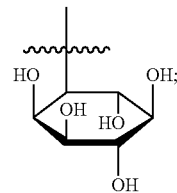

and $R^2$ and $R^3$ are each independently, at each occurrence, —H or a fragment represented by Formula II:

(Formula II)

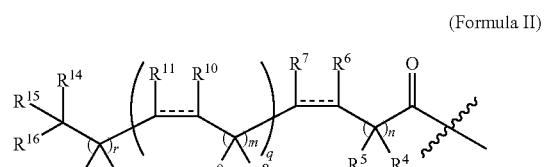

wherein:

$R^4$, $R^5$, $R^8$, $R^9$, $R^{12}$, $R^{13}$, $R^{14}$, $R^{15}$ and $R^{16}$ are each independently, at each occurrence, —H, —OH, —OR$^{17}$ or $C_1$-$C_6$ alkyl;

$R^6$, $R^7$, $R^{10}$, and $R^{11}$ are each independently, at each occurrence, —H, —OR$^{17}$, or $C_1$-$C_6$ alkyl; and/or $R^4$ and $R^5$ can combine with the carbon atoms to which they are attached to form C=O; and/or $R^8$ and $R^9$ can combine with the carbon atoms to which they are attached to form C=O; and/or $R^{12}$ and $R^{13}$ can combine with the carbon atoms to which they are attached to form C=O; and $R^{17}$ is at each occurrence $C_1$-$C_6$ alkyl, the symbol ===== represents a single bond or a cis or trans double bond;

n is 0, 1, 2, 3, 4, 5, 6, 7 or 8;

m is 0, 1, 2 or 3;

q is 0, 1, 2, 3, 4 or 5; and r is 0, 1, 2, 3, 4, 5, 6, 7 or 8.

Embodiment 31 is the coated agricultural product of embodiment 30, wherein the fragment represented by Formula II is one of:

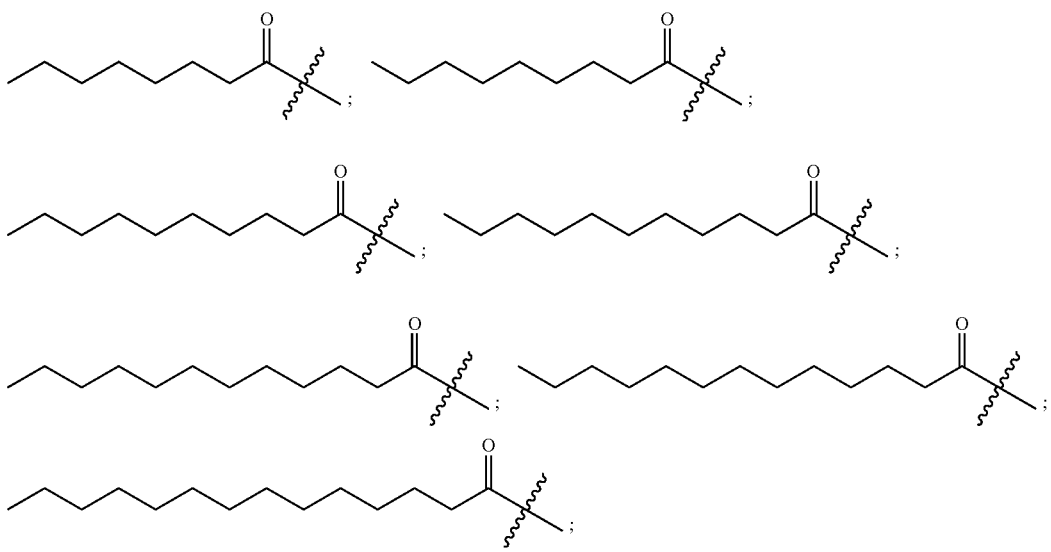

-continued
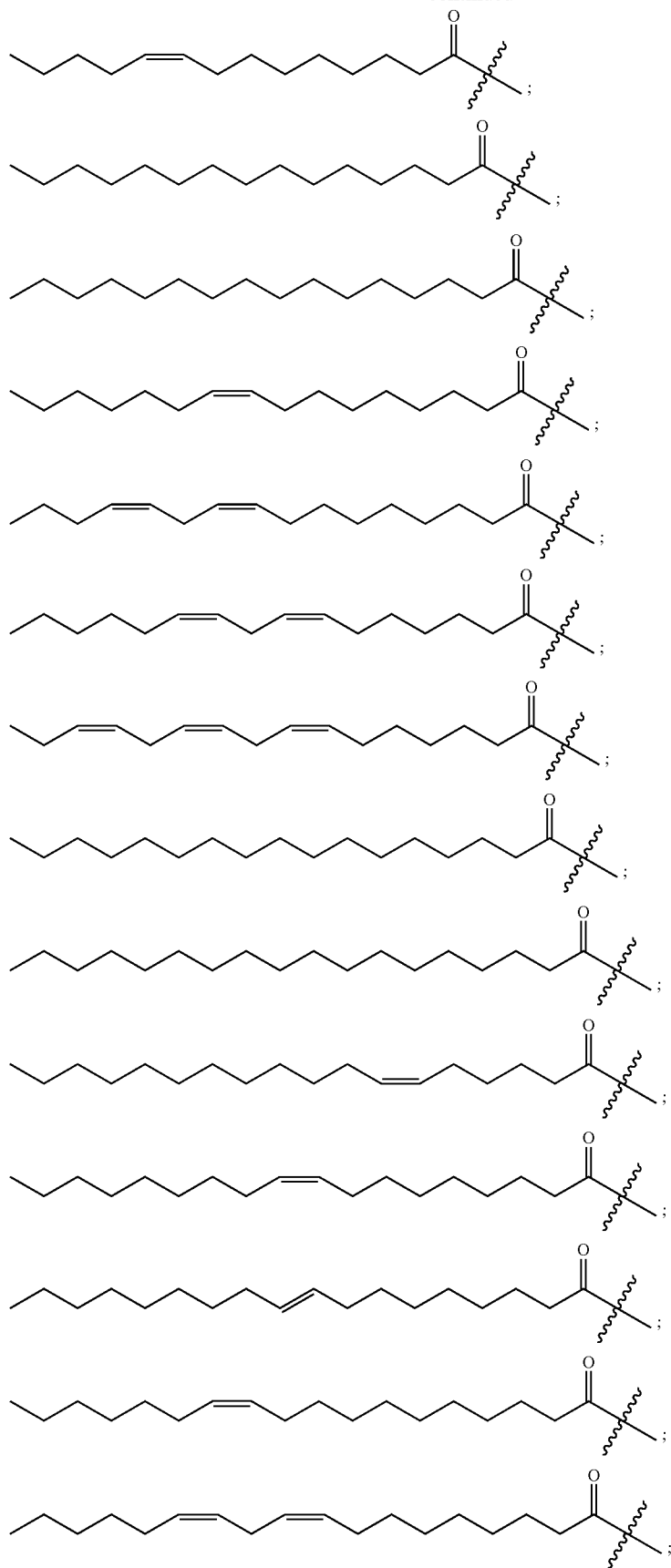

-continued
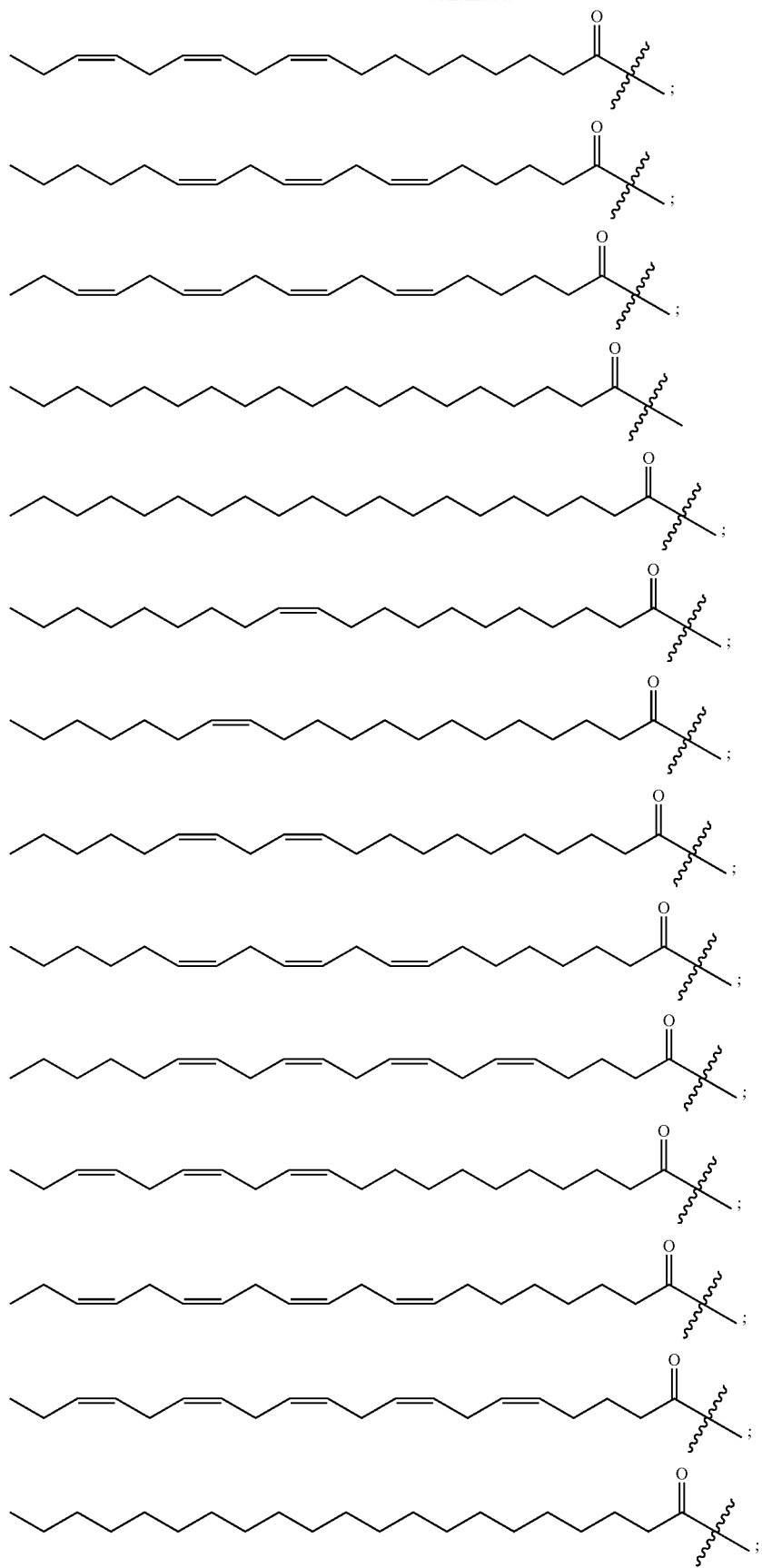

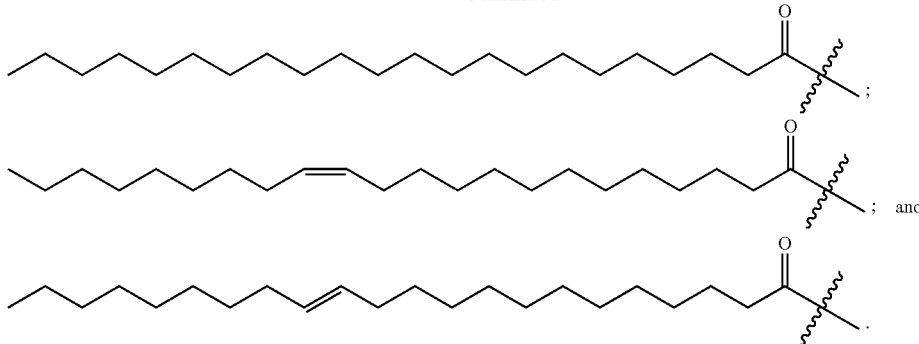

Embodiment 32 is the coated agricultural product of any one of embodiments 28-31, wherein the one or more glycerophospholipids comprise phosphatidylcholine, phosphatidylethanolamine, and phosphatidylinositol.

Embodiment 33 is the coated agricultural product of embodiment 32, wherein the one or more glycerophospholipids comprise 20 wt % to 40 wt % phosphatidylcholine, 20 wt % to 40 wt % phosphatidylethanolamine, and 20 wt % to 40 wt % phosphatidylinositol.

Embodiment 34 is the coated agricultural product of embodiment 32 or embodiment 33, wherein the one or more glycerophospholipids further comprise phosphatidylserine.

Embodiment 35 is the coated agricultural product of embodiment 34, wherein the one or more glycerophospholipids comprise less than 5 wt % phosphatidylserine.

Embodiment 36 is the coated agricultural product of any one of embodiments 28-35, wherein the multiplicity of glycerophospholipid bilayers comprises one or more open bilayers.

Embodiment 37 is the coated agricultural product of embodiment 36, wherein one or more of the open bilayers are lamellar.

Embodiment 38 is the coated agricultural product of any one of embodiments 28-35, wherein the multiplicity of glycerophospholipid bilayers comprises one or more closed bilayers.

Embodiment 39 is the coated agricultural product of embodiment 38, wherein one or more of the closed bilayers are cylindrical.

Embodiment 40 is the coated agricultural product of embodiment 38, wherein one or more of the closed bilayers are spherical.

Embodiment 41 is the coated agricultural product of any one of embodiments 28-40, wherein a thickness of the coating is less than 2 microns.

Embodiment 42 is the coated agricultural product of any one of embodiments 28-40, wherein a thickness of the coating is less than 1 micron.

The details of one or more embodiments of the subject matter of this disclosure are set forth in the accompanying drawings and the description. Other features, aspects, and advantages of the subject matter will become apparent from the description, the drawings, and the claims.

DETAILED DESCRIPTION

Definitions

Figure 1:
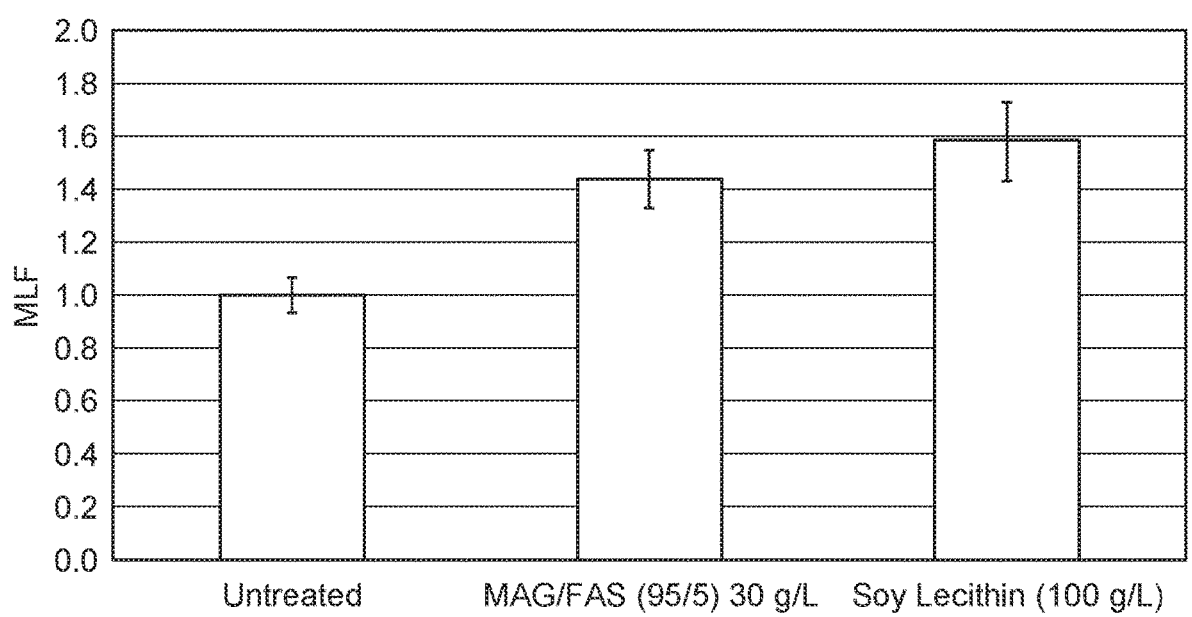
FIG. 1 shows a plot of mass loss factors (MLF) for an agricultural product that is untreated, an agricultural product that is coated with a coating agent comprising one or more monoglycerides, and an agricultural product that is coated with a coating agent comprising one or more glycerophospholipids.

As used herein, the term "plant matter" refers to any portion of a plant, including, for example, fruits (in the botanical sense, including fruit peels and juice sacs), vegetables, leaves, stems, barks, seeds, flowers, peels, or roots. Plant matter includes pre-harvest plants or portions thereof as well as post-harvest plants or portions thereof, including, e.g., harvested fruits and vegetables, harvested roots and berries, and picked flowers.

As used herein, a "coating agent" refers to a composition including a compound or group of compounds from which a protective coating can be formed.

As used herein, the "mass loss rate" refers to the rate at which the product loses mass (e.g., by releasing water and other volatile compounds). The mass loss rate is typically expressed as a percentage of the original mass per unit time (e.g., percent per day).

As used herein, the term "mass loss factor" is defined as the ratio of the average mass loss rate of uncoated produce (measured for a control group) to the average mass loss rate of the corresponding tested produce (e.g., coated produce) over a given time. Hence a larger mass loss factor for a coated produce corresponds to a greater reduction in average mass loss rate for the coated produce.

As used herein, the term "respiration rate" refers to the rate at which the product releases gas, such as $CO_2$. This rate can be determined from the volume of gas (e.g., $CO_2$) (at standard temperature and pressure) released per unit time per unit mass of the product. The respiration rate can be expressed as ml gas/kg·hour. The respiration rate of the product can be measured by placing the product in a closed container of known volume that is equipped with a sensor, such as a $CO_2$ sensor, recording the gas concentration within the container as a function of time, and then calculating the rate of gas release required to obtain the measured concentration values.

As used herein, the term "respiration factor" is defined as the ratio of the average gas diffusion (e.g., $CO_2$ release) of uncoated produce (measured for a control group) to the average gas diffusion of the corresponding tested produce (e.g., coated produce) over a given time. Hence a larger respiration factor for a coated produce corresponds to a greater reduction in gas diffusion/respiration for the coated produce.

As used herein, the term "contact angle" of a liquid on a solid surface refers to an angle of the outer surface of a droplet of the liquid measured where the liquid-vapor interface meets the liquid-solid interface. The contact angle quantifies the wettability of the solid surface by the liquid.

As used herein, the terms "wetting agent" or "surfactant" each refer to a compound that, when added to a solvent, suspension, colloid, or solution, reduces the difference in surface energy between the solvent/suspension/colloid/solution and a solid surface on which the solvent/suspension/colloid/solution is disposed.

As used herein, a "lipid bilayer" or "bilayer structure" refers to a structure which includes two contiguous sublayers, wherein each sublayer comprises molecules of glycerophospholipids aligned adjacent to each other lengthwise such that the hydrophilic ends form a hydrophilic surface and the hydrophobic ends form a hydrophobic surface; and the molecular arrangement defines a repeating lattice structure. The hydrophobic surfaces of each sublayer in the lipid bilayer face each other, and the hydrophilic surfaces of each layer face away from each other. A lipid bilayer can be an "open bilayer," wherein each sublayer is arranged in a parallel sheet. For example, an open bilayer can have a lamellar structure. A lipid bilayer can also be a "closed bilayer," wherein each sublayer is arranged in a circular structure. For example, a closed bilayer can have a spherical or cylindrical structure.

As used herein, "lamellar structure" refers to a structure comprising lamella(e) vertically stacked adjacent to each other and held together by intermolecular forces. As used herein, "lamella(e)" refers to one lamella or two or more lamellae, that is, one or more discrete layers of molecules, respectively. In some embodiments, the molecules present in the lamella(e) are ordered (e.g., aligned, as in an open bilayer). The distance between a surface of a lamella and the surface of an adjacent lamella that is facing the same direction is referred to herein as "interlayer spacing" or "periodic spacing". Interlayer spacing between two lamellae is determined by (1) obtaining an out-of-plane X-ray scattering image of a coating, (2) determining the scattering vector (q) of the peak corresponding to the lamellar structure, and (3) using Bragg's equation below, determine the interlayer spacing (d):

$$d = 2\pi/q_{peak} \quad (1)$$

As used herein, "grain" refers to a domain within a polycrystalline structure wherein the lattice formation is continuous and has one orientation. The boundaries between the grains in a polycrystalline structure are defects in the lattice formation wherein the continuity of the lattice formation and/or orientation of the molecules forming the lattice formation are interrupted. The "grain size" of the grains that form a coating is determined by (1) obtaining an in-plane X-ray scattering image of the coating; (2) determining the full width at half maximum (FWHM) of the peak corresponding to the molecules in the coating; and (3) using the Scherrer equation below to calculate the grain size (D):

$$D = 2\pi b / \text{FWHM} \quad (2)$$

where b=about 0.95 for a 2-dimensional crystal.

Without being bound by any theory, grain size inversely correlates with grain boundaries. As such, the larger the grain size, the fewer the grain boundaries; and the smaller the grain size, the more grain boundaries there are. It is further understood that the fewer the grain boundaries in a coating, the lower the mass loss rate and/or respiration rate of the coated agricultural product since there are fewer pathways for water and/or gas to pass through the coating.

As used herein, "mosaicity" refers to the probabilities that the orientation of crystal planes in a polycrystalline structure (e.g., a coating) deviate from a plane that is substantially parallel with the plane of the substrate (e.g., agricultural product) surface. Deviation of a crystal plane from a plane that is substantially parallel with the plane of the substrate surface is understood to be a type of crystal defect that increases the permeability of a coating to air and water, thus increasing the mass loss rate and respiration rate when the coating is disposed over an agricultural product.

As used herein, "substrate" refers to an article that a coating is applied to. In some embodiments, the substrate is an agricultural product (e.g., produce), a silicon substrate, a polystyrene substrate, or a substrate comprising a polysaccharide (e.g., cellulose).

Protective Coatings

Described herein are solutions, suspensions, or colloids containing a composition (e.g., a coating agent) in a solvent that can be used to form protective coatings over substrates such as plant matter, agricultural products, or food products. The protective coatings can, for example, prevent or reduce water loss and gas diffusion from the substrates, oxidation of the substrates, and/or can shield the substrates from threats such as bacteria, fungi, viruses, and the like. The coatings can also protect the substrates from physical damage (e.g., bruising) and photodamage. Accordingly, the coating agents, solutions/suspensions/colloids, and the coatings formed thereof can be used to help store agricultural or other food products for extended periods of time without spoiling. In some instances, the coatings and the coating agents from which they are formed can allow for food to be kept fresh in the absence of refrigeration. The coating agents and coatings described herein can also be edible (i.e., the coating agents and coatings can be non-toxic for human consumption). In some particular implementations, the solutions/suspensions/colloids include a wetting agent or surfactant which cause the solution/suspension/colloid to better spread over the entire surface of the substrate during application, thereby improving surface coverage as well as overall performance of the resulting coating. In some particular implementations, the solutions/suspensions/colloids include an emulsifier which improves the solubility of the coating agent in the solvent and/or allows the coating agent to be suspended or dispersed in the solvent. The wetting agent and/or emulsifier can each be a component of the coating agent, or can be separately added to the solution/suspension/colloid. In some embodiments, the coatings include lamellar structures formed on the surface of the substrate (e.g., agricultural product) over which the coating is disposed. In some embodiments, the coatings include cylindrical structures formed on the surface of the substrate (e.g., agricultural product) over which the coating is disposed.

Plant matter (e.g., agricultural products) and other degradable items can be protected against degradation from biotic or abiotic stressors by forming a protective coating over the outer surface of the product. The coating can be formed by adding the constituents of the coating (herein collectively a "coating agent") to a solvent (e.g., water and/or ethanol) to form a mixture (e.g., a solution, suspension, or colloid), applying the mixture to the outer surface of the product to be coated, e.g., by dipping the product in the mixture or by brushing or spraying the mixture over the surface of the product, and then removing the solvent from the surface of the product, e.g., by allowing the solvent to evaporate, thereby causing the coating to be formed from the coating agent over the surface of the product. The coating agent can be formulated such that the resulting coating provides a barrier to water and/or oxygen transfer, thereby preventing water loss from and/or oxidation of the coated product. The coating agent can additionally or alternatively be formulated such that the resulting coating provides a barrier to $CO_2$, ethylene and/or other gas transfer.

Coating agents including a glycerophospholipid can both be safe for human consumption and can be used as coating agents to form coatings that are effective at reducing the ripening rate and reducing mass loss and oxidation in a variety of produce.

Coating and Coating Agent Compositions

In some embodiments, the compositions (e.g., the coating agents or coatings) comprise one or more glycerophospholipids. Exemplary classes of glycerophospholipids include phosphatidylcholine, phosphatidylethanolamine, phosphatidylinositol, phosphatidylserine, and phosphatidic acid. In some embodiments, the one or more glycerophospholipids comprise one or more of phosphatidylcholine, phosphatidylethanolamine, phosphatidylinositol, phosphatidylserine, and phosphatidic acid.

In some embodiments, the one or more glycerophospholipids comprise one or more compounds of Formula I, where Formula I is:

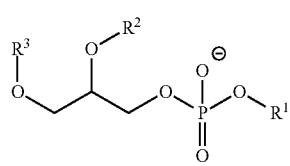

(Formula I)

wherein:

$R^1$ is —H or one of the following fragments:

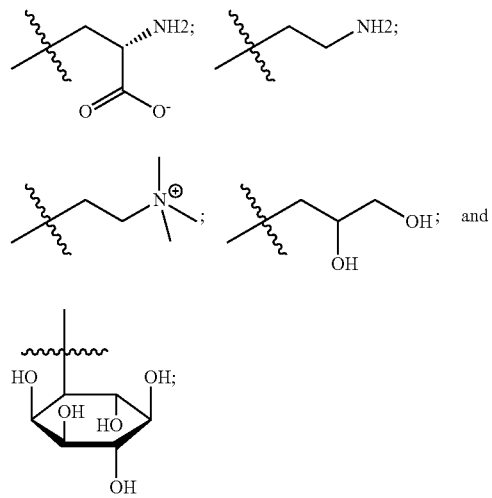

and $R^2$ and $R^3$ are each independently, at each occurrence, —H or a fragment represented by Formula II, where Formula II is:

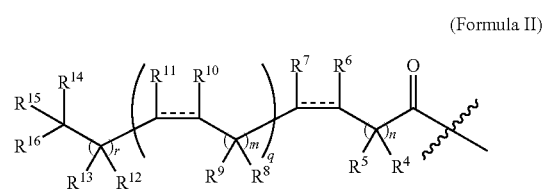

(Formula II)

wherein:

$R^4$, $R^5$, $R^8$, $R^9$, $R^{12}$, $R^{13}$, $R^{14}$, $R^{15}$ and $R^{16}$ are each independently, at each occurrence, —H, —OH, —OR$^{17}$ or $C_1$-$C_6$ alkyl;

$R^6$, $R^7$, $R^{10}$, and $R^{11}$ are each independently, at each occurrence, —H, —OR$^{17}$, or $C_1$-$C_6$ alkyl; and/or $R^4$ and $R^5$ can combine with the carbon atoms to which they are attached to form C═O; and/or $R^8$ and $R^9$ can combine with the carbon atoms to which they are attached to form C═O; and/or $R^{12}$ and $R^{13}$ can combine with the carbon atoms to which they are attached to form C═O; and $R^{17}$ is at each occurrence $C_1$-$C_6$ alkyl, the symbol ══════ represents a single bond or a cis or trans double bond;

n is 0, 1, 2, 3, 4, 5, 6, 7 or 8;

m is 0, 1, 2 or 3;

q is 0, 1, 2, 3, 4 or 5; and r is 0, 1, 2, 3, 4, 5, 6, 7 or 8.

In some embodiments, the compositions (e.g., the coating agents or coatings) comprise one or more glycerophospholipids comprising one or more of the following fragments of Formula II:

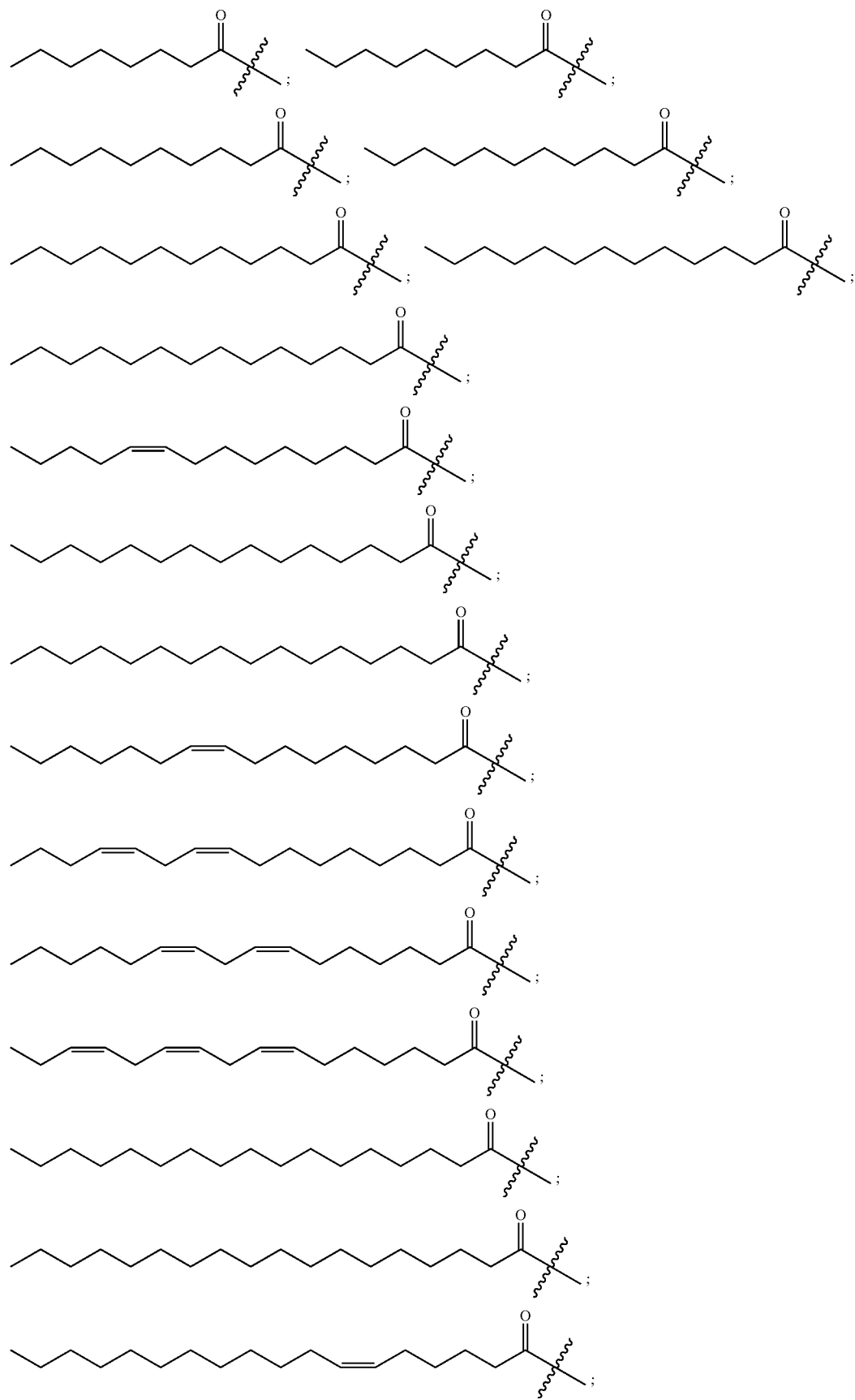

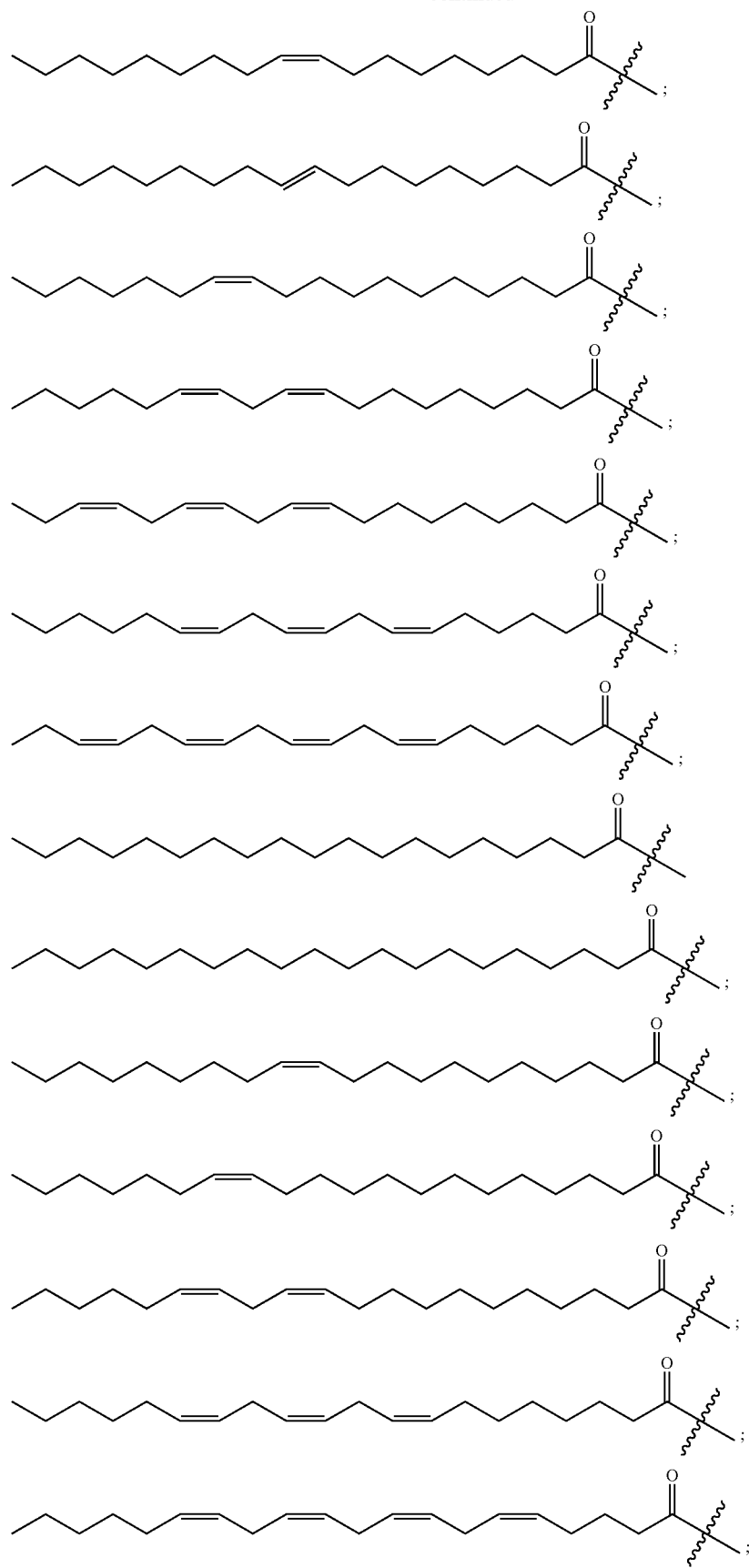

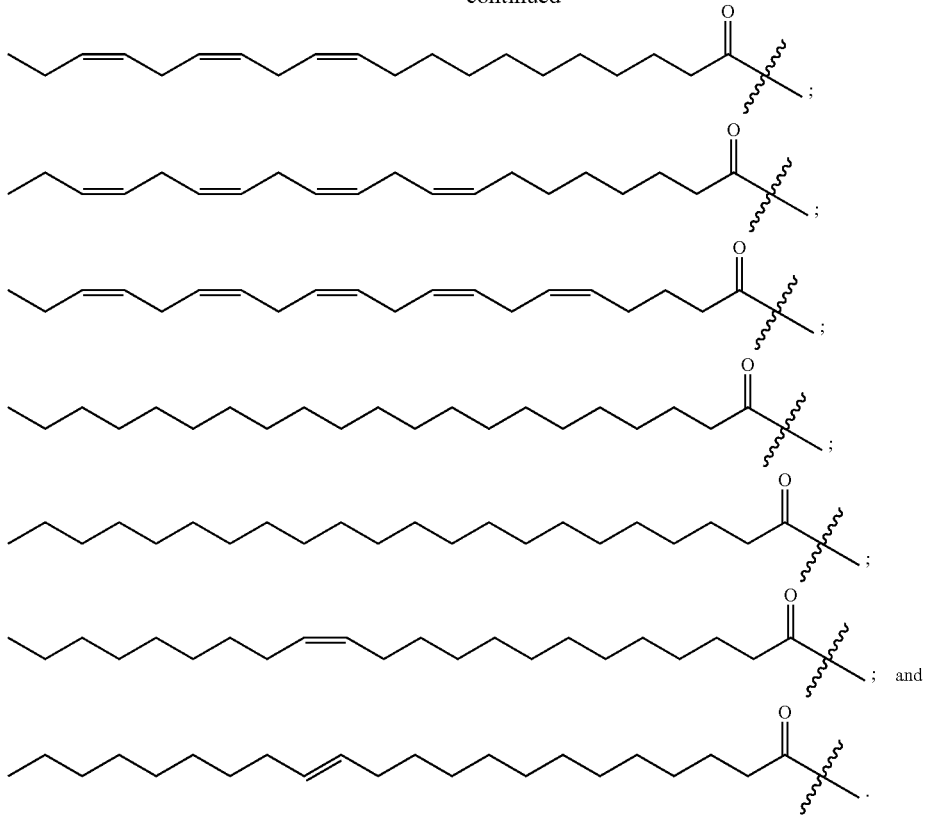

In some embodiments, the compound of Formula I is a compound of Formula Ia:

(Formula Ia)

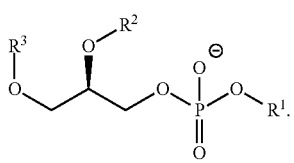

In some embodiments, the compound of Formula I is a compound of Formula Ib:

(Formula Ib)

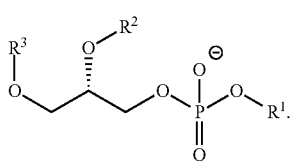

In some embodiments, the one or more glycerophospholipids comprise a racemic mixture of the compounds of Formula Ia and Formula Ib.

In some embodiments, the one or more glycerophospholipids comprise phosphatidylcholine. In some embodiments, the phosphatidylcholine is a compound of Formula I wherein $R^1$ is

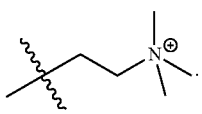 [SMILES: *CC[N+](C)(C)C]

In some embodiments, the one or more glycerophospholipids comprise about 1% to about 99% by weight of phosphatidylcholine, for example, about 5% to about 75%, about 10% to about 65%, about 15% to about 50%, or about 20% to about 40% by weight of phosphatidylcholine.

In some embodiments, the one or more glycerophospholipids comprise phosphatidylethanolamine. In some embodiments, the phosphatidylethanolamine is a compound of Formula I wherein $R^1$ is

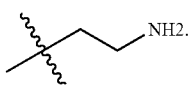 [SMILES: *CCN]

In some embodiments, the one or more glycerophospholipids comprise about 1% to about 50% by weight of phosphatidylethanolamine, for example, about 5% to about 50%, about 10% to about 45%, about 15% to about 40%, or about 20% to about 40% by weight of phosphatidylethanolamine.

In some embodiments, the one or more glycerophospholipids comprise phosphatidylinositol. In some embodiments, the phosphatidylinositol is a compound of Formula 1 wherein $R^1$ is

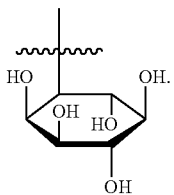

In some embodiments, the one or more glycerophospholipids comprise about 1% to about 50% by weight of phosphatidylinositol, for example, about 5% to about 50%, about 10% to about 45%, about 15% to about 40%, or about 20% to about 40% by weight of phosphatidylinositol.

In some embodiments, the one or more glycerophospholipids comprise phosphatidylcholine, phosphatidylethanolamine, and phosphatidylinositol. In some embodiments, the one or more glycerophospholipids comprise about 20% to about 40% by weight of phophatidylcholine, about 20% to about 40% by weight phosphatidylethanolamine, and about 20% to about 40% by weight phosphatidylinositol.

In some embodiments, the one or more glycerophospholipids comprise phosphatidylserine. In some embodiments, the phosphatidylserine is a compound of Formula I wherein $R^1$ is

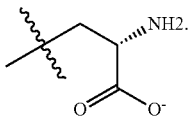

In some embodiments, the one or more glycerophospholipids comprise less than about 25% by weight phosphatidylserine, for example less than about 15%, less than about 10%, or less than about 5% by weight phosphatidylserine.

In some embodiments, the one or more glycerophospholipids comprise phosphatidylglycerol. In some embodiments, the phosphatidylglycerol is a compound of Formula I wherein $R^1$ is

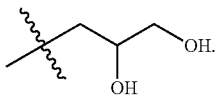 [SMILES: *CC(O)CO]

In some embodiments, the one or more glycerophospholipids comprises less than about 25% by weight phosphatidylglycerol, for example, less than about 15%, less than about 10%, or less than about 5% by weight phosphatidylglycerol.

In some embodiments, the one or more glycerophospholipids comprise phosphatidylcholine, phosphatidylethanolamine, phosphatidylinositol, phosphatidyl glycerol, and phosphatidylserine. In some embodiments, the one or more glycerophospholipids comprise about 20% to about 40% by weight of phosphatidylcholine, about 20% to about 40% by weight phosphatidylethanolamine, about 20% to about 40% by weight phosphatidylinositol, and less than about 5% by weight phosphatidylserine.

In some embodiments, the coating agent further comprises a phytosterol. In some embodiments, a weight ratio of the phytosterol to a total amount of the one or more glycerophospholipids is less than about 0.2, for example, less than about 0.15, 0.1, or 0.05.

Coating Agent Mixtures

In some embodiments, the composition (e.g., coating agent) can be dissolved, mixed, dispersed, or suspended in a solvent to form a mixture (e.g., solution, suspension, or colloid). Examples of solvents that can be used include water, methanol, ethanol, isopropanol, butanol, acetone, ethyl acetate, chloroform, acetonitrile, tetrahydrofuran, diethyl ether, methyl tert-butyl ether, and combinations thereof. In one example, the solvent is water. In one example, the solvent is ethanol. In some embodiments, the composition is dissolved or suspended in water to form an aqueous solution.

In some embodiments, the concentration of the composition (e.g., coating agent) in the solution or mixture (e.g., solution, suspension, or colloid) is about 10 mg/mL to about 200 mg/mL, for example, about 10 to about 150 mg/mL, about 10 to about 120 mg/mL, about 10 to about 100 mg/mL, about 20 to about 200 mg/mL, about 20 to about 175 mg/mL, about 20 to about 150 mg/mL, about 20 to about 100 mg/mL, about 30 to about 175 mg/mL, about 30 to about 200 mg/mL, about 30 to about 175 mg/mL, about 30 to about 150 mg/mL, about 30 to about 120 mg/mL, about 30 to about 100 mg/mL, about 40 to about 175 mg/mL, about 50 mg/mL to about 150 mg/mL, about 80 mg/mL to about 120 mg/mL, or about 90 mg/mL to about 110 mg/mL. In one example, the concentration of the composition (e.g., coating agent) in the mixture (e.g., solution, suspension, or colloid) is about 100 mg/mL.

In some embodiments, the concentration of the composition is less than 200 mg/mL, or less than 175 mg/mL. In some examples, phase separation and/or precipitation, which can affect the appearance and applicability of the coating, can occur at concentrations greater than 200 mg/mL.

As previously described, coating agents can be formed predominantly of various combinations of glycerophospholipids. As also previously described, the coatings can be formed over the outer surface of the agricultural product by dissolving, suspending, or dispersing the coating agent in a solvent to form a mixture, applying the mixture to the surface of the agricultural product (e.g., by spray coating the product, by dipping the product in the mixture, or by brushing the mixture onto the surface of the product), and then removing the solvent (e.g., by allowing the solvent to evaporate). The solvent can include any polar, non-polar, protic, or aprotic solvents, including any combinations thereof. Examples of solvents that can be used include water, methanol, ethanol, isopropanol, butanol, acetone, ethyl acetate, chloroform, acetonitrile, tetrahydrofuran, diethyl ether, methyl tert-butyl ether, any other suitable solvent, and combinations thereof. In cases where the coating is to be applied to plants or other edible products, it may be preferable to use a solvent that is safe for consumption, for example water, ethanol, or combinations thereof. Depending on the solvent that is used, the solubility limit of the coating agent in the solvent may be lower than desired for particular applications.

In order to improve the solubility of the coating agent in the solvent, or to allow the coating agent to be suspended or dispersed in the solvent, the coating agent can further include an emulsifier. When the coatings are to be formed over plants or other edible products, it may be preferable that the emulsifier be safe for consumption. Furthermore, it may also preferable that the emulsifier either not be incorporated into the coating or, if the emulsifier is incorporated into the coating, that it does not degrade the performance of the coating.

As described above, the coating agent can be added to or dissolved, suspended, or dispersed in a solvent to form a colloid, suspension, or solution. The various components of the coating agent (e.g., one or more glycerophospholipids) can be combined prior to being added to the solvent and then added to the solvent together. Alternatively, the components of the coating agent can be kept separate from one another and then be added to the solvent consecutively (or at separate times).

In some embodiments, the coating solutions/suspensions/colloids can further include a wetting agent that serves to reduce the contact angle between the solution/suspension/colloid and the surface of the substrate being coated. The wetting agent can be included as a component of the coating agent and therefore added to the solvent at the same time as other components of the coating agent. Alternatively, the wetting agent can be separate from the coating agent and can be added to the solvent either before, after, or at the same time as the coating agent. Alternatively, the wetting agent can be separate from the coating agent, and can be applied to a surface before the coating agent in order to prime the surface.

In some embodiments, the coating solution/suspension/colloid is free of added wetting agent or surfactant.

In some embodiments, the mixture or composition (e.g., coating or coating agent) comprises one or more (e.g., 1, 2, or 3) preservatives. In some embodiments, the one or more preservatives comprise one or more antioxidants, one or more antimicrobial agents, one or more chelating agents, or any combination thereof. Exemplary preservatives include, but are not limited to, vitamin E, vitamin C, butylatedhydroxyanisole (BHA), butylatedhydroxytoluene (BHT), sodium benzoate, disodium ethylenediaminetetraacetic acid (EDTA), citric acid, benzyl alcohol, benzalkonium chloride, butyl paraben, chlorobutanol, meta cresol, chlorocresol, methyl paraben, phenyl ethyl alcohol, propyl paraben, phenol, benzonic acid, sorbic acid, methyl paraben, propyl paraben, bronidol, and propylene glycol.

Any of the coating solutions/suspensions/colloids described herein can further include an antimicrobial agent, for example ethanol or citric acid. In some embodiments, the antimicrobial agent is part of or a component of the solvent. Any of the coating solutions described herein can further include other components or additives such as sodium bicarbonate.

Any of the coating agents described herein can further include additional materials that are also transported to the surface with the coating, or are deposited separately and are subsequently encapsulated by the coating (e.g., the coating is formed at least partially around the additional material), or are deposited separately and are subsequently supported by the coating (e.g., the additional material is anchored to the external surface of the coating). Examples of such additional materials can include cells, biological signaling molecules, vitamins, minerals, pigments, aromas, enzymes, catalysts, antifungals, antimicrobials, and/or time-released drugs. The additional materials can be non-reactive with surface of the coated product and/or coating, or alternatively can be reactive with the surface and/or coating.

In some embodiments, the coating can include an additive configured, for example, to modify the viscosity, vapor pressure, surface tension, or solubility of the coating. The additive can, for example, be configured to increase the chemical stability of the coating. For example, the additive can be an antioxidant configured to inhibit oxidation of the coating. In some embodiments, the additive can reduce or increase the melting temperature or the glass-transition temperature of the coating. In some embodiments, the additive is configured to reduce the diffusivity of water vapor, oxygen, $CO_2$, or ethylene through the coating or enable the coating to absorb more ultra violet (UV) light, for example to protect the agricultural product (or any of the other products described herein). In some embodiments, the additive can be configured to provide an intentional odor, for example a fragrance (e.g., smell of flowers, fruits, plants, freshness, scents, etc.). In some embodiments, the additive can be configured to provide color and can include, for example, a dye or a US Food and Drug Administration (FDA) approved color additive.

Any of the coating agents or coatings formed thereof that are described herein can be flavorless or have high flavor thresholds, e.g., above 500 ppm, and can be odorless or have a high odor threshold. In some embodiments, the materials included in any of the coatings described herein can be substantially transparent. For example, the coating agent, the solvent, and/or any other additives included in the coating can be selected so that they have substantially the same or similar indices of refraction. By matching their indices of refraction, they may be optically matched to reduce light scattering and improve light transmission. For example, by utilizing materials that have similar indices of refraction and have a clear, transparent property, a coating having substantially transparent characteristics can be formed.

Any of the coatings described herein can be disposed on the external surface of an agricultural product or other substrate using any suitable means. For example, the substrate can be dip-coated in a bath of the coating formulation (e.g., an aqueous or mixed aqueous-organic or organic solution). The deposited coating can form a thin layer on the surface of an agricultural product, which can protect the agricultural product from biotic stressors, water loss, respiration, and/or oxidation. In some embodiments, the deposited coating can have a thickness of less than about 20 microns, 10 microns, 9 microns, 8 microns, 7 microns, 6 microns, 5 microns, 4 microns, 3 microns, 2 microns, or 1.5 microns. In some embodiments, the deposited coating can have a thickness of about 100 nm to about 20 microns, about 100 nm to about 2 microns, about 700 nm to about 1.5 microns, about 700 nm to about 1 micron, about 1 micron to about 1.6 microns, or about 1.2 microns to about 1.5 microns. In some embodiments, the coating is transparent to the naked eye.

In some embodiments, the deposited coating can be deposited substantially uniformly over the substrate and can be free of defects and/or pinholes. In some embodiments, the dip-coating process can include sequential coating of the agricultural product in baths of coating precursors that can undergo self-assembly or covalent bonding on the agricultural product to form the coating. In some embodiments, the coating can be deposited on agricultural products by passing the agricultural products under a stream of the coating solution/suspension/colloid (e.g., a waterfall of the coating solution/suspension/colloid). For example, the agricultural products can be disposed on a conveyor that passes through the stream of the coating solution/suspension/colloid. In some embodiments, the coating can be misted, vapor- or dry vapor-deposited on the surface of the agricultural product. In some embodiments, the coating solution/suspension/colloid can be mechanically applied to the surface of the product to be coated, for example by brushing it onto the surface. In some embodiments, the coating can be configured to be fixed on the surface of the agricultural product by UV crosslinking or by exposure to a reactive gas, for example oxygen.

In some embodiments, the coating solutions/suspensions/colloids can be spray-coated on the agricultural products. Commercially available sprayers can be used for spraying the coating solutions/suspensions/colloids onto the agricultural product. In some embodiments, the coating formulation can be electrically charged in the sprayer before spray-coating on to the agricultural product, such that the deposited coating electrostatically and/or covalently bonds to the exterior surface of the agricultural product.

In some embodiments, coatings formed from coating agents described herein over agricultural products can be configured to change the surface energy of the agricultural product. Various properties of coatings described herein can be adjusted by tuning the crosslink density of the coating, its thickness, or its chemical composition. This can, for example, be used to control the ripening of postharvest fruit or produce. For example, coatings formed from coating agents that primarily include bifunctional or polyfunctional monomer units can, for example, have higher crosslink densities than those that include monofunctional monomer units. Thus, coatings formed from bifunctional or polyfunctional monomer units can in some cases result in slower rates of ripening as compared to coatings formed from monofunctional monomer units.

As previously described, the coatings formed from coating agents described herein can be configured to prevent water loss or other moisture loss from the coated portion of the plant, delay ripening, and/or prevent oxygen diffusion into the coated portion of the plant, for example, to reduce oxidation of the coated portion of the plant. The coatings can also serve as a barrier to diffusion of carbon dioxide and/or ethylene into or out of the plant or agricultural product. The coatings can also protect the coated portion of the plant against biotic stressors, such as, for example, bacteria, fungi, viruses, and/or pests that can infest and decompose the coated portion of the plant. Since bacteria, fungi and pests all identify food sources via recognition of specific molecules on the surface of the agricultural product, coating the agricultural products with the coating agent can deposit molecularly contrasting molecules on the surface of the portion of the plant, which can render the agricultural products unrecognizable. Furthermore, the coating can also alter the physical and/or chemical environment of the surface of the agricultural product making the surface unfavorable for bacteria, fungi or pests to grow. The coating can also be formulated to protect the surface of the portion of the plant from abrasion, bruising, or otherwise mechanical damage, and/or protect the portion of the plant from photodegradation. The portion of the plant can include, for example, a leaf, a stem, a shoot, a flower, a fruit, a root, etc.

Any of the coatings described herein can be used to reduce the humidity generated by agricultural products (e.g., fresh produce) via mass loss (e.g., water loss) during transportation and storage by reducing the mass loss rate of the agricultural products (e.g., fresh produce).

In some embodiments, the agricultural product is coated with a composition that reduces the mass loss rate by at least about 10%, 15%, 20%, 25%, 30%, 35%, 40%, 45%, 50%, 55%, 60%, 65%, 70%, 75%, 80%, 85%, 90% or greater compared to untreated product measured. In some embodiments, treating an agricultural product using any of the coatings described herein can give a mass loss factor of at least about 1.1, 1.2, 1.3, 1.4, 1.5, 1.6, 1.7, 1.8, 1.9, 2.0, 2.2, 2.4, 2.6, 2.8, or 3.0. In some embodiments, treating an agricultural product using any of the coatings described herein can reduce the humidity generated during storage by at least about 1%, 2%, 3%, 4%, 5%, 10%, 15%, 20%, 25%, 30%, 35%, 40%, 45%, 50%, 55%, 60%, 65%, 70%, 75%, 80%, 85%, 90% or greater compared to untreated product. In some embodiments, the reduction in mass loss rate of the agricultural product can reduce the energy required to maintain a relative humidity at a predetermined level (e.g., at about 90%, 85%, 80%, 75%, 70%, 65%, 60%, 55%, 50%, or 45% relative humidity or less) during storage or transportation. In some embodiments, the energy required to maintain a relative humidity at the predetermined level (e.g., any of the predetermined levels listed above) during storage or transportation can be reduced by at least about 1%, 2%, 3%, 4%, 5%, 10%, 15%, 20%, 25%, 30%, 35%, 40%, 45%, 50%, 55%, 60%, 65%, 70%, 75%, 80%, 85%, 90% or greater compared to untreated product.

Any of the coatings described herein can be used to reduce the heat generated by agricultural products (e.g., fresh produce) via respiration during transportation and storage by reducing the respiration rate of the agricultural products (e.g., fresh produce). In some embodiments, the product is coated with a composition that reduces the respiration rate by at least about 10%, 15%, 20%, 25%, 30%, 35%, 40%, 45%, 50%, 55%, 60%, 65%, 70%, 75%, 80%, 85%, 90% or greater compared to untreated product (measured as described above). In some embodiments, the reduction in heat generated by the agricultural product can reduce the energy required to maintain a temperature (e.g., a predetermined temperature) during storage or transportation. In some embodiments, the heat generated can be reduced by at least about 5%, 10%, 15%, 20%, 25%, 30%, 35%, 40%, 45%, 50%, 55%, 60%, 65%, 70%, 75%, 80%, 85%, 90% or greater for coated products compared to untreated products. In some embodiments, the energy required to maintain the coated products at a predetermined temperature (e.g., at about 25° C., 23° C., 20° C., 18° C., 15° C., 13° C., 10° C., 8° C., 5° C., or 3° C. or less) can be reduced by at least about 1%, 2%, 3%, 4%, 5%, 10%, 15%, 20%, 25%, 30%, 35%, 40%, 45%, 50%, 55%, 60%, 65%, 70%, 75%, 80%, 85%, 90% or greater compared to untreated products.

Respiration rate approximations for various types of agricultural products (e.g., fresh produce) are shown in Table 1.

TABLE 1

Respiration rates for various agricultural products.

| Produce Type | Respiration Rate at 20° C. (ml $CO_2$/kg · hour) |
| --- | --- |
| Apples | 10-30 |
| Apricot | 15-25 |
| Asparagus | 138-250 |
| Avocado | 40-150 |
| Bananas | 20-70 |
| Broccoli | 140-160 |
| Cantaloupe | 23-33 |
| Cherry | 22-28 |
| Corn | 268-311 |
| Cucumber | 7-24 |
| Fig | 20-30 |
| Grape | 12-15 |
| Grapefruit | 7-12 |
| Honeydew | 20-27 |
| Kiwifruit | 15-20 |
| Lemon | 10-14 |
| Lime | 6-10 |
| Mandarin | 10-15 |
| Mango | 35-80 |

TABLE 1-continued

Respiration rates for various agricultural products.

| Produce Type | Respiration Rate at 20° C. (ml $CO_2$/kg · hour) |
| --- | --- |
| Orange | 11-17 |
| Papaya | 15-35 (at 15° C.) |
| Peach | 32-55 |
| Pear | 15-35 |
| Peas | 123-180 |
| Pineapple | 15-20 |
| Strawberry | 50-100 |
| Tomato | 12-22 |
| Watermelon | 17-25 |

In some embodiments, the methods and compositions described herein are used to treat agricultural products (e.g., fresh produce) that are stored and/or transported in a refrigerated container or "reefer". Heat from produce respiration is a contributor to the overall heat within a refrigerated container. In some embodiments, the methods and compositions described herein can reduce the respiration rate of the treated agricultural products (e.g., fresh produce) in order to reduce the heat generated due to respiration of the agricultural products (e.g., fresh produce) in a refrigerated container or "reefer". In some embodiments, the methods and compositions described herein can reduce the mass loss rate of the treated agricultural products (e.g., fresh produce) in order to reduce the humidity generated due to mass loss (e.g., water loss) of the agricultural products (e.g., fresh produce) in a refrigerated container or "reefer".

The methods and compositions described herein can also be used to minimize or reduce temperature or humidity gradients that arise from concentrating agricultural products (e.g., fresh produce) in stacks or pallets in order to prevent uneven ripening. The treated agricultural products (e.g., fresh produce) can be straight stacked during storage or can be stacked in an alternative fashion (e.g., cross stacked) to increase circulation around the agricultural products (e.g., fresh produce). Within the produce supply chain, boxes of agricultural products may be reoriented from a straight stack, which can be preferable during shipment, to a cross stack, which can be used during storage to increase air circulation and to prevent uneven ripening.

In some embodiments, treating an agricultural product with a coating that reduces the respiration rate can reduce the rate at which the temperature increases in a stack (e.g., upon removal from cold storage) by at least about 0.5° C. per day, for example, at least about 1.0° C., 1.5° C., 2.0° C., 2.5° C., 3.0° C., 3.5° C., 4.0° C., 4.5° C., or 5° C. per day, as compared to an untreated stack. In some embodiments, treating an agricultural product with a coating that reduces the respiration rate can reduce the equilibrium temperature difference between the atmosphere and the average temperature of the stack by at least about 0.5° C., 1.0° C., 1.5° C., 2.0° C., 2.5° C., 3.0° C., 3.5° C., 4.0° C., 4.5° C., or 5° C.

Any of the coatings described herein can be used to protect any agricultural product. In some embodiments, the coating can be coated on an edible agricultural product, for example, fruits, vegetables, edible seeds and nuts, herbs, spices, produce, meat, eggs, dairy products, seafood, grains, or any other consumable item. In such embodiments, the coating can include components that are non-toxic and safe for consumption by humans and/or animals. For example, the coating can include components that are U.S. Food and Drug Administration (FDA) approved direct or indirect food additives, FDA approved food contact substances, satisfy FDA regulatory requirements to be used as a food additive or food contact substance, and/or is an FDA Generally Recognized as Safe (GRAS) material. Examples of such materials can be found within the FDA Code of Federal Regulations Title 21, located at "www.accessdata.fda.gov/scripts/cdrh/cfdocs/cfcfr/cfrsearch.cfm". In some embodiments, the components of the coating can include a dietary supplement or ingredient of a dietary supplement. The components of the coating can also include an FDA approved food additive or color additive. In some embodiments, the coating can include components that are naturally derived, as described herein. In some embodiments, the coating can be flavorless or have a high flavor threshold of below 500 ppm, are odorless or have a high odor threshold, and/or are substantially transparent. In some embodiments, the coating can be configured to be washed off an edible agricultural product, for example, with water.

In some embodiments, the coatings described herein can be formed on an inedible agricultural product. Such inedible agricultural products can include, for example, inedible flowers, seeds, shoots, stems, leaves, whole plants, and the like. In such embodiments, the coating can include components that are non-toxic, but the threshold level for non-toxicity can be higher than that prescribed for edible products. In such embodiments, the coating can include an FDA approved food contact substance, an FDA approved food additive, or an FDA approved drug ingredient, for example, any ingredient included in the FDA's database of approved drugs, which can be found at "http://www.accessdata.fda.gov/scripts/cder/drugsatfda/index.cfm". In some embodiments, the coating can include materials that satisfy FDA requirements to be used in drugs or are listed within the FDA's National Drug Discovery Code Directory, "www.accessdata.fda.gov/scripts/cder/ndc/default.cfm". In some embodiments, the materials can include inactive drug ingredients of an approved drug product as listed within the FDA's database, "www.accessdata.fda.gov/scripts/cder/ndc/default.cfm".

Embodiments of the coatings described herein provide several advantages, including, for example: (1) the coatings can protect the agricultural products from biotic stressors, i.e. bacteria, viruses, fungi, or pests; (2) the coatings can prevent evaporation of water and/or diffusion of oxygen, carbon dioxide, and/or ethylene; (3) coating can help extend the shelf life of agricultural products, for example, post-harvest produce, without refrigeration; (4) the coatings can introduce mechanical stability to the surface of the agricultural products eliminating the need for expensive packaging designed to prevent the types of bruising which accelerate spoilage; (5) use of agricultural waste materials to obtain the coatings can help eliminate the breeding environments of bacteria, fungi, and pests; (6) the coatings can be used in place of pesticides to protect plants, thereby minimizing the harmful impact of pesticides to human health and the environment; (7) the coatings can be naturally derived and hence, safe for human consumption. Since in some cases the components of the coatings described herein can be obtained from agricultural waste, such coatings can be made at a relatively low cost. Therefore, the coatings can be particularly suited for small scale farmers, for example, by reducing the cost required to protect crops from pesticides and reducing post-harvest losses of agricultural products due to decomposition by biotic and/or environmental stressors.

Solvents

The solvent to which the coating agent and wetting agent (when separate from the coating agent) is added to form the solution/suspension/colloid can, for example, be water, methanol, ethanol, isopropanol, butanol, acetone, ethyl acetate, chloroform, acetonitrile, tetrahydrofuran, diethyl ether, methyl tert-butyl ether, an alcohol, any other suitable solvent, or a combination thereof. The resulting solutions, suspensions, or colloids can be suitable for forming coatings on agricultural products. For example, the solutions, suspensions, or colloids can be applied to the surface of the agricultural product, after which the solvent can be removed (e.g., by evaporation or convective drying), leaving a protective coating formed from the coating agent on the surface of the agricultural product.

While a number of the solvents above (particularly water and ethanol) can be safely and effectively used in solutions/suspensions/colloids that are applied to edible products such as produce or other agricultural products, in many cases it can be advantageous to use either water or otherwise a solvent which is at least about 40% (and in many cases higher) water by volume. This is because water is typically cheaper than other suitable solvents and can also be safer to work with than solvents that have a higher volatility and/or a lower flash point (e.g., acetone or alcohols such as isopropanol or ethanol). In some embodiments, the solvent comprises water. For example, the solvent can be water. Accordingly, for any of the solutions/suspensions/colloids described herein, the solvent or solution/suspension/colloid can be at least about 40%, 45%, 50%, 55%, 60%, 65%, 70%, 75%, 80%, 85%, 90%, 95%, or 99% water by mass or by volume. In some embodiments, the solvent includes a combination of water and ethanol, and can optionally be at least about 40%, 45%, 50%, 55%, 60%, 65%, 70%, 75%, 80%, 85%, 90%, 95%, or 99% water by volume. In some embodiments, the solvent or solution/suspension/colloid is about 40% to about 100%, about 40% to about 99%, about 40% to about 95%, about 40% to about 90%, about 40% to about 85%, about 40% to about 80%, about 50% to about 100%, about 50% to about 99%, about 50% to about 95%, about 50% to about 90%, about 50% to about 85%, about 50% to about 80%, about 60% to about 100%, about 60% to about 99%, about 60% to about 95%, about 60% to about 90%, about 60% to about 85%, about 60% to about 80%, about 70% to about 100%, about 70% to about 99%, about 70% to about 95%, about 70% to about 90%, about 70% to about 85%, about 80% to about 100%, about 80% to about 99%, about 80% to about 97%, about 80% to about 95%, about 80% to about 93%, about 80% to about 90%, about 85% to about 100%, about 85% to about 99%, about 85% to about 97%, about 85% to about 95%, about 90% to about 100%, about 90% to about 99%, about 90% to about 98%, or about 90% to about 97% water by mass or volume.

In view of the above, for some applications the solvent can be a low wetting solvent (i.e., a solvent exhibiting a large contact angle with respect to the surface to which it is applied). For example, in the absence of any added wetting agents or other surfactants, the contact angle between the solvent and either (a) carnauba wax, (b) candelilla wax, (c) paraffin wax, or (d) the surface of a non-waxed lemon can be at least about 70°, for example at least about 75°, 80°, 85°, or 90°. Addition of any of the wetting agents described herein to the solvent, either alone or in combination with other compounds or coating agents, can cause the contact angle between the resulting solution/suspension/colloid and either (a) carnauba wax, (b) candelilla wax, (c) paraffin wax, or (d) the surface of a non-waxed lemon to be less than about 85°, for example, less than about 80°, 75°, 70°, 65°, 60°, 55°, 50°, 45°, 40°, 35°, 30°, 25°, 20°, 15°, 10°, 5°, or 0°.

The coating agent that is added to or dissolved, suspended, or dispersed in the solvent to form the coating solution/suspension/colloid can be any compound or combination of compounds capable of forming a protective coating over the substrate to which the solution/suspension/colloid is applied. The coating agent can be formulated such that the resulting coating protects the substrate from biotic and/or abiotic stressors. For example, the coating can prevent or suppress the transfer of oxygen and/or water, thereby preventing the substrate from oxidizing and/or from losing water via transpiration/osmosis/evaporation. In cases where the substrate is perishable and/or edible, for example when the substrate is a plant, an agricultural product, or a piece of produce, the coating agent is preferably composed of non-toxic compounds that are safe for consumption.

Coated Agricultural Products and Methods of Preparation and Use Thereof

In some embodiments, when the components of the coating agent (e.g., one or more glycerophospholipids) are mixed with a solvent, they form microstructures, such as, for example, vesicles in the solvent. In some embodiments, when this mixture contacts a surface, such as an agricultural product (e.g., produce), the microstructure can adsorb to the surface and form an open bilayer (e.g., lamella), or a series of stacked open bilayers to form an open bilayer structure (e.g., a lamellar structure) on the surface. In some embodiments, upon removal or drying of the solvent, the open bilayer structure partitions into grains, the boundaries between the grains being crystal defects. In some embodiments, when this mixture contacts a surface, such as an agricultural product (e.g., produce), the microstructure can adsorb to the surface and form a closed bilayer (e.g., a sphere or a cylinder), or a series of closed bilayers to form a closed bilayer structure on the surface (e.g., a spherical or cylindrical structure). In some embodiments, upon removal or drying of the solvent, the closed bilayer structure partitions into grains, the boundaries between the grains being crystal defects.

In some embodiments, an advantage of the open bilayer (e.g., a lamellar) structure is its low permeability. Without being bound by any theory, when water passes through the coating, it travels through grain boundaries and between the open bilayer structure if the outer surfaces of the open bilayer structure are sufficiently hydrophilic (e.g., when the lamellae are lipid bilayers). In some embodiments, the open bilayer structure composed of lipid bilayers formed from one or more glycerophospholipids in the coating increases the hydrophilicity of the outer surfaces of the lipid bilayers that make up the coating, thus allowing more water to intercalate between the lipid bilayers and therefore increasing the water permeability of the coating, resulting in an increased mass loss rate.

In some embodiments, an advantage of the closed bilayer structure (e.g., a spherical or cylindrical structure) is its low permeability. Without being bound by any theory, when water passes through the coating, it travels through grain boundaries and between the closed bilayer structure if the outer surfaces of the closed bilayer structure are sufficiently hydrophilic (e.g., when the spherical or cylindrical structures are lipid bilayers). In some embodiments, the closed bilayer structure composed of lipid bilayers formed from one or more glycerophospholipids in the coating increases the hydrophilicity of the outer surfaces of the lipid bilayers that make up the coating, thus allowing more water to intercalate between the lipid bilayers and therefore increasing the water permeability of the coating, resulting in an increased mass loss rate.

In some embodiments, increasing the concentration of the coating agent in the mixture increases the thickness of the coating, which, for example, can reduce the water permeability (and can therefore reduce mass loss when the coating is disposed over an agricultural product) and can lower the gas diffusion ratio (and can therefore reduce the respiration rate when the coating is disposed over an agricultural product).

In some embodiments, the higher the temperature of drying, the larger the grain size and lower the mosaicity (which is a measure of the probabilities that the orientation of crystal planes in a coating deviate from a plane that is substantially parallel with the plane of the substrate surface, recognized as a type of crystal defect) in the coating, which can result in fewer grain boundaries and defects for water and/or gas to travel through. In some embodiments, this can result in a lower water and gas permeability that can translate into a lower mass loss rate and lower respiration rate when, e.g., the coating is disposed on an agricultural product.

In some embodiments, heating the coating (or coated agricultural product) from a first temperature to a second temperature higher than the first temperature but below the melting point (i.e., the phase transition temperature) of the coating, then cooling the coating, can increase the grain size in the coating, which can result in a lower mass loss rate, lower gas diffusion ratio, and lower respiration rate.

Coated Agricultural Products

In one aspect, described herein is a coated substrate comprising a substrate and a coating comprising a glycerophospholipid layer having an open or closed glycerophospholipid bilayer structure formed on the substrate, wherein the coating has a thickness of less than about 20 microns. For example, the coating can have a thickness of less than about 10 microns, 5 microns, 2 microns, or 1 micron.

In some embodiments, the glycerophospholipid layer comprises one or more open bilayers. For example, the open bilayer can be lamellar.

In some embodiments, the glycerophospholipid layer comprises one or more closed bilayers. For example, the one or more closed bilayers can each independently be cylindrical or spherical.

In another aspect, described herein is a coated substrate comprising a substrate and a coating comprising a lamellar structure formed on the substrate, wherein the coating comprises a plurality of grains. In another aspect, described herein is a coated substrate comprising a substrate and a coating comprising a spherical structure formed on the substrate, wherein the coating comprises a plurality of grains. In another aspect, described herein is a coated substrate comprising a substrate and a coating comprising a cylindrical structure formed on the substrate, wherein the coating comprises a plurality of grains.

In some embodiments, the substrate is an agricultural product, a silicon substrate, a polystyrene substrate, or a substrate comprising a polysaccharide (e.g., cellulose). For example, the substrate can be an agricultural product.

In another aspect, described herein is a coated agricultural product comprising an agricultural product and a coating comprising a lamellar structure formed on the agricultural product, wherein the coating has a thickness of less than about 20 microns. In another aspect, described herein is a coated agricultural product comprising an agricultural product and a coating comprising a spherical structure formed on the agricultural product, wherein the coating has a thickness of less than about 20 microns. In another aspect, described herein is a coated agricultural product comprising an agricultural product and a coating comprising a cylindrical structure formed on the agricultural product, wherein the coating has a thickness of less than about 20 microns.

In another aspect, described herein is a coated agricultural product comprising an agricultural product and a coating comprising a lamellar structure formed on the agricultural product, wherein the coating comprises a plurality of grains. In another aspect, described herein is a coated agricultural product comprising an agricultural product and a coating comprising a cylindrical structure formed on the agricultural product, wherein the coating comprises a plurality of grains. In another aspect, described herein is a coated agricultural product comprising an agricultural product and a coating comprising a spherical structure formed on the agricultural product, wherein the coating comprises a plurality of grains.

In some embodiments (e.g., when the lamella is a lipid bilayer, such as a lipid bilayer comprising one or more glycerophospholipids)), the lattice formation is defined by a hexagonal unit cell. The distance (referred to as "a") between each adjacent molecule in the unit cell is about 0.2 nm to about 2 nm, for example, about 0.2 to about 0.7 nm, about 0.2 to about 1.2 nm, about 0.2 nm to about 0.4 nm, about 0.3 nm to about 0.5 nm, about 0.4 nm to about 0.6 nm, about 0.43 nm to about 0.5 nm, or about 0.47 nm to about 0.48 nm. In some embodiments, the lattice formation is defined by an orthorhombic unit cell. In some embodiments, the lattice formation is defined by a tetragonal unit cell. In some embodiments, the lattice formation is defined by a monoclinic unit cell.

In some embodiments, the lamellar structure comprises a plurality of lamellae. The distance between a surface of a lamella and the surface of an adjacent lamella that is facing the same direction is referred to herein as "periodic spacing." In some embodiments, the interlayer spacing of the lamellae is about 1.0 to about 20 nm, for example, about 1 to about 20 nm, about 2 to about 13 nm, about 3 nm to about 10 nm, about 3 to about 7 nm, about 3 to about 6 nm, about 3 to about 5 nm, about 5 to about 7 nm, about 4 to about 6 nm, about 4 to about 5 nm, about 5 to about 6 nm, or about 5.0 to about 5.8 nm.

In some embodiments, the coating comprises a plurality of grains.

In some embodiments, the grain size is about 2 nm to about 100 nm, for example, about 4 nm to about 100 nm, about 7 nm to about 100 nm, about 6 nm to about 100 nm, about 6 nm to about 80 nm, about 6 nm to about 60 nm, about 6 nm to about 40 nm, about 6 nm to about 25 nm, about 9 nm to about 22 nm, about 9 nm to about 15 nm, about 13 nm to about 25 nm, about 8 nm to about 25 nm, about 11 nm to about 17 nm, about 11 nm to about 14 nm, about 13 nm to about 17 nm, about 12 nm to about 16 nm, about 15 nm to about 17 nm, about 9 nm to about 13 nm, about 13 nm to about 17 nm, about 17 nm to about 25 nm, about 2 nm to about 10 nm, 5 nm to about 10 nm, about 8 nm to about 9 nm, about 8.5 nm to about 9.5 nm, about 9 nm to about 10 nm, or about 8 nm, 9 nm, 10 nm, 11 nm, 12 nm, 13 nm, 14 nm, 15 nm, 16 nm, 17 nm, 19 nm, 21 nm, or 22 nm.

Methods of Use and Application

In one aspect, described herein is a method of coating a substrate, the method comprising:
applying a solution comprising one or more glycerophospholipids to a surface of an agricultural product; and
drying the solution on the surface of an agricultural product under a forced flow of air to form a glycerophospholipid layer on the agricultural product, wherein:
the glycerophospholipid layer comprises a multiplicity of glycerophospholipid bilayers, and
the glycerphospholipid layer has a thickness of less than about 2 microns.

In another aspect, described herein is a method of coating a substrate, the method comprising:
applying a solution comprising one or more glycerophospholipids to the surface of an agricultural product; and
drying the solution on the surface of an agricultural product under a forced flow of air at a temperature of greater than about 50° C. to form a glycerophospholipid layer on the agricultural product,
wherein:
the glycerophospholipid layer comprises a multiplicity of glycerophospholipid bilayers, and
each of the glycerophospholipid bilayers comprises a plurality of grains.

In some embodiments, the temperature of the solution is between about 10° C. and about 80° C., for example, between about 10° C. and about 70° C., about 20° C. and about 80° C., about 20° C. and about 60° C., or about 40° C. and about 70° C.

In some embodiments, the temperature of the air is between about 20° C. and about 120° C., for example, between about 20° C. and about 100° C., about 40° C. and about 120° C., or about 50° C. and about 100° C.

In another aspect, described herein is a method of coating a substrate, the method comprising:
applying a mixture comprising a coating agent and a solvent to the substrate;
removing the solvent to form a coating on the substrate;
heating the coated agricultural product from a first temperature to a second temperature, wherein the second temperature is greater than the first temperature and less than the melting point of the coating; and
cooling the coated substrate from the second temperature to a third temperature, wherein the third temperature is less than the second temperature,
wherein:
the coating comprises a multiplicity of glycerophospholipid bilayers; and
each of the glycerophospholipid bilayers comprises a plurality of grains.

In some embodiments, the first temperature is about 0° C. to about 50° C., for example, about 10° C. to about 40° C., about 20° C. to about 30° C., about 23° C. to about 27° C., or about 25° C. In some embodiments, the first temperature is greater than the temperature of the surrounding atmosphere. In some embodiments, the first temperature is less than the temperature of the surrounding atmosphere.

In some embodiments, the second temperature is about 40° C. to about 65° C., for example, about 45° C. to about 65° C., about 50° C. to about 65° C., about 55° C. to about 65° C., about 57° C. to about 63° C., or about 60° C. In some embodiments, the second temperature is greater than the temperature of the surrounding atmosphere. In some embodiments, the second temperature is less than the temperature of the surrounding atmosphere. In some embodiments, the coated agricultural product is heated with air having a temperature higher than the temperature of the agricultural product. In some embodiments, the air that the coated agricultural product is heated with is higher than the second temperature. In some embodiments, the air that the coated agricultural product is heated with is higher than the melting point of the coating.

In some embodiments, if the coating is heated at or above its melting temperature (e.g., about 65° C. to about 70° C., or about 70° C.), the lattice formation of the crystal planes (e.g., lamellae) in the coating can be disrupted, the constituent molecules can adopt random orientations, and the coating can liquify.

In some embodiments, the third temperature is about 0° C. to about 50° C., for example, about 10° C. to about 40° C., about 20° C. to about 30° C., about 23° C. to about 27° C., or about 25° C. In some embodiments, the third temperature is greater than the temperature of the surrounding atmosphere. In some embodiments, the third temperature is less than the temperature of the surrounding atmosphere.

In some embodiments, the second temperature is maintained for about 5 seconds to about 10 hours. For example, the second temperature can be maintained for about 5 seconds to about 7 hours, about 5 seconds to about 3 hours, about 5 seconds to about 1.5 hours, about 5 seconds to about 60 minutes, about 30 seconds to about 45 minutes, about 5 minutes to about 60 minutes, about 10 minutes to about 45 minutes, about 20 minutes to about 40 minutes, about 25 minutes to about 35 minutes, about 30 seconds to about 10 minutes, about 30 seconds to about 7 minutes, about 30 seconds to about 3 minutes, about 3 minutes to about 7 minutes, about 30 seconds to about 1 minute, or about 1 minute to about 5 minutes.

In some embodiments, the grain size after cooling the coated agricultural product from the second temperature to the third temperature is larger than the grain size before heating the coated agricultural product from the first temperature to the second temperature. In some embodiments, the grain size of the coating before heating the coated agricultural product from the first temperature to the second temperature is about 2 nm to about 10 nm, for example, about 5 nm to about 10 nm, about 8 nm to about 9 nm, about 8.5 nm to about 9.5 nm, or about 9 nm to about 10 nm. For example, the grain size of the coating after cooling the coated agricultural product from the second temperature to the third temperature can be about 7 nm to about 100 nm (e.g., about 8 nm to about 25 nm, about 11 nm to about 17 nm, about 11 nm to about 14 nm, about 13 nm to about 17 nm, about 12 nm to about 16 nm, or about 15 nm to about 17 nm).

In another aspect, described herein is a method of reducing the mass loss rate of an agricultural product, the method comprising:
applying a solution comprising one or more glycerophospholipids and a solvent to a surface of an agricultural product; and
drying the solution on the surface of an agricultural product under a forced flow of air to promote self-assembly of a multiplicity of glycerophospholipid bilayers on the surface of the agricultural product, thereby forming a glycerophospholipid layer on the agricultural product.

In another aspect, described herein is a method of reducing the respiration rate of an agricultural product, the method comprising:
applying a solution comprising one or more glycerophospholipids and a solvent to a surface of an agricultural product; and
drying the solution on the surface of an agricultural product under a forced flow of air to promote self-assembly of a multiplicity of glycerophospholipid bilayers on the surface of the agricultural product, thereby forming a glycerophospholipid layer on the agricultural product.

In some embodiments, the mixture is dried at a temperature of about 20° C. to about 100° C., for example, about 25° C. to about 80° C., about 25° C. to about 70° C., about 30° C. to about 65° C., about 40° C. to about 65° C., 50° C. to about 65° C., about 55° C. to about 65° C., about 60° C. to about 65° C., about 55° C., about 60° C., or about 65° C. In some embodiments, the mixture is partially dried. In some embodiments, the drying removes greater than about 5% of the solvent, for example, greater than about 10%, 20%, 30%, 40%, 50%, 60%, 70%, 80%, 90%, or 95% of the solvent. In some embodiments, the bilayer structure forms when the mixture is partially dried. In some embodiments, the bilayer structure forms after at least 5% of the solvent has been removed, for example, after at least about 10%, 20%, 30%, 40%, 50%, 60%, 70%, 80%, 90%, or 95% of the solvent has been removed.

In some embodiments, faster solvent removal and/or drying can improve the performance of the coating. For example, faster solvent removal and/or drying can result in thicker and more homogeneous coatings. In some embodiments, removing the solvent or drying the mixture is performed in under about 2 hours, for example, in under about 1.5 hours, 1 hour, 45 minutes, 30 minutes, 25 minutes, 20 minutes, 15 minutes, 10 minutes, 5 minutes, 4 minutes, 2 minutes, 1 minute, 30 seconds, 15 seconds, 10 seconds, 5 seconds, or 3 seconds.

In another aspect, described herein is a method of coating an agricultural product, the method comprising:
  applying a solution comprising one or more glycerophospholipids and a solvent to a surface of an agricultural product; and
  drying the solution on the surface of the agricultural product under a forced flow of air to promote self-assembly of a multiplicity of glycerophospholipid bilayers on the surface of the agricultural product, thereby forming a glycerophospholipid layer on the agricultural product.

In another aspect, described herein is a method of preparing an agricultural product having a coating disposed thereon, the method comprising:
  applying a solution comprising one or more glycerophospholipids and a solvent to a surface of an agricultural product; and
  drying the solution on the surface of an agricultural product under a forced flow of air to promote self-assembly of a multiplicity of glycerophospholipid bilayers on the surface of the agricultural product, thereby forming a glycerophospholipid layer on the agricultural product.

In another aspect, described herein is a method of reducing the water permeability of a coating on a substrate, the method comprising:
  applying a solution comprising one or more glycerophospholipids and a solvent to a surface of an agricultural product; and
  drying the solution on the surface of an agricultural product under a forced flow of air to promote self-assembly of a multiplicity of glycerophospholipid bilayers on the surface of the agricultural product, thereby forming a glycerophospholipid layer on the agricultural product.

In another aspect, described herein is a method of reducing the gas diffusion ratio of a coating on a substrate, the comprising:
  applying a solution comprising one or more glycerophospholipids and a solvent to a surface of an agricultural product; and
  drying the solution on the surface of an agricultural product under a forced flow of air to promote self-assembly of a multiplicity of glycerophospholipid bilayers on the surface of the agricultural product, thereby forming a glycerophospholipid layer on the agricultural product.

In some embodiments, the substrate is an agricultural product, a silicon substrate, a polystyrene substrate, or a substrate comprising a polysaccharide (e.g., cellulose). For example, the substrate can be an agricultural product.

In another aspect, described herein is a method of reducing the mass loss rate of an agricultural product having a coating disposed thereon, the method comprising:

- applying a solution comprising one or more glycerophospholipids and a solvent to a surface of an agricultural product; and
- drying the solution on the surface of an agricultural product under a forced flow of air to promote self-assembly of a multiplicity of glycerophospholipid bilayers on the surface of the agricultural product, thereby forming a glycerophospholipid layer on the agricultural product.

Coating Thickness and Mass Loss Factor/Rate

In some embodiments, for coatings that are formulated to prevent water loss from or oxidation of coated substrates such as produce, thicker coatings will be less permeable to water and oxygen than thinner coatings formed from the same coating agent, and should therefore result in lower mass loss rates as compared to thinner coatings. Thicker coatings can be formed by increasing the concentration of the coating agent in the solution/suspension/colloid and applying a similar volume of solution/suspension/colloid to each piece of (similarly sized) produce.

EXAMPLES

The following examples describe effects of various coating agents and solutions/suspensions/colloids on various substrates, as well as characterization of some of the various coating agents and solutions/suspensions/colloids. These examples are only for illustrative purposes and are not meant to limit the scope of the present disclosure. In each of the examples below, all reagents and solvents were purchased and used without further purification unless specified.

Example 1

Effect of Coatings Formed of Glycerophospholipid on Mass Loss and Respiration Rates of Agricultural Products FIG. 1 is a graph showing mass loss factors of Hass avocados treated with various coating agents suspended in water. "Untreated" corresponds to untreated agricultural products. "MAG/FAS (95/5)" corresponds to a coating agent formed of 95% monoglyceride (thereof about 90% glycerol monostearate) and 5% sodium stearate at a concentration of 30 g/L. "Soy Lecithin" corresponds to a coating agent formed of glycerophospholipid including phosphatidylcholine, phosphatidylethanolamine, and phosphatidylinositol, where the coating agent is a lecithin derived from soy. The total concentration of glycerophospholipid was 100 g/L.

All coatings were formed by bowl dipping the agricultural products in their associated solution, and allowing the agricultural products to dry under forced air flow at a temperature of 70° C. As seen in FIG. 1, the mass loss factor for the agricultural products corresponding to the glycerophospholipid coating was 1.58, the mass loss factor for the agricultural products corresponding to the MAG/FAS (95/5) coating was 1.44, and the mass loss factor for the untreated products was 1.00.

Figure 2:
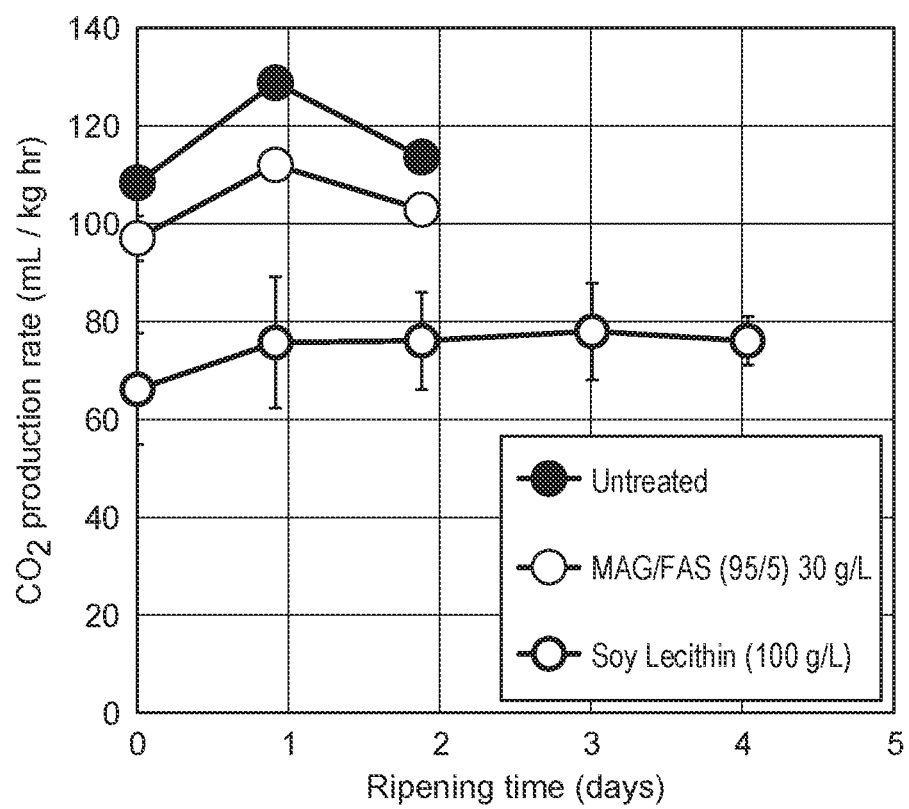
FIG. 2 shows a plot of respiration rates for an agricultural product that is untreated, an agricultural product that is coated with a coating agent comprising one or more monoglycerides, and an agricultural product that is coated with a coating agent comprising one or more glycerophospholipids.

As seen in FIG. 2, the respiration rate for the untreated agricultural products was higher than the respiration rate for agricultural products coated with the monoglyceride coating, which were both higher than the respiration rate for the glycerophospholipid coating.

Example 2

Structure of Glycerophospholipid Coating Measured by X-Ray Scattering

Coating agents were applied to the surface of a silicon substrate, which acts as a hydrophilic surface when exposed to air. An X-ray scattering image of the applied coating was obtained to identify characteristics of the coating.

A coating agent comprising phosphatidylcholine, phosphatidylethanolamine, and phosphatidylinositol (100 g/L glycerophospholipid) was applied to the surface of a polystyrene substrate. An X-ray scattering image of the applied coat was obtained and analyzed to determine characteristics of the coating based on the scattering pattern.

Figure 3:
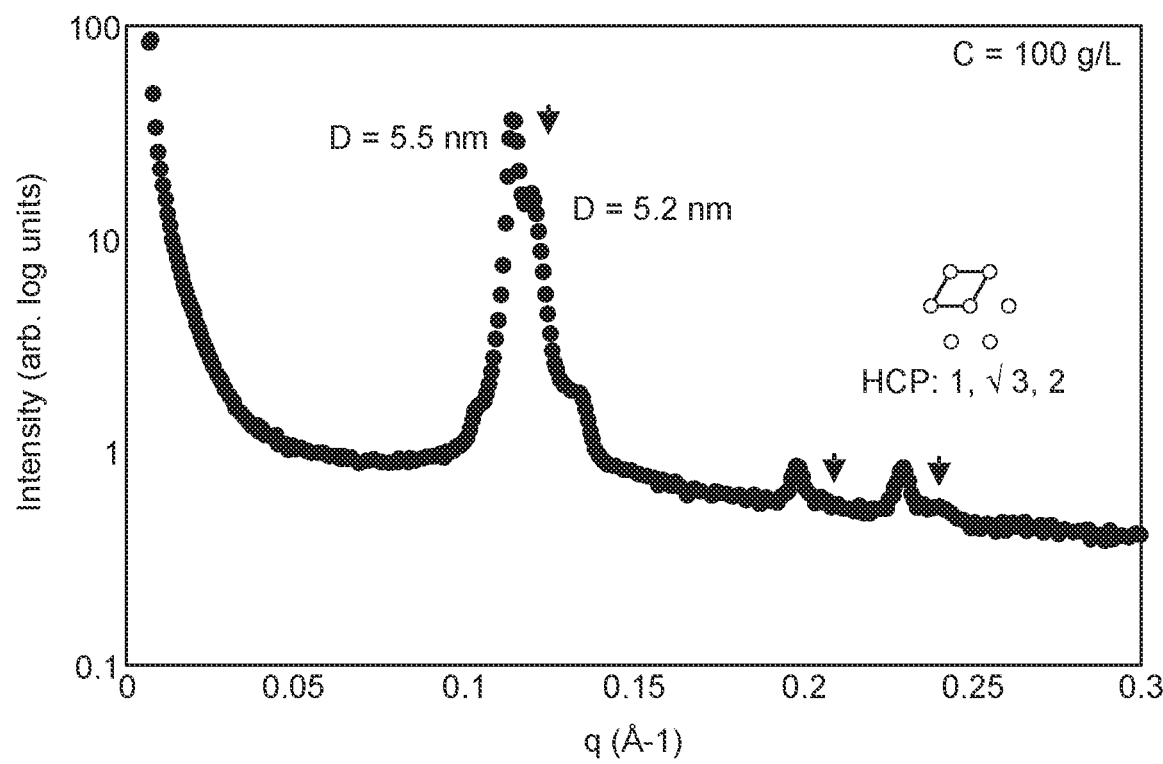
FIG. 3 shows a plot of intensity vs. $q(\text{Å}^{-1})$ from the x-ray scattering image of a coating on a polystyrene substrate.

As illustrated in FIG. 3, as determined by the scattering pattern, the coating has a hexagonal cylindrical phase (HCP) structure comprising repeating cylindrical units arranged on a hexagonal close-packed lattice on the surface of the substrate.

Example 3

Figure 4:
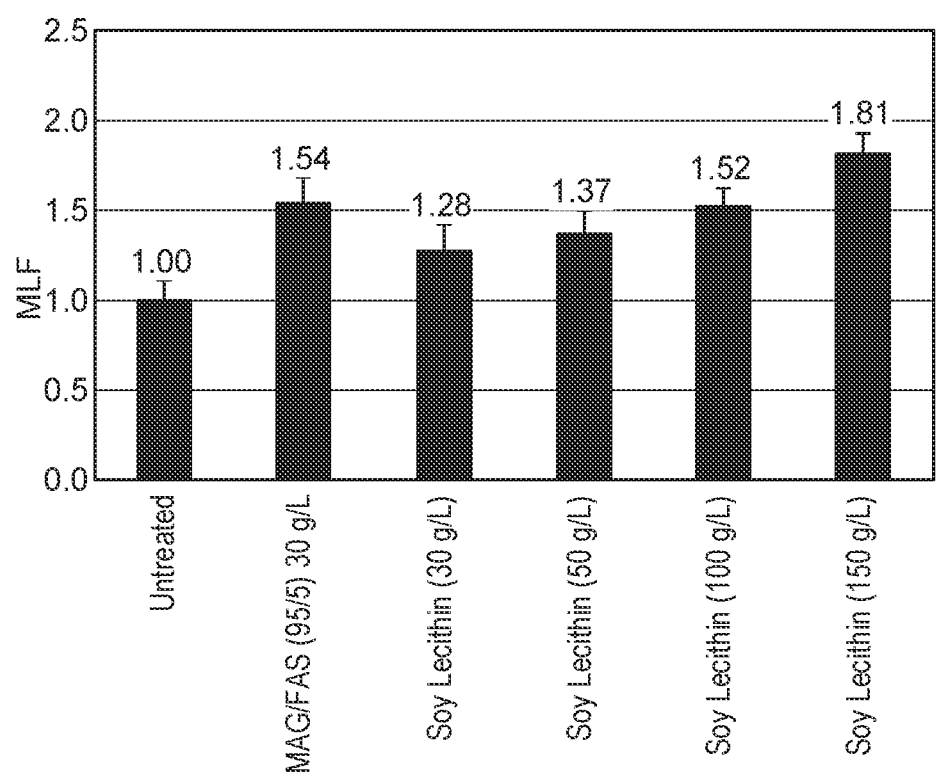
FIG. 4 shows a plot of mass loss factors for agricultural products that are treated with various coating agents.

Effect of Coatings Formed of Glycerophospholipid on Mass Loss and Respiration Rates of Agricultural Products Applied at Different Concentrations FIG. 4 is a graph showing mass loss factors of agricultural products treated with various coating agents suspended in water. "Untreated" corresponds to untreated agricultural products. "MAG/FAS (30 g/L)" corresponds to a coating agent formed of monoglyceride at a concentration of 30 g/L. "Lecithin" corresponds to a coating agent formed of glycerophospholipid including phosphatidylcholine, phosphatidylethanolamine, and phosphatidylinositol. The total concentration of glycerophospholipid was varied between 30-150 g/L where coatings applied at higher concentrations result in an increase in MLF.

Figure 5:
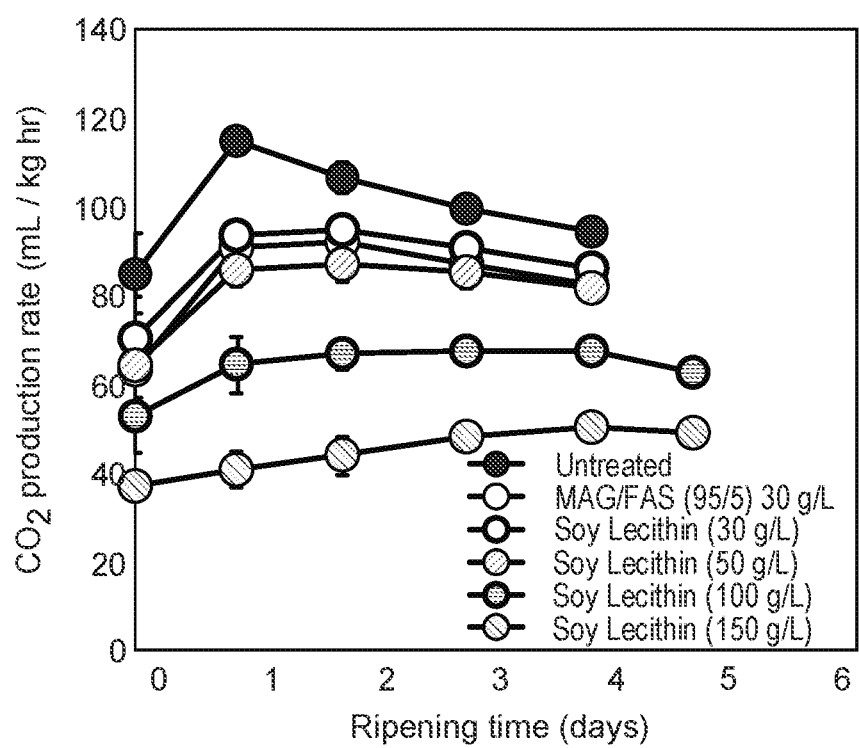
FIG. 5 shows a plot of respiration rates for agricultural products that are treated with various coating agents.
Figure 6:
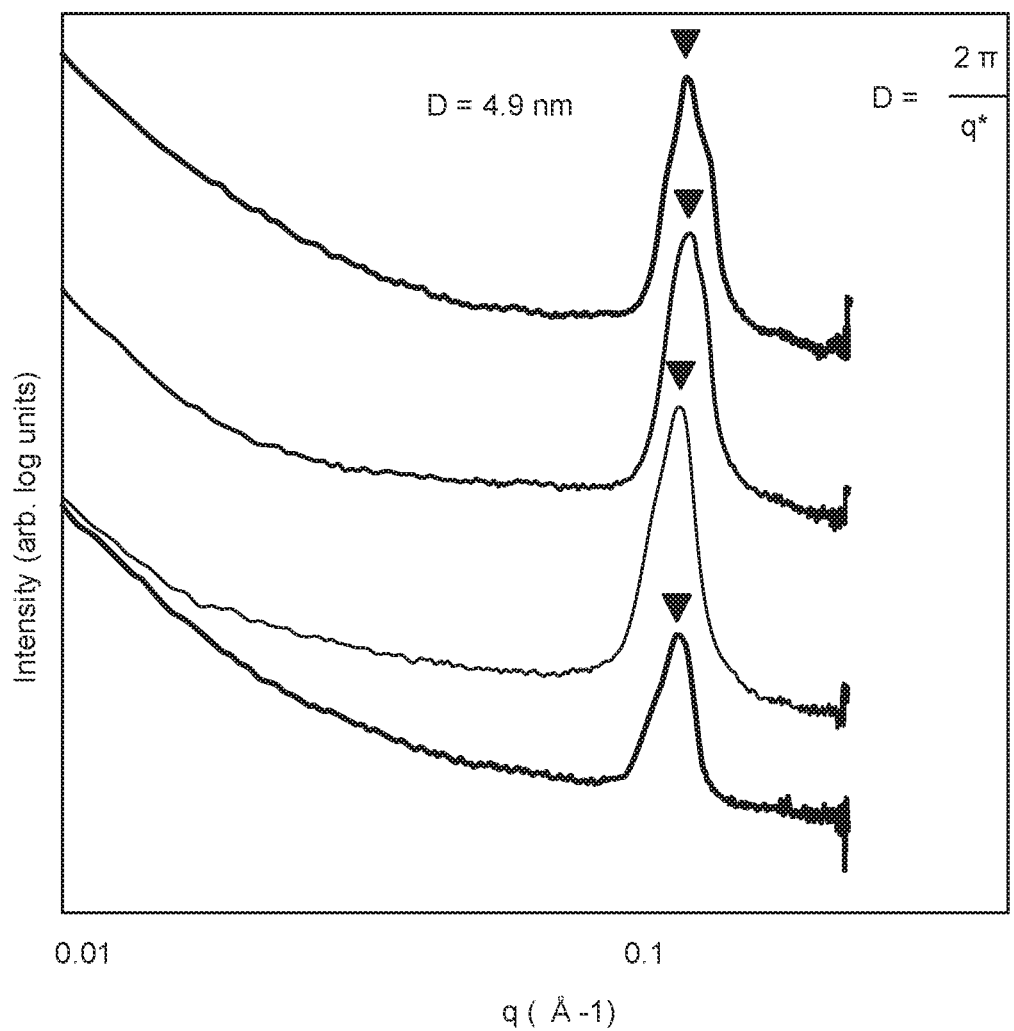
FIG. 6 shows plots of intensity vs. $q(\text{Å}^{-1})$ from the x-ray scattering image of coatings applied at varying concentrations on a polystyrene substrate.
Figure 7:
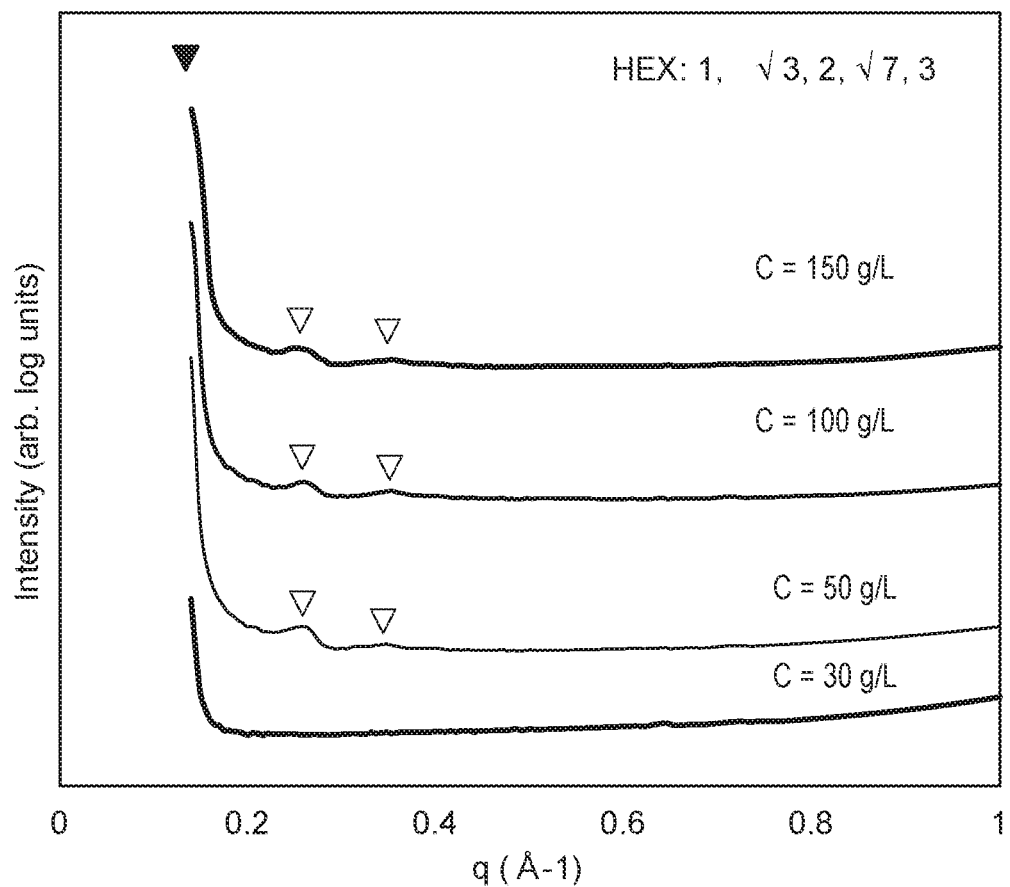
FIG. 7 shows plots of intensity vs. $q(\text{Å}^{-1})$ from the x-ray scattering image of coatings applied at varying concentrations on a polystyrene substrate.
Figure 8:
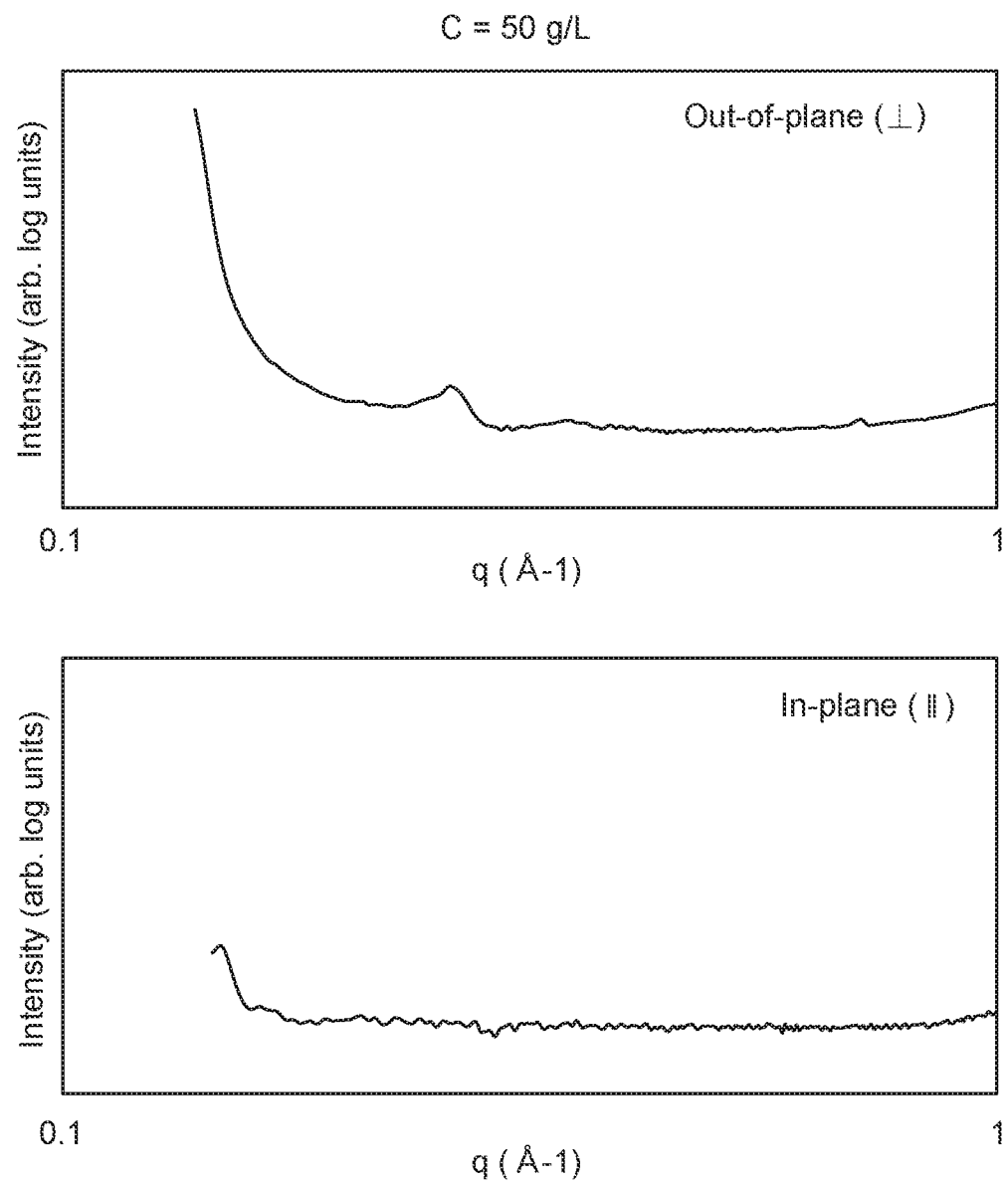
FIG. 8 shows plots of intensity vs. $q(\text{Å}^{-1})$ from the out-of-plane ($\perp$) and in-plane ($\parallel$) x-ray scattering image of a coating applied on a polystyrene substrate.
Figure 9:
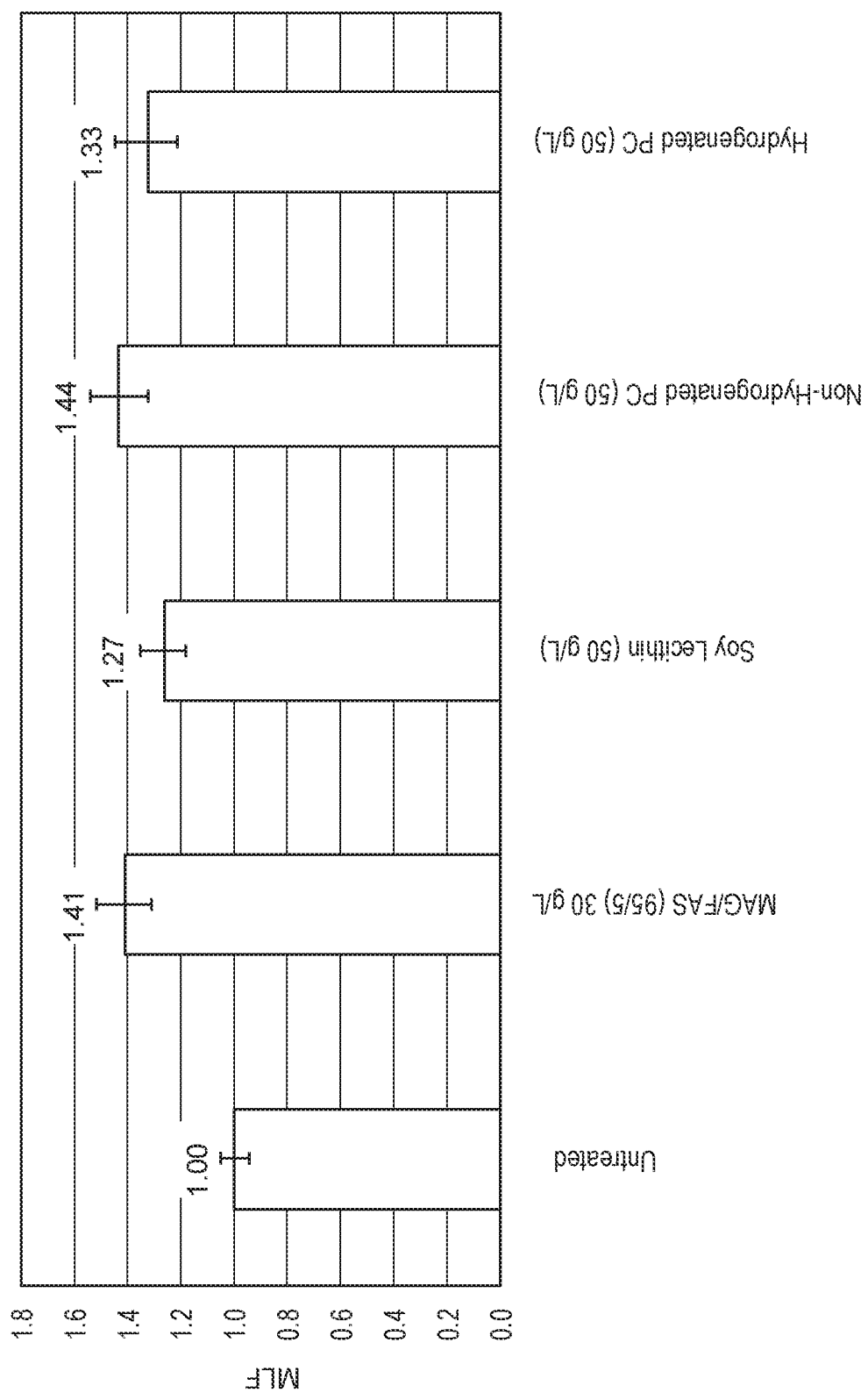
FIG. 9 shows a plot of mass loss factors for agricultural products that are treated with various coating agents.

As seen in FIG. 5 and Table 2, the respiration rate for the untreated agricultural products was higher than the respiration rate for agricultural products coated with the monoglyceride coating, which were both higher than the respiration rate for the glycerophospholipid coating. Additionally, respiration rates of coatings applied at higher concentrations were lower than coatings applied at lower concentrations.

TABLE 2

Respiration Factors.

| | Untreated | MAG/FAS (95/5) 30 g/L | Soy Lecithin (30 g/L) | Soy Lecithin (50 g/L) | Soy Lecithin (100 g/L) | Soy Lecithin (150 g/L) |
|---|---|---|---|---|---|---|
| Respiration Factor | 1.00 | 1.29 | 1.21 | 1.33 | 1.71 | 2.56 |

Example 4

Structure of Glycerophospholipid Coatings Applied at Different Concentrations Measured by X-Ray Scattering Coating agents were applied to the surface of a polystyrene substrate, which acts as a hydrophobic surface when exposed to air. An X-ray scattering image of the applied coating was obtained to identify characteristics of the coating.

As illustrated in FIG. 6, as determined by the scattering pattern, coatings applied at concentrations ranging from 30-150 g/L exhibit periodic spacings of 4.9 nm. Primary peaks used for this calculation are labeled with an arrow (in black).

As illustrated in FIG. 7, as determined by the scattering pattern, coatings applied at concentrations ranging from 30-150 g/L exhibit hexagonally-packed cylindrical structures (HCP) regardless of concentration comprising repeating cylindrical units arranged on a hexagonal close-packed lattice on the surface of the substrate. Peaks used to identify the characteristic HCP ratio are labeled with arrows.

As illustrated in FIG. 8, as determined by the scattering pattern, coatings applied at concentrations ranging from 30-150 g/L exhibit hexagonally-packed cylindrical structures (HCP) aligned perpendicular to the substrate surface as indicated by the pronounced out-of-plane (⊥) scattering. Negligible scattering is observed in the in-plane (||) direction, further suggesting alignment of the cylinders.

Example 5

Effect of Coatings Formed of Hydrogenated and Non-Hydrogenated Glycerophospholipid on Mass Loss and Respiration Rates of Agricultural Products All coatings were formed by bowl dipping the agricultural products in their associated solution, and allowing the agricultural products to dry under forced air flow at a temperature of 70° C. As seen in FIG. 9, the mass loss factor for the agricultural products corresponding to the soy-derived glycerophospholipid coating was 1.27, the mass loss factor for the agricultural products corresponding to the non-hydrogenated phosphatidylcholine (PC) was 1.44, the mass loss factor for the agricultural products corresponding to the hydrogenated phosphatidylcholine (PC) was 1.33, and the mass loss factor for the agricultural products corresponding to the MAG/FAS coating was 1.41, and the mass loss factor for the untreated products was 1.00.

Example 6

Structure of Hydrogenated and Non-Hydrogenated Glycerophospholipid Coatings Measured by X-Ray Scattering Coating agents were applied to the surface of a polystyrene substrate, which acts as a hydrophobic surface when exposed to air. An X-ray scattering image of the applied coating was obtained to identify characteristics of the coating.

Figure 10:
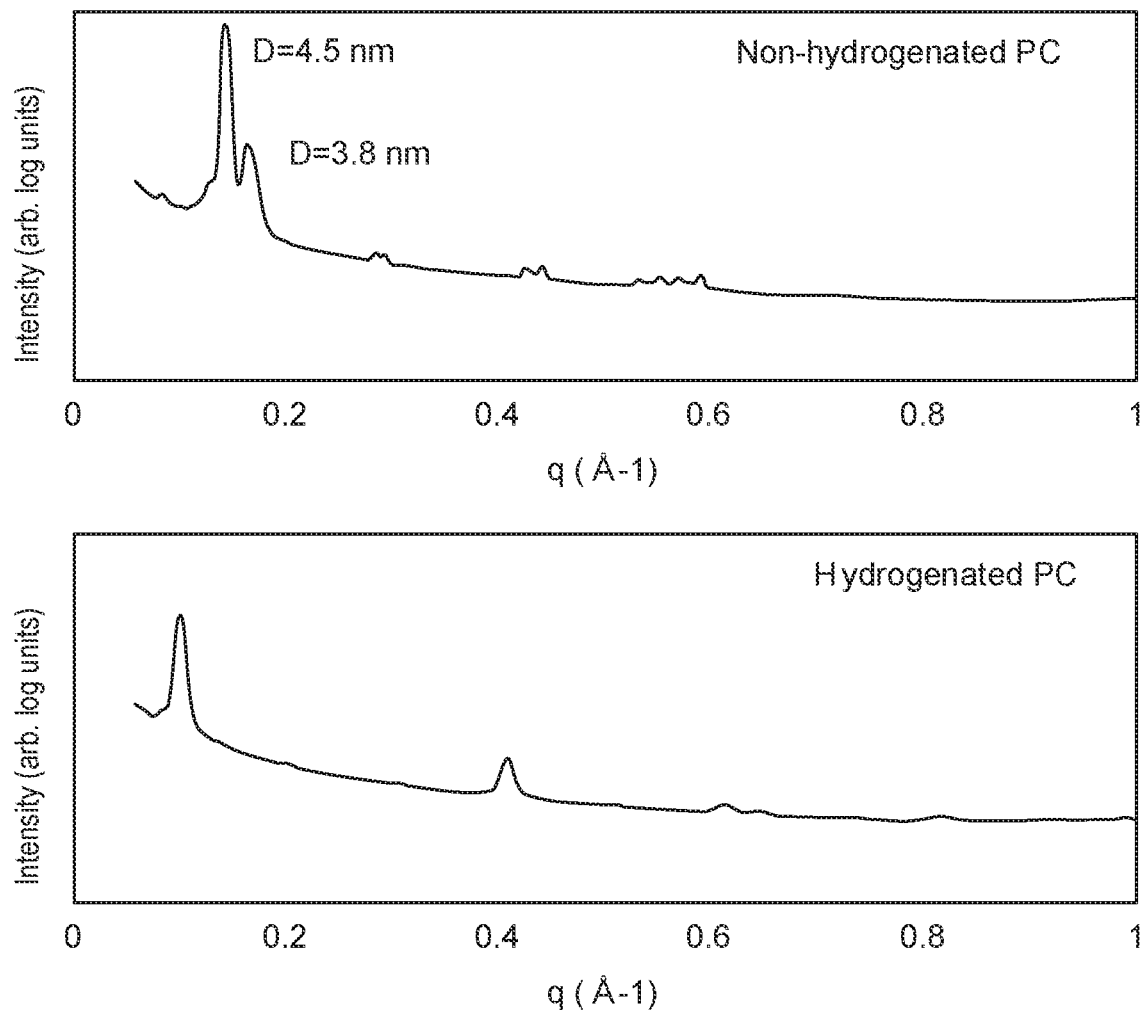
FIG. 10 shows plots of intensity vs. $q(\text{Å}^{-1})$ from the x-ray scattering image of a non-hydrogenated phosphatidylcholine (PC) coating and a hydrogenated phosphatidylcholine coating applied on a polystyrene substrate.
Figure 11:
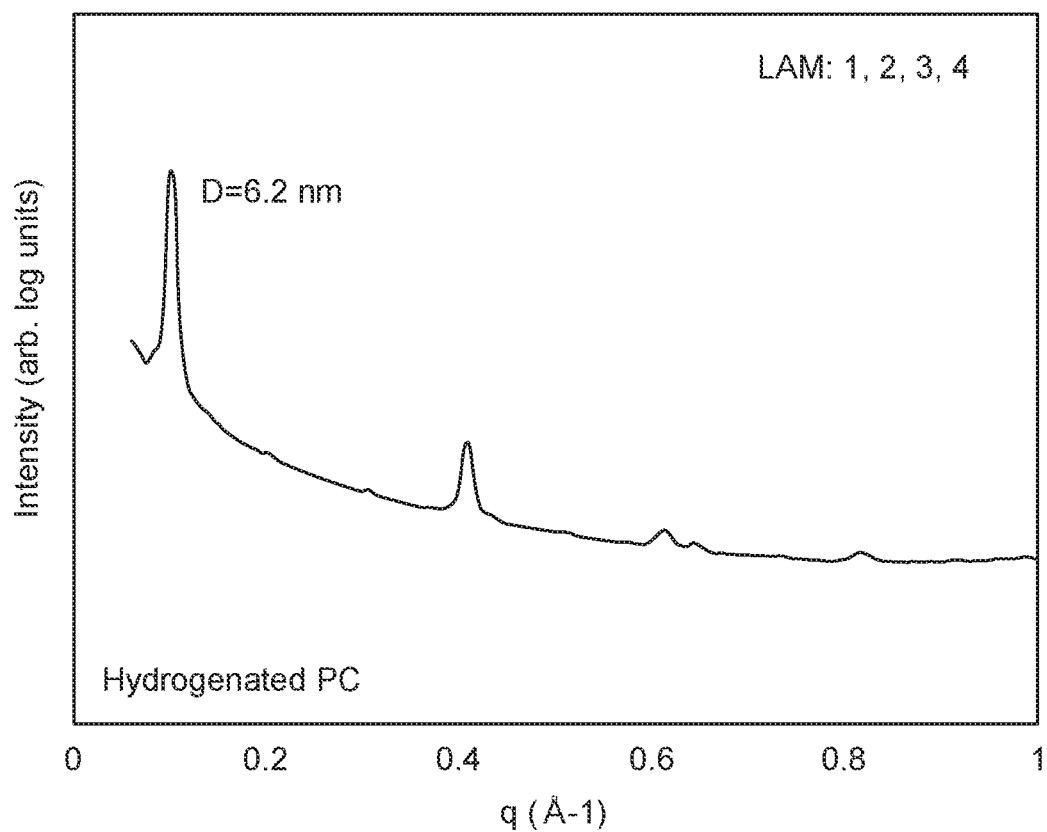
FIG. 11 shows a plot of intensity vs. $q(\text{Å}^{-1})$ from the x-ray scattering image of a hydrogenated phosphatidylcholine coating applied on a polystyrene substrate.
Figure 12:
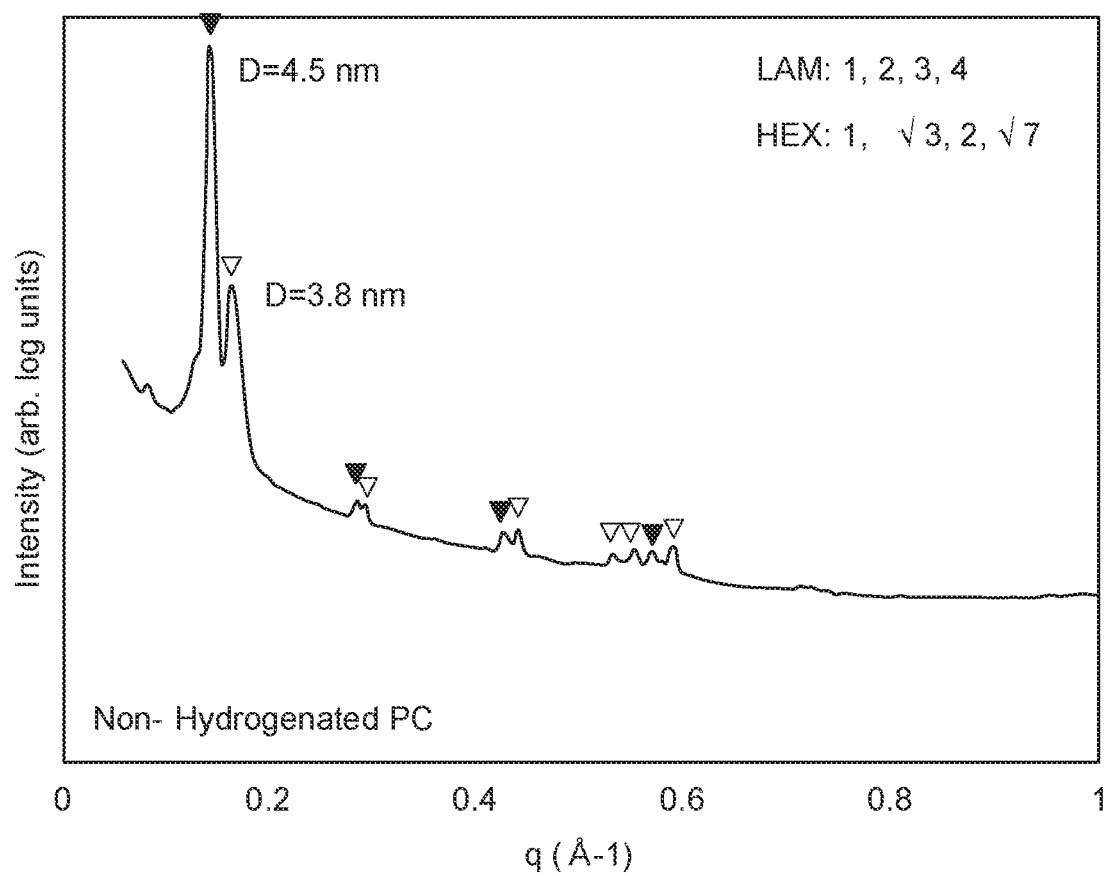
FIG. 12 shows a plot of intensity vs. $q(\text{Å}^{-1})$ from the x-ray scattering image of a non-hydrogenated phosphatidylcholine coating applied on a polystyrene substrate.

As illustrated in FIG. 10, coatings comprised of non-hydrogenated phosphatidyl choline and hydrogenated phsophatidylcholine exhibit periodic spacings of 3.8-4.5 nm and 6.2 nm, respectively. As illustrated in FIG. 11, as determined by the scattering pattern, the coating exhibits a lamellar structure composed of alternating bilayers on the surface of the substrate. As illustrated in FIG. 12, as determined by the scattering pattern, the coating exhibits a mixed morphology of lamella and hexagonally-packed cylinders on the surface of the substrate. Peaks used for analysis are labeled with arrows.

Example 7

Structure of Coatings Measured by X-Ray Scattering

Figure 13:
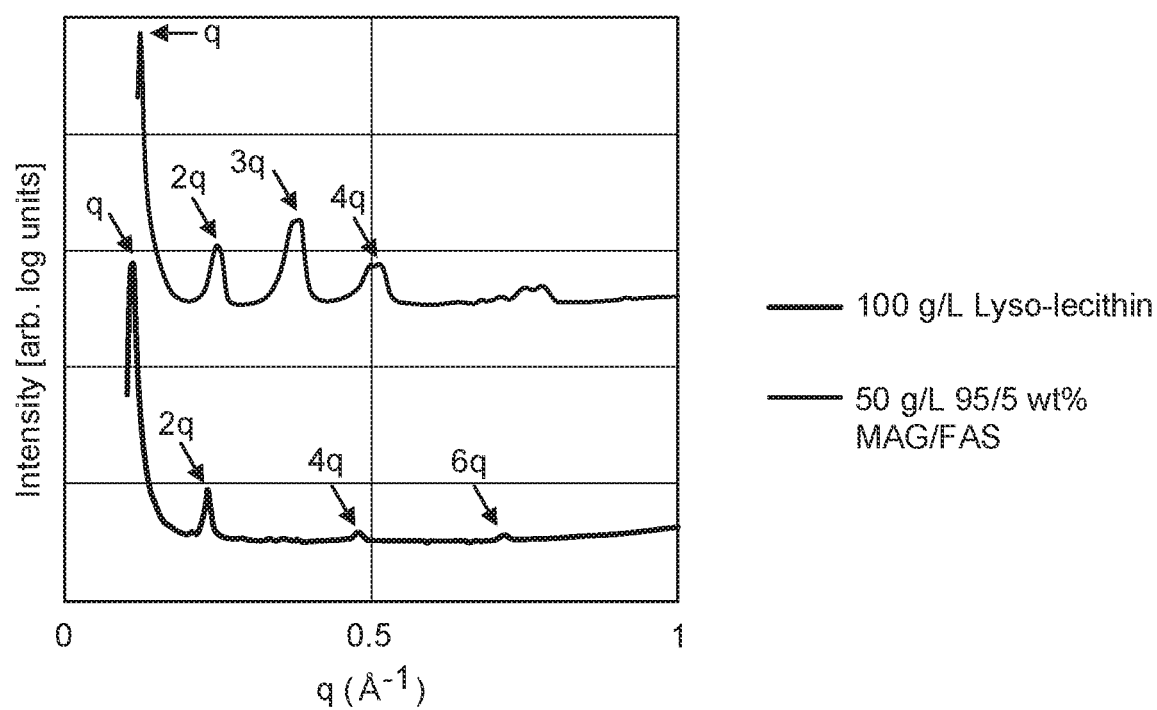
FIG. 13 shows a plot of intensity vs. $q(\text{Å}^{-1})$ from the x-ray scattering image of coatings applied on a polystyrene substrate.

A 100 g/L solution of lyso-lecithin was prepared by blending raw material in 85° C. deionized water in a mixer until homogeneous. The solution was cooled to room temperature (20° C.) and 0.1 mL was drop casted onto a substrate, allowing time to dry at ambient conditions. FIG. 13 shows a plot of intensity vs. $q(Å^{-1})$ from the x-ray scattering image of the lyso-lecithin coating and a 50 g/L MAG/FAS coating.

While various compositions and methods have been described above, it should be understood that they have been presented by way of example only, and not limitation. Where methods and steps described above indicate certain events occurring in certain order, ordering of steps may be modified, and such modification are in accordance with the variations of the invention. Additionally, certain of the steps may be performed concurrently in a parallel process when possible, as well as performed sequentially as described above. The various implementations have been particularly shown and described, but it will be understood that various changes in form and details may be made. Accordingly, other implementations are within the scope of the following claims.

Although this disclosure contains many specific embodiment details, these should not be construed as limitations on the scope of the subject matter or on the scope of what may be claimed, but rather as descriptions of features that may be specific to particular embodiments. Certain features that are described in this disclosure in the context of separate embodiments can also be implemented, in combination, in a single embodiment. Conversely, various features that are described in the context of a single embodiment can also be implemented in multiple embodiments, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular embodiments of the subject matter have been described. Other embodiments, alterations, and permutations of the described embodiments are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results.

Accordingly, the previously described example embodiments do not define or constrain this disclosure. Other changes, substitutions, and alterations are also possible without departing from the spirit and scope of this disclosure.

What is claimed is:

1. A method of reducing the ripening rate of an agricultural product, the method comprising:
   applying a solution comprising a coating agent to a surface of the agricultural product, wherein the coating agent comprises one or more glycerophospholipids, a temperature of the solution is between 10° C. and 80° C., and a total concentration of the one or more glycerophospholipids in the solution is between 100 g/L and 150 g/L; and
   drying the solution on the surface of the agricultural product under a flow of air having a temperature between 20° C. and 100° C. to promote self-assembly of a multiplicity of glycerophospholipid bilayers on the surface of the agricultural product, thereby forming a coating on the agricultural product.

2. The method of claim 1, wherein the one or more glycerophospholipids comprise one or more of phosphatidylcholine, phosphatidylethanolamine, phosphatidylinositol, phosphatidylserine, and phosphatidic acid.

3. The method of claim 1, wherein the one or more glycerophospholipids comprise one or more compounds of Formula I:

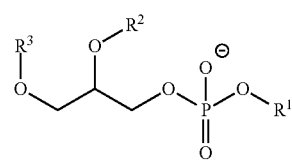

(Formula I)

wherein:

$R^1$ is —H or one of the following fragments:

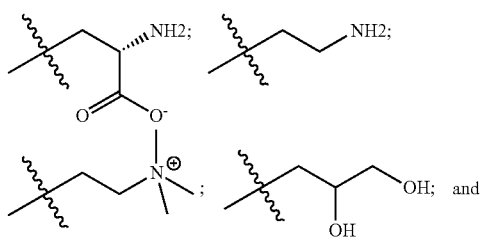

-continued

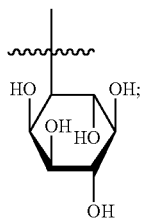

and

R² and R³ are each independently, at each occurrence, —H or a fragment represented by Formula II:

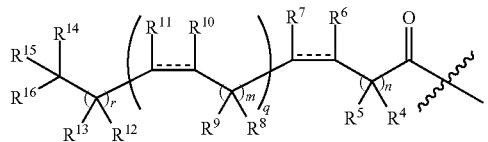
(Formula II)

wherein:

R⁴, R⁵, R⁸, R⁹, R¹², R¹³, R¹⁴, R¹⁵ and R¹⁶ are each independently, at each occurrence, —H, —OH, —OR¹⁷ or $C_1$-$C_6$ alkyl;

R⁶, R⁷, R¹⁰, and R¹¹ are each independently, at each occurrence, —H, —OR¹⁷, or $C_1$-$C_6$ alkyl; and/or R⁴ and R⁵ can combine with the carbon atoms to which they are attached to form C=O; and/or R⁸ and R⁹ can combine with the carbon atoms to which they are attached to form C=O; and/or R¹² and R¹³ can combine with the carbon atoms to which they are attached to form C=O; and R¹⁷ is at each occurrence a $C_1$-$C_6$ alkyl, the symbol ===== represents a single bond or a cis or trans double bond;

n is 0, 1, 2, 3, 4, 5, 6, 7 or 8;

m is 0, 1, 2 or 3;

q is 0, 1, 2, 3, 4 or 5; and r is 0, 1, 2, 3, 4, 5, 6, 7 or 8.

4. The method of claim 3, wherein the fragment represented by Formula II is one of:

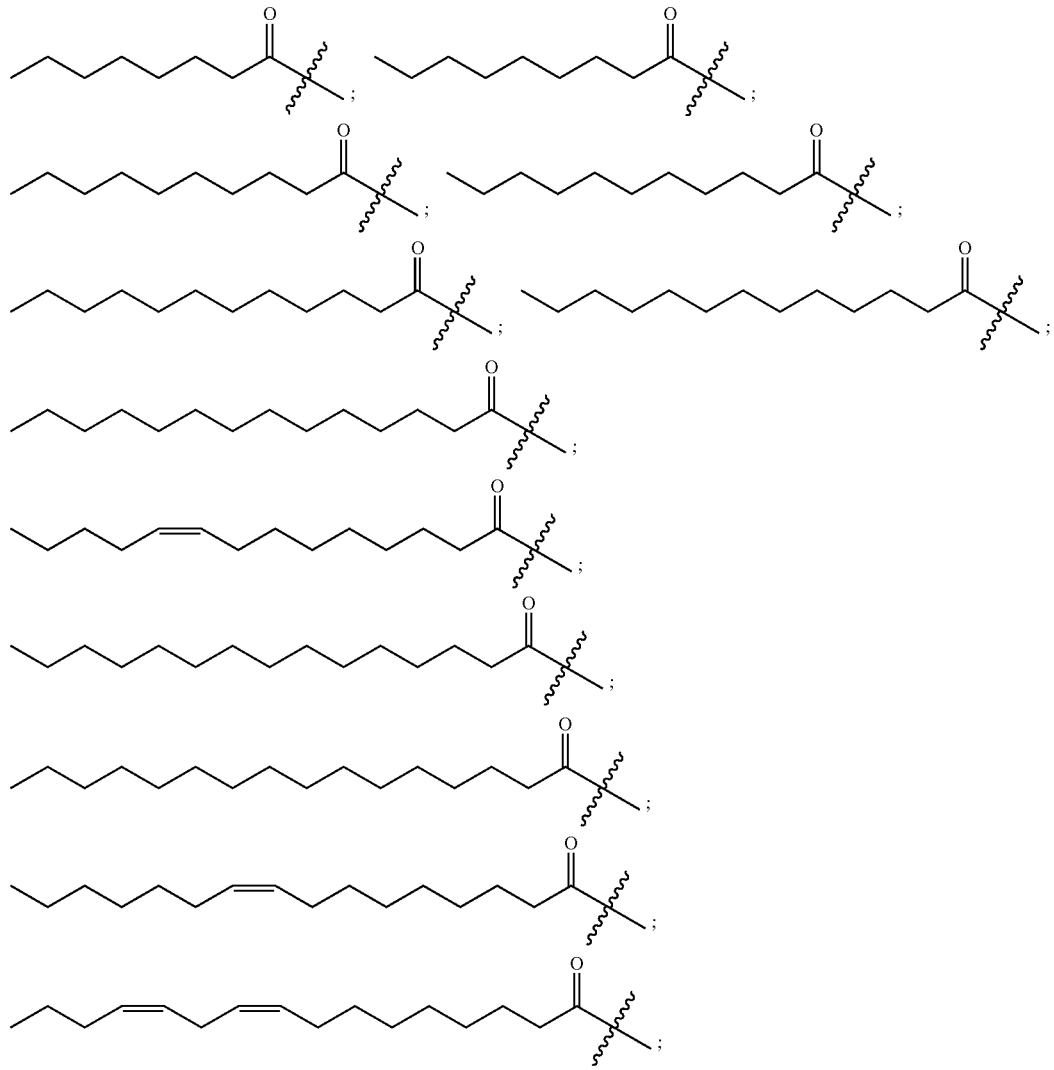

-continued
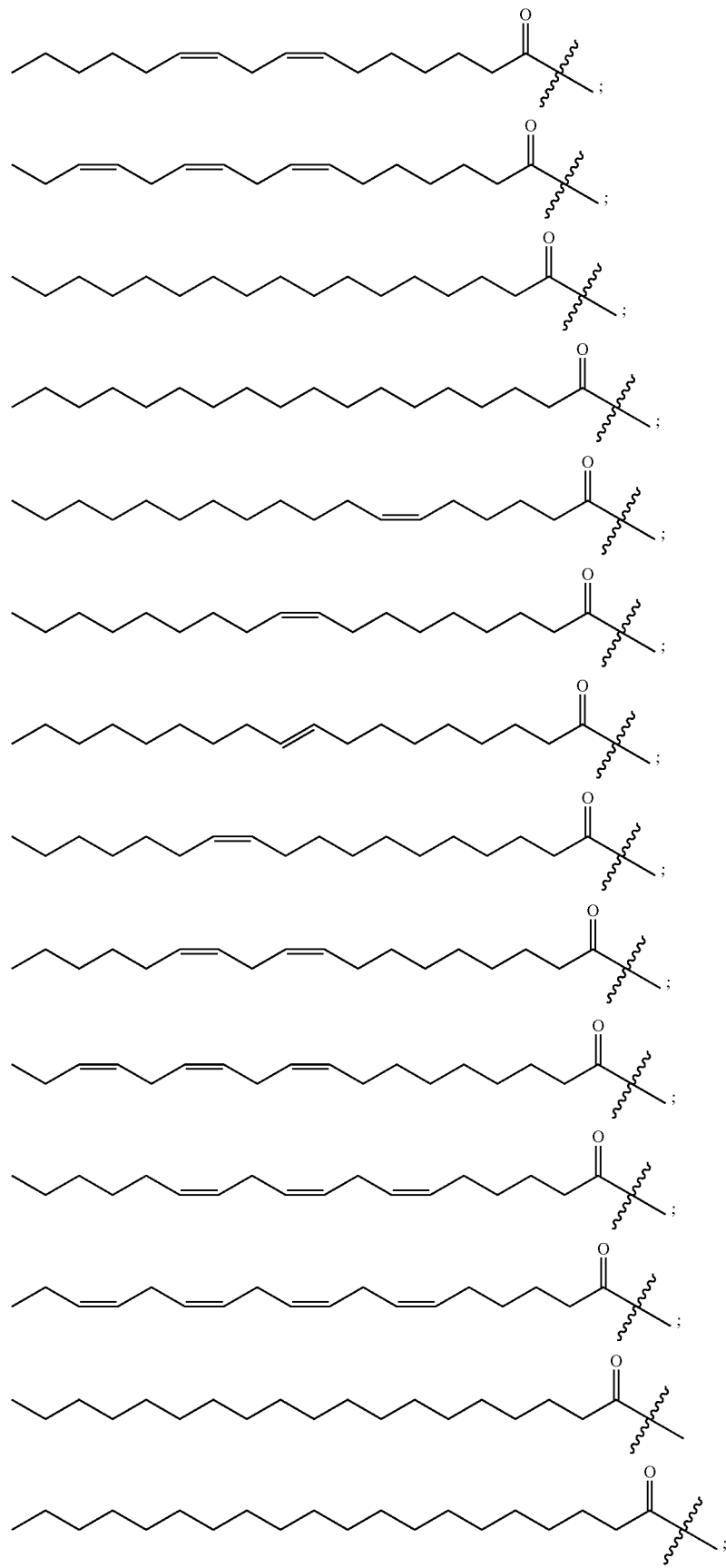

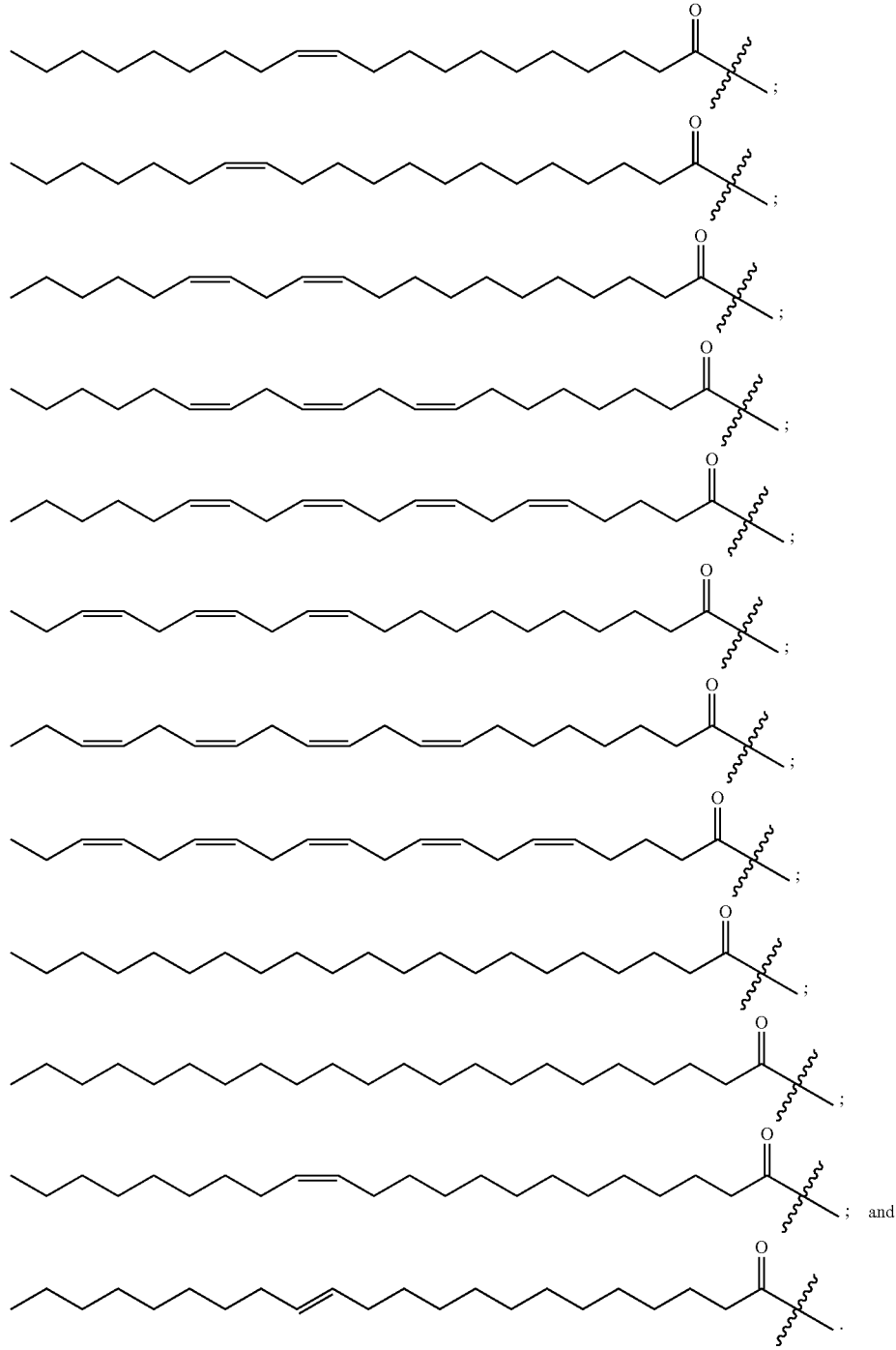

5. The method of claim 1, wherein the one or more glycerophospholipids comprise phosphatidylcholine, phosphatidylethanolamine, and phosphatidylinositol.

6. The method of claim 5, wherein the one or more glycerophospholipids comprise 20 wt % to 40 wt % phosphatidylcholine, 20 wt % to 40 wt % phosphatidylethanolamine, and 20 wt % to 40 wt % phosphatidylinositol.

7. The method of claim 5, wherein the one or more glycerophospholipids further comprise phosphatidylserine.

8. The method of claim 1, wherein the solution further comprises a phytosterol.

9. The method of claim 8, wherein a weight ratio of the phytosterol to a total amount of the one or more glycerophospholipids is less than 0.05.

10. The method of claim 1, wherein the solution is an aqueous solution.

11. The method of claim 1, wherein a temperature of the air is between 50° C. and 100° C.

12. The method of claim 1, wherein the multiplicity of glycerophospholipid bilayers comprise one or more open bilayers.

13. The method of claim 12, wherein the one or more open bilayers are lamellar.

14. The method of claim 1, wherein the multiplicity of glycerophospholipid bilayers comprise one or more closed bilayers.

15. The method of claim 14, wherein one or more of the closed bilayers are cylindrical.

16. The method of claim 14, wherein one or more of the closed bilayers are spherical.

17. The method of claim 1, wherein a thickness of the coating is less than 2 microns.

18. A method of preparing an agricultural product having a coating disposed thereon, the method comprising:

applying a solution comprising a coating agent to a surface of the agricultural product, wherein the coating agent comprises one or more glycerophospholipids, a temperature of the solution is between 10° C. and 80° C., and a total concentration of the one or more glycerophospholipids in the solution is between 100 g/L and 150 g/L; and drying the solution on the surface of the agricultural product under a flow of air having a temperature between 20° C. and 100° C. to promote self-assembly of a multiplicity of glycerophospholipid bilayers on the surface of the agricultural product, thereby forming a coating on the agricultural product.

19. A coated agricultural product comprising:

an agricultural product; and a coating on the surface of the agricultural product, wherein the coating comprises one or more glycerophospholipids, wherein the coating has a hexagonal cylindrical phase structure comprising repeating cylindrical units arranged on a hexagonal close-packed lattice on the surface of the structure, and the coating is applied to the surface of the agricultural product as a solution comprising one or more glycerophospholipids in a total concentration between 100 g/L and 150 g/L.

* * * * *